(12) United States Patent
Shiku et al.

(10) Patent No.: US 12,479,901 B2
(45) Date of Patent: Nov. 25, 2025

(54) T-CELL RECEPTOR

(71) Applicant: MIE UNIVERSITY, Tsu (JP)

(72) Inventors: Hiroshi Shiku, Tsu (JP); Yoshihiro Miyahara, Tsu (JP); Keisuke Fujii, Tsu (JP); Tatsuro Jo, Nagasaki (JP); Hiroyuki Kishi, Toyama (JP)

(73) Assignee: MIE UNIVERSITY, Tsu (JP)

( * ) Notice: Subject to any disclaimer, the term of this patent is extended or adjusted under 35 U.S.C. 154(b) by 1461 days.

(21) Appl. No.: 16/961,409

(22) PCT Filed: Jan. 17, 2019

(86) PCT No.: PCT/JP2019/001182
§ 371 (c)(1),
(2) Date: Jul. 10, 2020

(87) PCT Pub. No.: WO2019/146477
PCT Pub. Date: Aug. 1, 2019

(65) Prior Publication Data
US 2020/0360435 A1 Nov. 19, 2020

(30) Foreign Application Priority Data
Jan. 23, 2018 (JP) ................. 2018-008947

(51) Int. Cl.
*A61P 35/02* (2006.01)
*A61K 40/11* (2025.01)
*A61K 40/32* (2025.01)
*A61K 40/46* (2025.01)
*A61P 31/14* (2006.01)
*C07K 14/725* (2006.01)
*C12N 5/0783* (2010.01)

(52) U.S. Cl.
CPC .......... *C07K 14/7051* (2013.01); *A61K 40/11* (2025.01); *A61K 40/32* (2025.01); *A61K 40/46* (2025.01); *A61P 31/14* (2018.01); *C12N 5/0636* (2013.01)

(58) Field of Classification Search
None
See application file for complete search history.

(56) References Cited

U.S. PATENT DOCUMENTS

2004/0228848 A1* 11/2004 Har-Noy ................. A61P 37/04
435/372
2013/0058916 A1* 3/2013 Tobelem ................. A61P 9/10
435/375

FOREIGN PATENT DOCUMENTS

| CN | 1308674 A | 8/2001 |
|---|---|---|
| CN | 104684926 A | 6/2015 |
| CN | 105873945 A | 8/2016 |
| WO | 99060119 A2 | 11/1999 |
| WO | 99060120 A2 | 11/1999 |
| WO | WO-2007017201 A1 * | 2/2007 ............. A61P 31/00 |
| WO | 2014018863 A1 | 1/2014 |
| WO | 2015077607 A1 | 5/2015 |
| WO | 2015077615 A1 | 5/2015 |
| WO | 2018005556 A1 | 1/2018 |

OTHER PUBLICATIONS

Janeway et al., Immunobiology, 5th Ed., Garland Science, pp. 106-108, 117-118 and 260-263, (2001). (Year: 2001).*
Goyarts et al., Mol Immunol. Jul. 1998;35(10):593-607. (Year: 1998).*
Garcia et al., Cell, vol. 122, 333-336, Aug. 12, 2005. (Year: 2005).*
Portolano et al., J Immunol. Feb. 1, 1993;150(3):880-7. (Year: 1993).*
Robins et al., Blood. 2009;114:4099-4107. (Year: 2009).*
Kloosterboer et al. (Leukemia (2004) 18, 798-808). (Year: 2004).*
Kawamura et al. (Haematologica, (Jun. 2017) vol. 102, Supp. Supplement 2, pp. 245. Abstract No. P621). (Year: 2017).*
Matsuura et al. (J Neuropathol Exp Neurol, vol. 74, No. 1, pp. 2-14, 2015). (Year: 2015).*
Matsumoto et al. (J Med Virol. 2017;89:1469-1476). (Year: 2017).*
Hollyman et al., J Immunother 2009;32:169-180. (Year: 2009).*
International Search Report dated Apr. 2, 2019 for International Patent Application No. PCT/JP2019/001182, 4 pages with English translation.
Ishihara et al., "A Unique T-Cell Receptor Amino Acid Sequence Selected by Human T-Cell Lymphotropic Virus Type 1 Tax 301-309-Specific Cytotoxic T Cells in HLA-A24:02-Posititve Asymptomatic Carriers and Adult T-Cell Leukemia/Lymphoma Patients", Journal of Virology, 2017, vol. 91, No. 19, e00974-17, 15 pages.
Tanaka et al., "Long-Term Persistence of Limited HTLV-I Tax-specific Cytotoxic T Cell Clones in a Patient with Adult T Cell Leukemia/Lymphoma after Allogeneic Stem Cell Transplantation", Journal of Clinical Immunology, 2012, vol. 32, pp. 1340-1352.

(Continued)

*Primary Examiner* — Zachary S Skelding
(74) *Attorney, Agent, or Firm* — MH2 Technology Law Group, LLP

(57) ABSTRACT

An object of the present invention is to provide a technique for preventing or treating HTLV-1-associated diseases, such as ATL, a material for use in the technique, a method for screening the material, and the like. The present invention provides a TCR screening method comprising sorting HTLV-1-derived antigen-recognizing cells from cells derived from an HTVL-1 patient and subjecting the HTLV-1-derived antigen-recognizing cells to TCR repertoire analysis, ranking the TCR types in descending order of the number of cells of each TCR type, and selecting a highly ranked TCR. The present invention provides a prophylactic or therapeutic agent for an HTLV-1-associated disease, the agent comprising a TCR comprising specific CDRs that can be obtained by the TCR screening method and cells expressing the TCR.

3 Claims, 22 Drawing Sheets
Specification includes a Sequence Listing.

(56) References Cited

OTHER PUBLICATIONS

Tanaka et al., "Single-Cell Analysis of T-Cell Receptor Repertoire of HTLV-1 Tax-Specific Cytotoxic T Cells in Allogeneic Transplant Recipients with Adult T-Cell Leukemia/Lymphoma", Cancer Research, 2010, vol. 70, No. 15, pp. 6181-6192.
Saito et al., "Molecular Analysis of T Cell Clonotypes in Muscle-Infiltrating Lymphocytes from Patients with Human T Lymphotropic Virus Type 1 Polymyositis", The Journal of Infectious Diseases, 2002, vol. 186, pp. 1231-1241.
Utz et al., "Analysis of the T-Cell Receptor Repertoire of Human T-Cell Leukemia Virus Type 1 (HTLV-1) Tax-Specific CD8+ Cytotoxic T Lymphocytes from Patients with HTLV-1-Associated Disease: Evidence for Oligoclonal Expansion", Journal of Virology, 1996, vol. 70, No. 2, pp. 843-851.
Bourcier et al., "Conserved CDR3 Regions in T-Cell Receptor (TCR) CD8+ T Cells That Recognize the Tax11-19/HLA-A*0201 Complex in a Subject Infected with Human T-Cell Leukemia Virus Type 1: Relationship of T-Cell Fine Specificity and Major Histocompatibility Complex/Peptide/TCR Crystal Structure", Journal of Virology, vol. 75, No. 20, pp. 9836-9843.
Office Action dated Oct. 26, 2022 for corresponding Chinese Patent Application No. 201980009889.0, 18 Pages with English translation.
Gagnon et al., "T Cell Receptor Recognition via Cooperative Conformational Plasticity", Journal of Molecular Biology, 2006, No. 363, vol. 1, pp. 228-243.

\* cited by examiner

Fig. 3
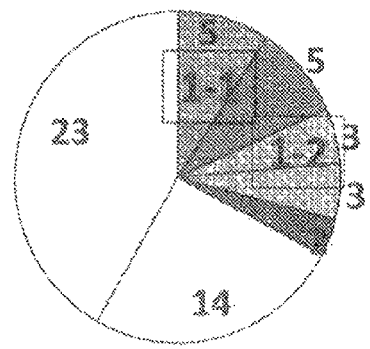
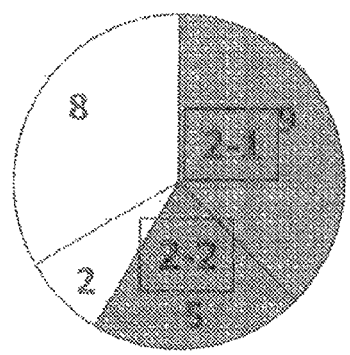
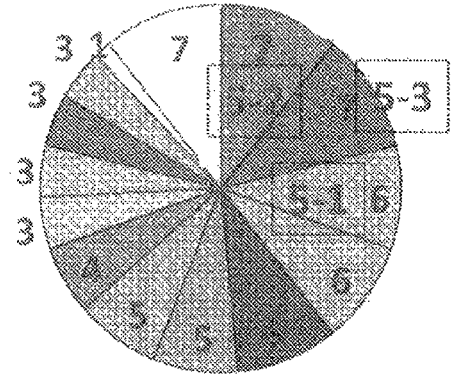
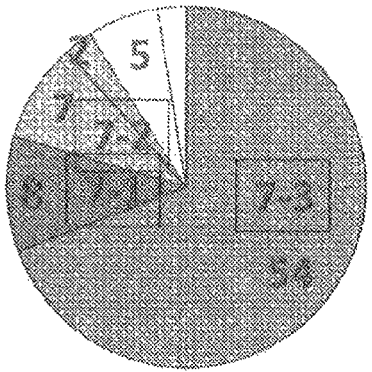

TCR beta

MGTRLLCWVAFCLLVEELIEAGVVQSPRYKIIEKKQPVAFWCNPISGHNTLYWYRQN
LGQGPELLIRYENEEAVDDSQLPKDRFSAERLKGVDSTLKIQPAELGDSAVYLCASS
LDRLAGGRDTQYFGPGTRLTVLEDLKNVFPPEVAVFEPSEAEISHTQKATLVCLATG
FFPDHVELSWWVNGKEVHSGVCTDPQPLKEQPALNDSRYCLSSRLRVSATFWQNP
RNHFRCQVQFYGLSENDEWTQDRAKPVTQIVSAEAWGRADCGFTSVSYQQGVLSA
TILYEILLGKATLYAVLVSALVLMAMVKRKDF

TCR alpha

MMKSLRVLLVILWLQLSWVWSQQKEVEQNSGPLSVPEGAIASLNCTYSDRGSQSFF
WYRQYSGKSPELIMFIYSNGDKEDGRFTAQLNKASQYVSLLIRDSQPSDSATYLCAG
ETDSWGKLQFGSGTQVVVTPDIQNPDPAVYQLRDSKSSDKSVCLFTDFDSQTNVSQ
SKDSDVYITDKCVLDMRSMDFKSNSAVAWSNKSDFACANAFNNSIIPEDTFFPSPES
SCDVKLVEKSFETDTNLNFQNLLVIVLRILLLKVAGFNLLMTLRLWSS

TCR beta

MLLLLLLLGPGSGLGAVVSQHPSRVICKSGTSVKIECRSLDFQATTMFWYRQFPKKS
LMLMATSNEGSKATYEQGVEKDKFLINHASLTLSTLTVTSAHPEDSSFYICSARYGE
VAFFGQGTRLTVVEDLNKVFPPEVAVFEPSEAEISHTQKATLVCLATGFFPDHVELS
WWVNGKEVHSGVCTDPQPLKEQPALNDSRYCLSSRLRVSATFWQNPRNHFRCQVQ
FYGLSENDEWTQDRAKPVTQIVSAEAWGRADCGFTSVSYQQGVLSATILYEILLGKA
TLYAVLVSALVLMAMVKRKDF

TCR alpha

MTSIRAVFIFLWLQLDLVNGENVEQHPSTLSVQEGDSAVIKCTYSDSASNYFPWYKQ
ELGKGPQLIIDIRSNVGEKKDQRIAVTLNKTAKHFSLHITETQPEDSAVYFCAASRDN
NDMRFGAGTRLTVKPNIQNPDPAVYQLRDSKSSDKSVCLFTDFDSQTNVSQSKDSD
VYITDKCVLDMRSMDFKSNSAVAWSNKSDFACANAFNNSIIPEDTFFPSPESSCDVK
LVEKSFETDTNLNFQNLLVIVLRILLLKVAGFNLLMTLRLWSS

TCR beta
MGPQLLGYVVLCLLGAGPLEAQVTNPRYLITVTGKKLTVTCSQNMNHEYMSWYR
QDPGLGLRQIYYSMNVEVTDKGDVPEGYKVSRKEKRNFPLILESPSPNQTSLYFCAS
SPGLAGGVEQFFGPGTRLTVLEDLKNVFPPEVAVFEPSEAEISHTQKATLVCLATGF
FPDHVELSWWVNGKEVHSGVCTDPQPLKEQPALNDSRYCLSSRLRVSATFWQNPR
NHFRCQVQFYGLSENDEWTQDRAKPVTQIVSAEAWGRADCGFTSVSYQQGVLSATI
LYEILLGKATLYAVLVSALVLMAMVKRKDF TCR alpha
MISLRVLLVILWLQLSWVWSQRKEVEQDPGPFNVPEGATVAFNCTYSNSASQSFFW
YRQDCRKEPKLLMSVYSSGNEDGRFTAQLNRASQYISLLIRDSKLSDSATYLCVVNI
GFGNVLHCGSGTQVIVLPHIQNPDPAVYQLRDSKSSDKSVCLFTDFDSQTNVSQSKD
SDVYITDKCVLDMRSMDFKSNSAVAWSNKSDFACANAFNNSIIPEDTFFPSPESSCD
VKLVEKSFETDTNLNFQNLLVIVLRILLLKVAGFNLLMTLRLWSS

Fig. 7

ATL2-17-2 (2-2)

TCR beta
MLLLLLLLGPGSGLGAVVSQHPSRVICKSGTSVKIECRSLDFQATTMFWYRQFPKKS
LMLMATSNEGSKATYEQGVEKDKFLINHASLTLSTLTVTSAHPEDSSFYICSARAGG
DTFGSGTRLTVVEDLNKVFPPEVAVFEPSEAEISHTQKATLVCLATGFFPDHVELSW
WVNGKEVHSGVCTDPQPLKEQPALNDSRYCLSSRLRVSATFWQNPRNHFRCQVQF
YGLSENDEWTQDRAKPVTQIVSAEAWGRADCGFTSVSYQQGVLSATILYEILLGKAT
LYAVLVSALVLMAMVKRKDF TCR alpha
MLLLLVPVLEVIFTLGGTRAQSVTQLDSHVSVSEGTPVLLRCNYSSSYSPSLFWYVQ
HPNKGLQLLLKYTSAATLVKGINGFEAEFKKSETSFHLTKPSAHMSDAAEYFCVVS
VNDYKLSFGAGTTVTVRANIQNPDPAVYQLRDSKSSDKSVCLFTDFDSQTNVSQSK
DSDVYITDKCVLDMRSMDFKSNSAVAWSNKSDFACANAFNNSIIPEDTFFPSPESSC
DVKLVEKSFETDTNLNFQNLLVIVLRILLLKVAGFNLLMTLRLWSS

Fig. 8

ATL-EE6-7 (5-1)

TCR beta
MSIGLLCCAALSLLWAGPVNTGVTQTPKFQVLKTGQSMTLQCAQDMNHEYMSWYR
QDPGMGLRLIHYSVGAGITDQGEVPNGYNVSRSTTEDFPLRLLSAAPSQTSVYFCAS
SSGLAGASGEQYFGPGTRLTVTEDLKNVFPPEVAVFEPSEAEISHTQKATLVCLATGF
FPDHVELSWWVNGKEVHSGVCTDPQPLKEQPALNDSRYCLSSRLRVSATFWQNPR
NHFRCQVQFYGLSENDEWTQDRAKPVTQIVSAEAWGRADCGFTSVSYQQGVLSATI
LYEILLGKATLYAVLVSALVLMAMVKRKDF TCR alpha
MMKSLRVLLVILWLQLSWVWSQQKEVEQNSGPLSVPEGAIASLNCTYSDRGSQSFF
WYRQYSGKSPELIMFIYSNGDKEDGRFTAQLNKASQYVSLLIRDSQPSDSATYLCAV
RTDSWGKLQFGAGTQVVVTPDIQNPDPAVYQLRDSKSSDKSVCLFTDFDSQTNVSQ
SKDSDVYITDKCVLDMRSMDFKSNSAVAWSNKSDFACANAFNNSIIPEDTFFPSPES
SCDVKLVEKSFETDTNLNFQNLLVIVLRILLLKVAGFNLLMTLRLWSS

TCR beta
MLLLLLLLCPGSGLGAVVSQHPSRVICKSGTSVKIECRSLDFQATTMFWYRQFPKKS
LMLMATSNEGSKATYEQGVEKDKFLINHASLTLSTLTVTSAHPEDSSFYICSAKASE
QYFGPGTRLTVTEDLKNVFPPEVAVFEPSEAEISHTQKATLVCLATGFFPDHVELSW
WVNGKEVHSGVCTDPQPLKEQPALNDSRYCLSSRLRVSATFWQNPRNHFRCQVQF
YGLSENDEWTQDRAKPVTQIVSAEAWGRADCGFTSVSYQQGVLSATILYEILLGKAT
LYAVLVSALVLMAMVKRKDF TCR alpha
METLLGVSLVILWLQLARVNSQQGEEDPQALSIQEGENATMNCSYKTSINNLQWYR
QNSGRGLVHLILIRSNEREKHSGRLRVTLDTSKKSSSLLITASRAADTASYFCAADNY
GQNFVFGPGTRLSVLPYIQNPDPAVYQLRDSKSSDKSVCLFTDFDSQTNVSQSKDSD
VYITDKCVLDMRSMDFKSNSAVAWSNKSDFACANAFNNSIIPEDTFFPSPESSCDVK
LVEKSFETDTNLNFQNLLVIVLRILLLKVAGFNLLMTLRLWSS

TCR beta

MSLGLLCCAAFSLLWAGPVNAGVTQTPKFRVLKTGQSMTLLCAQDMNHEYMYWY
RQDPGMGLRLIHYSVGEGTTAKGEVPDGYNVSRLKKQNFLLGLESAAPSQTSVYFC
ASSYSRDRGWSEAFFGQGTRLTVVEDLNKVFPPEVAVFEPSEAEISHTQKATLVCLA
TGFFPDHVELSWWVNGKEVHSGVCTDPQPLKEQPALNDSRYCLSSRLRVSATFWQ
NPRNHFRCQVQFYGLSENDEWTQDRAKPVTQIVSAEAWGRADCGFTSVSYQQGVL
SATILYEILLGKATLYAVLVSALVLMAMVKRKDF

TCR alpha

MLTASLLRAVIASICVVSSMAQKVTQAQTEISVVEKEDVTLDCVYETRDTTYYLFWY
KQPPSGELVFLIRRNSFDEQNEISGRYSWNFQKSTSSFNFTITASQVVDSAVYFCALN
VMNRDDKIIFGKGTRLHILPNIQNPDPAVYQLRDSKSSDKSVCLFTDFDSQTNVSQS
KDSDVYITDKCVLDMRSMDFKSNSAVAWSNKSDFACANAFNNSIPEDTFFPSPESS
CDVKLVEKSFETDTNLNFQNLLVIVLRILLLKVAGFNLLMTLRLWSS

Fig. 11

ATL-7-47-8 (7-1)

TCR beta

MGTSLLCWMALCLLGADHADTGVSQDPRHKITKRGQNVTFRCDPISEHNRLYWYR
QTLGQGPEFLTYFQNEAQLEKSRLLSDRFSAERPKGSFSTLEIQRTEQGDSAMYLCA
SSPNRGTEVFFGQGTRLTVVEDLNKVFPPEVAVFEPSEAEISHTQKATLVCLATGFFP
DHVELSWWVNGKEVHSGVCTDPQPLKEQPALNDSRYCLSSRLRVSATFWQNPRNH
FRCQVQFYGLSENDEWTQDRAKPVTQIVSAEAWGRADCGFTSVSYQQGVLSATILY
EILLGKATLYAVLVSALVLMAMVKRKDF

TCR alpha

MEKMLECAFIVLWLQLGWLSGEDQVTQSPEALRLQEGESSSLNCSYTVSGLRGLFW
YRQDPGKGPEFLFTLYSAGEEKEKERLKATLTKKESFLHITAPKPEDSATYLCAAAD
TGGFKTIFGAGTRLFVKANIQNPDPAVYQLRDSKSSDKSVCLFTDFDSQTNVSQKD
SDVYITDKCVLDMRSMDFKSNSAVAWSNKSDFACANAFNNSIPEDTFFPSPESSCD
VKLVEKSFETDTNLNFQNLLVIVLRILLLKVAGFNLLMTLRLWSS

Fig. 12

ATL-7-52-7 (7-2)

TCR beta
MGTRLLCWMALCLLGADHADTGVSQDPRHKITKRGQNVTFRCDPISEHNRLYWYR
QTLGQGPEFLTYFQNEAQLEKSRLLSDRFSAERPKGSFSTLEIQRTEQGDSAMYLCA
SAEDRGEKLFFGSGTQLSVLEDLNKVFPPEVAVFEPSEAEISHTQKATLVCLATGFFP
DHVELSWWVNGKEVHSGVCTDPQPLKEQPALNDSRYCLSSRLRVSATFWQNPRNH
FRCQVQFYGLSENDEWTQDRAKPVTQIVSAEAWGRADCGFTSVSYQQGVLSATILY
EILLGKATLYAVLVSALVLMAMVKRKDF TCR alpha
METLLGLLILWLQLQWVSSKQEVTQIPAALSVPEGENLVLNCSFTDSAIYNLQWFRQ
DPGKGLTSLLLIQSSQREQTSGRLNASLDKSSGRSTLYIAASQPGDSATYLCAVSRGN
ARLMFGDGTQLVVKPNIQNPDPAVYQLRDSKSSDKSVCLFTDFDSQTNVSQSKDSD
VYITDKCVLDMRSMDFKSNSAVAWSNKSDFACANAFNNSIIPEDTFFPSPESSCDVK
LVEKSFETDTNLNFQNLLVIVLRILLLKVAGFNLLMTLRLWSS

Fig. 13

ATL-7-67-s7 (7-3)

TCR beta
MGSRLLCWMALCLLGADHADTGVSQDPRHKITKRGQNVTFRCDPISEHNRLYWYR
QTLGQGPEFLTYFQNEAQLEKSRLLSDRFSAERPKGSFSTLEIQRTEQGDSAMYLCA
SSPDRADTQYFGPGTRLTVLEDLKNVFPPEVAVFEPSEAEISHTQKATLVCLATGFFP
DHVELSWWVNGKEVHSGVCTDPQPLKEQPALNDSRYCLSSRLRVSATFWQNPRNH
FRCQVQFYGLSENDEWTQDRAKPVTQIVSAEAWGRADCGFTSVSYQQGVLSATILY
EILLGKATLYAVLVSALVLMAMVKRKDF TCR alpha
METLLGLLILWLQLQWVSSKQEVTQIPAALSVPEGENLVLNCSFTDSAIYNLQWFRQ
DPGKGLTSLLLIQSSQREQTSGRLNASLDKSSGRSTLYIAASQPGDSATYLCAVSRGN
NRLAFGKGNQVVVIPNIQNPDPAVYQLRDSKSSDKSVCLFTDFDSQTNVSQSKDSD
VYITDKCVLDMRSMDFKSNSAVAWSNKSDFACANAFNNSIIPEDTFFPSPESSCDVK
LVEKSFETDTNLNFQNLLVIVLRILLLKVAGFNLLMTLRLWSS

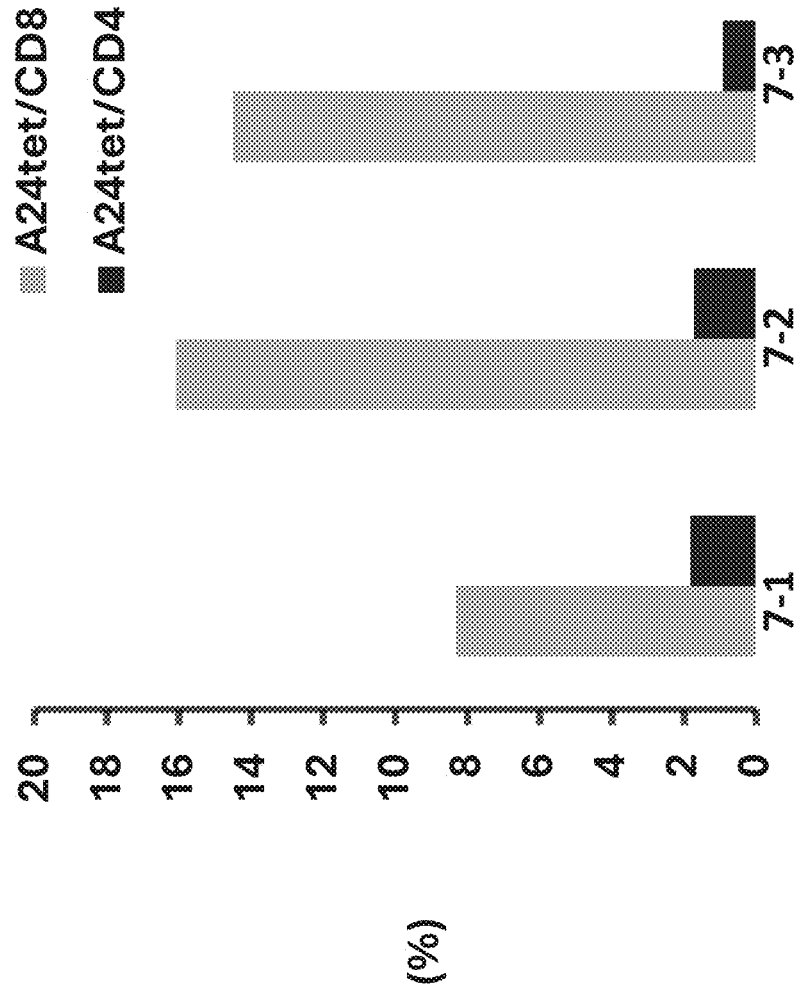

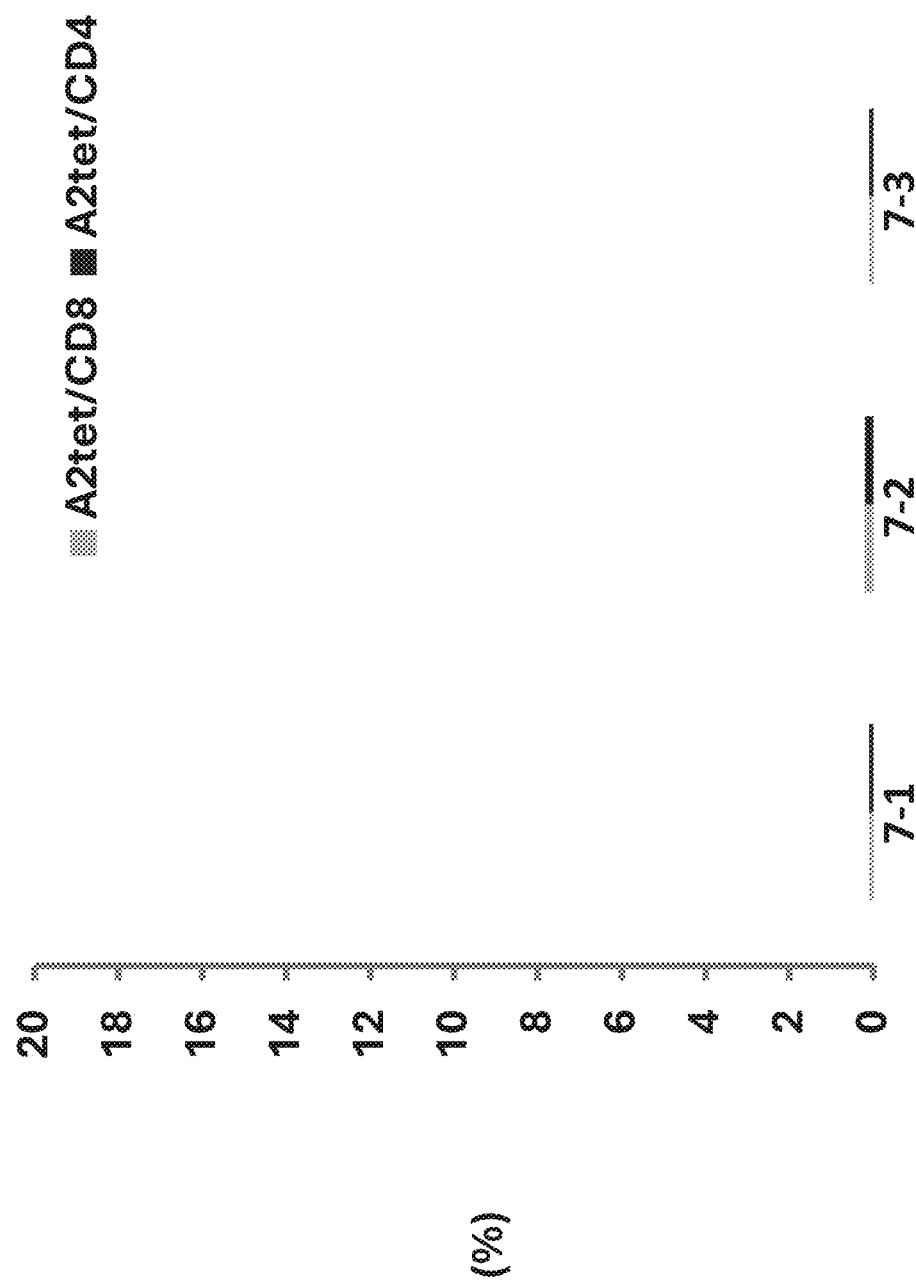

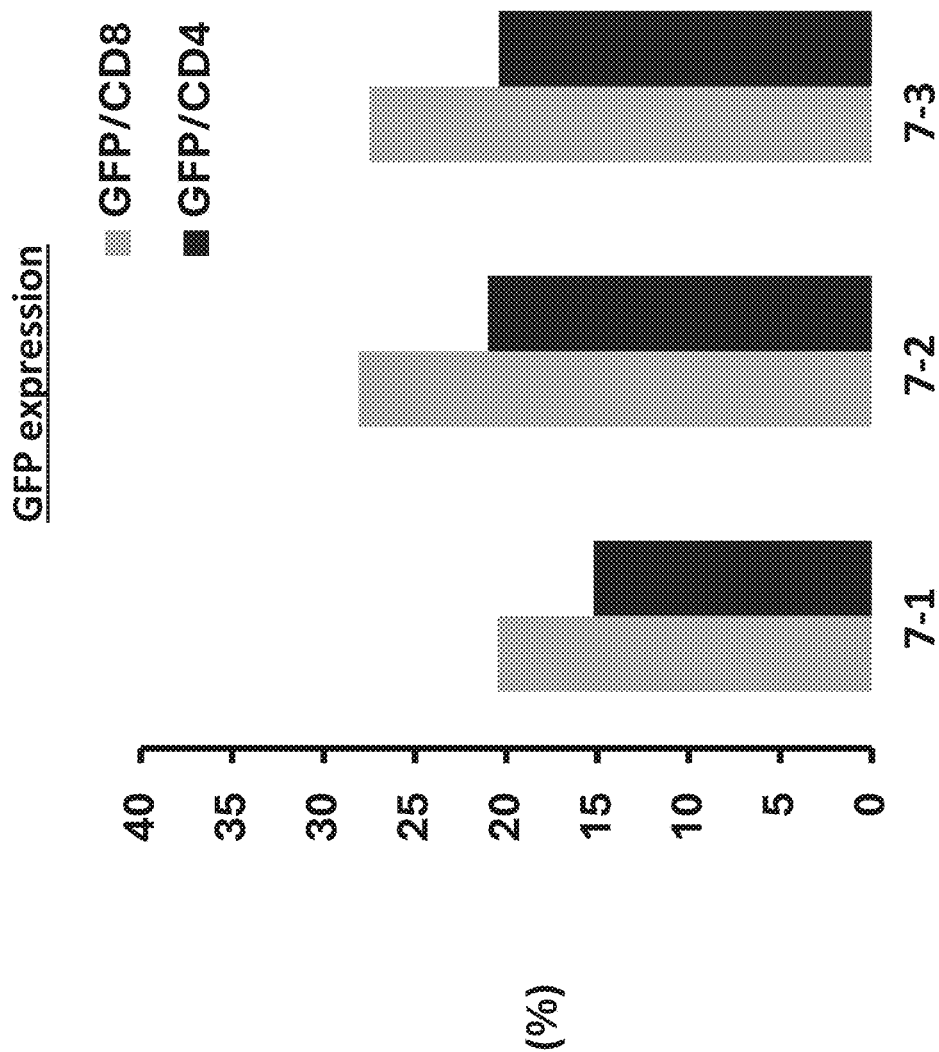

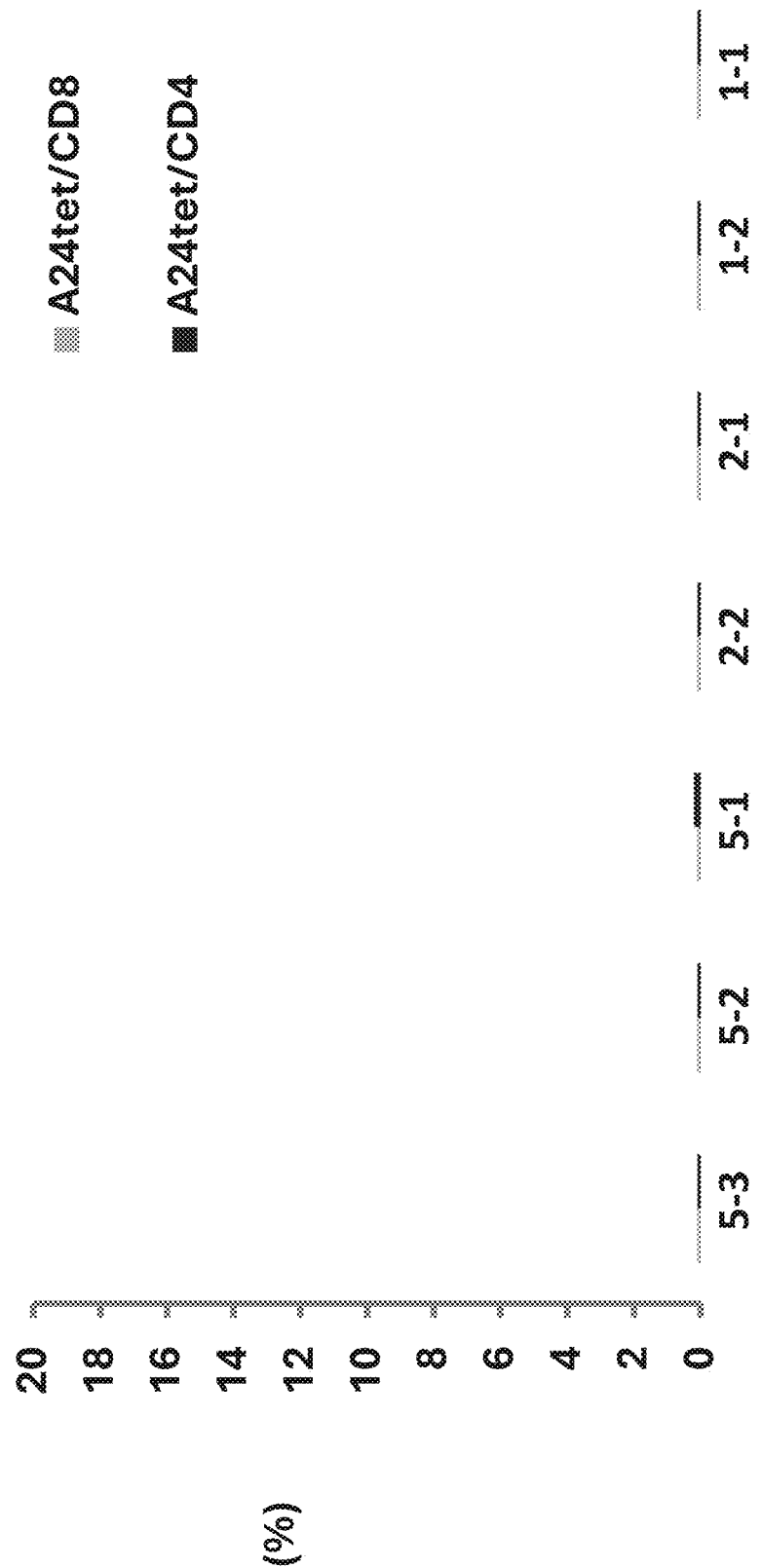

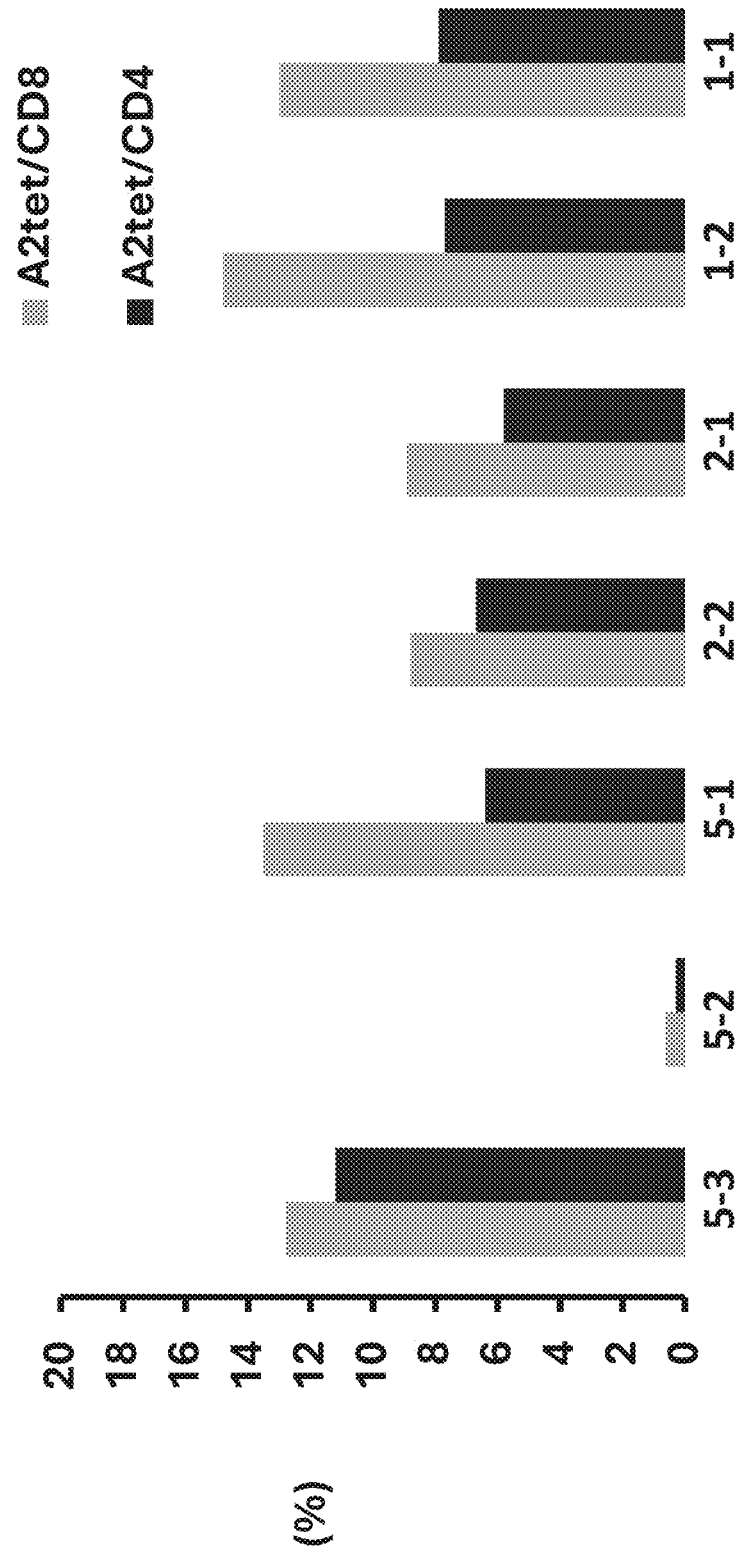

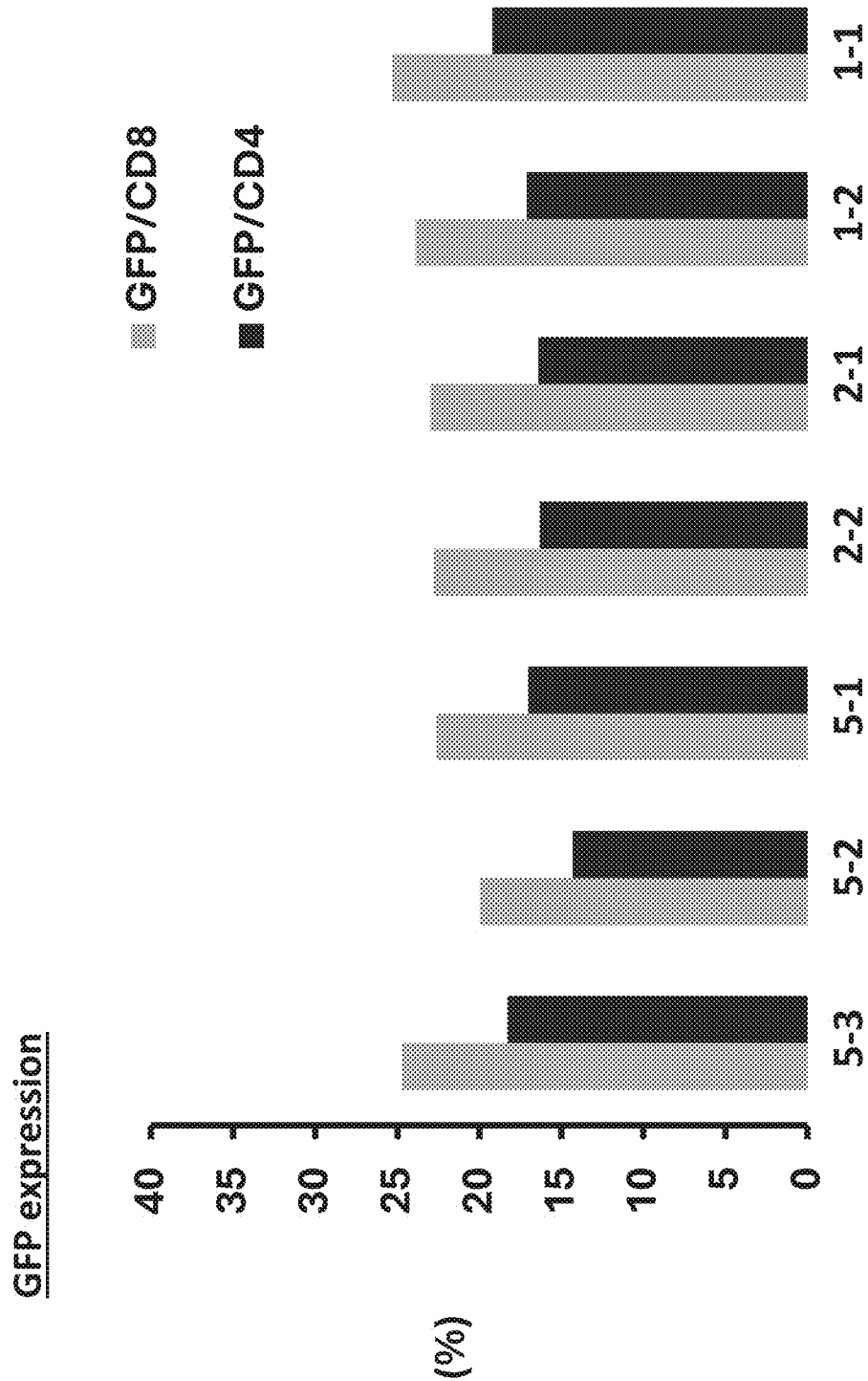

T-CELL RECEPTOR

CROSS-REFERENCE TO RELATED APPLICATIONS

This application is a U.S. National Stage application of PCT/JP2019/001182 filed 17 Jan. 2019, which claims priority to Japanese Application No. 2018-008947 filed 23 Jan. 2018, the entire disclosures of which are hereby incorporated by reference in their entireties.

SEQUENCE LISTING

The present application contains a Sequence Listing which has been submitted electronically in ASCII format and is hereby incorporated by reference in its entirety. Said ASCII copy, created on 7 Jul. 2020, is named P18-274WO_SEQUENCE_LISTING.txt and is 65 Kilobytes in size.

TECHNICAL FIELD

The present invention relates to a T-cell receptor and a method for screening the T-cell receptor.

BACKGROUND ART

In Japan, there are about 1 million people infected with human T-cell leukemia virus (HTLV-1), and about 2 to 5% develop adult T-cell leukemia (ATL) during their lifetime. Although multidrug chemotherapy and treatments such as allogeneic stem-cell transplantation have been attempted, further improvement is necessary. In addition, monotherapy using a recently approved anti-CCR4 antibody entails exacerbation of GVHD and inevitable relapse, when used in combination with transplantation. Therefore, the development of a safer and more effective treatment, especially a treatment aiming at cure, is an urgent issue.

Non-Patent Literature (NPL) 1 discloses that repertoire analysis was conducted on a cell population of HTLV-1 Tax antigen-specific cytotoxic T cells (CTL) in ATL patients.

CITATION LIST

Non-patent Literature

NPL 1: Tanaka Y. et al., Single-cell analysis of T-cell receptor repertoire of HTLV-1 Tax-specific cytotoxic T cells in allogeneic transplant recipients with adult T-cell leukemia/lymphoma, Cancer Research. 2010 Aug. 1; 70(15): 6181-92

SUMMARY OF INVENTION

Technical Problem

An object of the present invention is to provide a technique for preventing or treating HTLV-1-associated diseases, such as ATL, a material for use in the technique, a method for screening the material, and the like.

Solution to Problem

As a result of intensive research in view of the above problem, the present inventors found that a T-cell receptor (TCR) with higher affinity for HTLV-1-derived antigen can be screened by a method comprising the following steps: HTLV-1-derived antigen-recognizing cells sorted from cells derived from HTLV-1 patients are subjected to T-cell receptor (TCR) repertoire analysis, the TCR types are ranked in descending order of the number of cells of each TCR type, and a highly ranked TCR is selected. The inventors further found that the obtained TCR can be efficiently expressed in cells, and that cells expressing the TCR are cytotoxic against HTLV-1-infected cells. Based on these findings, the inventors further conducted intensive research and have accomplished the present invention.

Specifically, the present invention includes the following embodiments.

Item 1. A T-cell receptor having any one of the following features (A) to (J):

(A) comprising a β chain comprising β chain CDR3 comprising the amino acid sequence represented by SEQ ID NO: 3, and an α chain comprising α chain CDR3 comprising the amino acid sequence represented by SEQ ID NO: 8;

(B) comprising a β chain comprising β chain CDR3 comprising the amino acid sequence represented by SEQ ID NO: 13, and an α chain comprising α chain CDR3 comprising the amino acid sequence represented by SEQ ID NO: 18;

(C) comprising a β chain comprising β chain CDR3 comprising the amino acid sequence represented by SEQ ID NO: 23, and an α chain comprising α chain CDR3 comprising the amino acid sequence represented by SEQ ID NO: 28;

(D) comprising a β chain comprising β chain CDR3 comprising the amino acid sequence represented by SEQ ID NO: 33, and an α chain comprising α chain CDR3 comprising the amino acid sequence represented by SEQ ID NO: 38;

(E) comprising a β chain comprising β chain CDR3 comprising the amino acid sequence represented by SEQ ID NO: 43, and an α chain comprising α chain CDR3 comprising the amino acid sequence represented by SEQ ID NO: 48;

(F) comprising a β chain comprising β chain CDR3 comprising the amino acid sequence represented by SEQ ID NO: 53, and an α chain comprising α chain CDR3 comprising the amino acid sequence represented by SEQ ID NO: 58;

(G) comprising a β chain comprising β chain CDR3 comprising the amino acid sequence represented by SEQ ID NO: 63, and an α chain comprising α chain CDR3 comprising the amino acid sequence represented by SEQ ID NO: 68, (H) comprising a β chain comprising β chain CDR3 comprising the amino acid sequence represented by SEQ ID NO: 73, and an α chain comprising α chain CDR3 comprising the amino acid sequence represented by SEQ ID NO: 78, (I) comprising a β chain comprising β chain CDR3 comprising the amino acid sequence represented by SEQ ID NO: 83, and an α chain comprising α chain CDR3 comprising the amino acid sequence represented by SEQ ID NO: 88, and (J) comprising a β chain comprising β chain CDR3 comprising the amino acid sequence represented by SEQ ID NO: 93, and an α chain comprising α chain CDR3 comprising the amino acid sequence represented by SEQ ID NO: 98.

Item 2. The T-cell receptor according to Item 1, wherein in feature (A), the β chain comprises β chain CDR1 comprising the amino acid sequence represented by SEQ ID NO: 1 and β chain CDR2 comprising the amino acid sequence represented by SEQ ID NO: 2, and the α chain comprises α chain CDR1 comprising the amino acid sequence represented by SEQ ID NO: 6 and α chain CDR2 comprising the amino acid sequence represented by SEQ ID NO: 7;

in feature (B), the β chain comprises β chain CDR1 comprising the amino acid sequence represented by SEQ ID NO: 11 and β chain CDR2 comprising the amino acid sequence represented by SEQ ID NO: 12, and the α chain comprises α chain CDR1 comprising the amino acid sequence represented by SEQ ID NO: 16 and α chain CDR2 comprising the amino acid sequence represented by SEQ ID NO: 17;

in feature (C), the β chain comprises β chain CDR1 comprising the amino acid sequence represented by SEQ ID NO: 21 and β chain CDR2 comprising the amino acid sequence represented by SEQ ID NO: 22, and the α chain comprises α chain CDR1 comprising the amino acid sequence represented by SEQ ID NO: 26 and α chain CDR2 comprising the amino acid sequence represented by SEQ ID NO: 27;

in feature (D), the β chain comprises β chain CDR1 comprising the amino acid sequence represented by SEQ ID NO: 31 and β chain CDR2 comprising the amino acid sequence represented by SEQ ID NO: 32, and the α chain comprises α chain CDR1 comprising the amino acid sequence represented by SEQ ID NO: 36 and α chain CDR2 comprising the amino acid sequence represented by SEQ ID NO: 37;

in feature (E), the β chain comprises β chain CDR1 comprising the amino acid sequence represented by SEQ ID NO: 41 and β chain CDR2 comprising the amino acid sequence represented by SEQ ID NO: 42, and the α chain comprises α chain CDR1 comprising the amino acid sequence represented by SEQ ID NO: 46 and α chain CDR2 comprising the amino acid sequence represented by SEQ ID NO: 47;

in feature (F), the β chain comprises β chain CDR1 comprising the amino acid sequence represented by SEQ ID NO: 51 and β chain CDR2 comprising the amino acid sequence represented by SEQ ID NO: 52, and the α chain comprises α chain CDR1 comprising the amino acid sequence represented by SEQ ID NO: 56 and α chain CDR2 comprising the amino acid sequence represented by SEQ ID NO: 57;

in feature (G), the β chain comprises β chain CDR1 comprising the amino acid sequence represented by SEQ ID NO: 61 and β chain CDR2 comprising the amino acid sequence represented by SEQ ID NO: 62, and the α chain comprises α chain CDR1 comprising the amino acid sequence represented by SEQ ID NO: 66 and α chain CDR2 comprising the amino acid sequence represented by SEQ ID NO: 67;

in feature (H), the β chain comprises β chain CDR1 comprising the amino acid sequence represented by SEQ ID NO: 71 and β chain CDR2 comprising the amino acid sequence represented by SEQ ID NO: 72, and the α chain comprises α chain CDR1 comprising the amino acid sequence represented by SEQ ID NO: 76 and α chain CDR2 comprising the amino acid sequence represented by SEQ ID NO: 77;

in feature (I), the β chain comprises β chain CDR1 comprising the amino acid sequence represented by SEQ ID NO: 81 and β chain CDR2 comprising the amino acid sequence represented by SEQ ID NO: 82, and the α chain comprises α chain CDR1 comprising the amino acid sequence represented by SEQ ID NO: 86 and α chain CDR2 comprising the amino acid sequence represented by SEQ ID NO: 87; and in feature (J), the β chain comprises β chain CDR1 comprising the amino acid sequence represented by SEQ ID NO: 91 and β chain CDR2 comprising the amino acid sequence represented by SEQ ID NO: 92, and the α chain comprises α chain CDR1 comprising the amino acid sequence represented by SEQ ID NO: 96 and α chain CDR2 comprising the amino acid sequence represented by SEQ ID NO: 97.

Item 3. The T-cell receptor according to Item 1 or 2, which recognizes Tax antigen.

Item 4. The T-cell receptor according to any one of Items 1 to 3, which has feature (I) or (J).

Item 5. The T-cell receptor according to Item 4, which recognizes Tax antigen bound to HLA-A*24:02.

Item 6. One or more polynucleotides encoding the T-cell receptor of any one of Items 1 to 6.

Item 7. A cell comprising the one or more polynucleotides of Item 6.

Item 8. The cell according to Item 7, wherein the T-cell receptor of any one of Items 1 to 6 is expressed on a cell membrane.

Item 9. The cell according to Item 7 or 8, wherein the cell is a lymphocyte.

Item 10. The cell according to any one of Items 7 to 9, wherein the cell is a CD8-positive cell.

Item 11. The cell according to any one of Items 7 to 10, wherein the cell is a cell derived from a living organism carrying human T-cell leukemia virus.

Item 12. A prophylactic or therapeutic agent for a human T-cell leukemia virus-associated disease, comprising the cell of any one of Items 7 to 11.

Item 13. The therapeutic agent according to Item 12, wherein the human T-cell leukemia virus-associated disease is adult T-cell leukemia.

Item 14. A method for screening a T-cell receptor, comprising the steps of
  (i) sorting a cell population capable of recognizing human T-cell leukemia virus-derived antigen from cells derived from a living organism carrying human T-cell leukemia virus,
  (ii) subjecting the cell population to T-cell receptor repertoire analysis to determine the type of T-cell receptor of each cell and the number of cells of each T-cell receptor type, and
  (iii) ranking the T-cell receptor types in descending order of the number of cells of each T-cell receptor type, and selecting at least one highly ranked T-cell receptor.

Item 15. The screening method according to Item 14, wherein in step (iii), the at least one T-cell receptor is selected from a group consisting of T-cell receptors ranked first to fifth.

Advantageous Effects of Invention

According to the present invention, a technique for preventing or treating HTLV-1-associated diseases, such as ATL, a material for use in the technique, a method for screening the material, and the like, can be provided.

BRIEF DESCRIPTION OF DRAWINGS

FIG. 3 shows the results of repertoire analysis in Test Example 1. Each pie chart represents the number of cells subjected to repertoire analysis (number of cells in the cell population obtained by tetramer staining in Test Example 1). The sectors of the pie chart filled with each pattern represent the number of cells of the same TCR type in the population. The populations from which TCR clones, such as 1-1, 2-1, 5-1, and 7-1, were obtained are indicated with the clone number.

FIG. 4 shows the amino acid sequences from the N-terminal side of the β chain and β chain of TCR1-1. The constant regions are enclosed by ruled lines, and the underlining indicates CDR1, CDR2, and CDR3 in order from the N-terminal side (the same applies to FIGS. 5 to 13).

FIG. 5 shows the amino acid sequences from the N-terminal side of the β chain and α chain of TCR1-2.

FIG. 6 shows the amino acid sequences from the N-terminal side of the β chain and α chain of TCR2-1.

FIG. 7 shows the amino acid sequences from the N-terminal side of the β chain and α chain of TCR2-2.

FIG. 8 shows the amino acid sequences from the N-terminal side of the β chain and α chain of TCR5-1.

FIG. 9 shows the amino acid sequences from the N-terminal side of the β chain and α chain of TCR5-2.

FIG. 10 shows the amino acid sequences from the N-terminal side of the β chain and α chain of TCR5-3.

FIG. 11 shows the amino acid sequences from the N-terminal side of the β chain and α chain of TCR7-1.

FIG. 12 shows the amino acid sequences from the N-terminal side of the β chain and α chain of TCR7-2.

FIG. 13 shows the amino acid sequences from the N-terminal side of the β chain and α chain of TCR7-3.

FIGS. 14A-14C show the results of HLA-A*24:02-bound TCR expression analysis in Test Example 2. The two graphs on the left show the results of expression analysis by tetramer staining, and the one graph on the right shows the results of expression analysis by GFP expression. The legend shows the tetramer used and the cells under analysis (CD8-positive or CD4-positive).

FIGS. 15A-15C shows the results of HLA-A*02:01-bound TCR expression analysis in Test Example 2. The upper two graphs show the results of expression analysis by tetramer staining, and the lower one graph shows the results of expression analysis by GFP expression. The legend shows the tetramer used and the cells under analysis (CD8-positive or CD4-positive).

DESCRIPTION OF EMBODIMENTS

Figure 1:
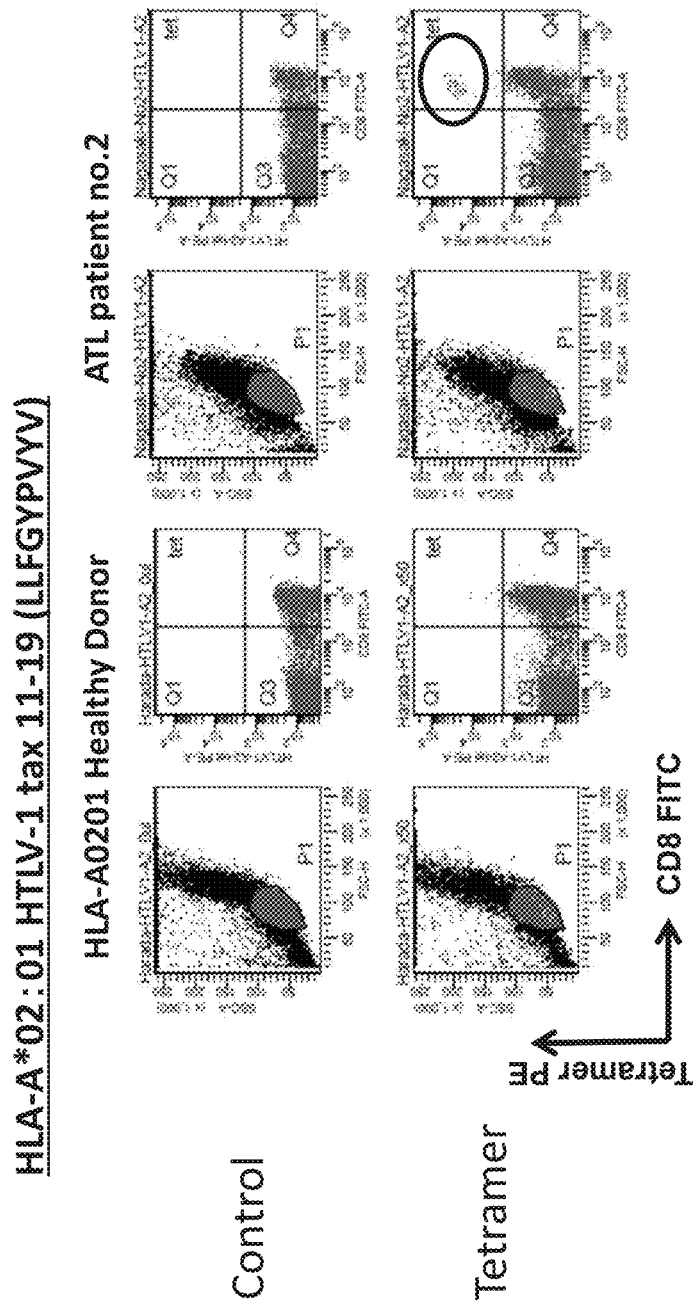
FIG. 1 shows the results of tetramer staining (Sample No. 2) in Test Example 1. The tetramer used for staining is shown at the top of FIG. 1. The Control shows the case without staining, and the Tetramer shows the case with staining. In each histogram, the ordinate indicates the degree of tetramer staining, and the abscissa indicates the degree of CD8 staining.

In the present specification, the terms "comprise" and "contain" include the concepts of comprising, containing, substantially consisting of, and consisting of.

The "identity" of amino acid sequences refers to the degree of matching of two or more comparable amino acid sequences. Thus, the higher the degree of matching between two given amino acid sequences, the higher the identity or similarity of those sequences. The level of amino acid sequence identity is determined, for example, by using FASTA, a tool for sequence analysis, with default parameters. Alternatively, the identity level can be determined by the algorithm BLAST developed by Karlin and Altschul (Karlin S, Altschul S F, "Methods for assessing the statistical significance of molecular sequence features by using general scoring schemes," Proc Natl Acad Sci USA, 87: 2264-2268 (1990); Karlin S, Altschul S F, "Applications and statistics for multiple high-scoring segments in molecular sequences," Proc Natl Acad Sci USA, 90: 5873-7 (1993)). A program called BLASTX based on this BLAST algorithm has been developed. Specific techniques for these analysis methods are known, and reference can be made to the National Center of Biotechnology Information (NCBI) website (http://www.ncbi.nlm.nih.gov/). The "identity" of base sequences is also defined in a manner similar to the above.

In the present specification, "conservative substitution" means that an amino acid residue is replaced by an amino acid residue having a similar side chain. Examples of conservative substitutions include substitution between amino acid residues having a basic side chain, such as lysine, arginine, and histidine. Other conservative substitutions include substitution between amino acid residues having an acidic side chain, such as aspartic acid and glutamic acid; substitution between amino acid residues having an uncharged polar side chain, such as glycine, asparagine, glutamine, serine, threonine, tyrosine, and cysteine; substitution between amino acid residues having a non-polar side chain, such as alanine, valine, leucine, isoleucine, proline, phenylalanine, methionine, and tryptophan; substitution between amino acid residues having a β-branched side chain, such as threonine, valine, and isoleucine; and substitution between amino acid residues having an aromatic side chain, such as tyrosine, phenylalanine, tryptophan, and histidine.

In the present specification, "CDR" is an abbreviation for Complementarity Determining Region, and is also referred to as "complementarity determining region." CDR is a region that is present in the variable region of TCR, and that is deeply involved in the specific binding of antibodies to antigens bound to MHC. "α chain CDR" refers to CDR present in the variable region of the α chain of TCR, and "β chain CDR" refers to CDR present in the variable region of the β chain of TCR.

In the present specification, the "variable region" refers to a region including CDR1 to CDR3 (referred to below simply as "CDRs 1 to 3") described above. The arrangement order of these CDRs 1 to 3 is not limited. Preferably, in this region, CDR1, CDR2, and CDR3 are arranged in this order in the N-terminal to C-terminal direction, or vice versa, continuously or via other amino acid sequences called "framework regions" (FRs), which are described below. The "α chain variable region" is a region in which the above α chain CDRs 1 to 3 are arranged, and the "β chain variable region" is a region in which the above β chain CDRs 1 to 3 are arranged.

The regions of each variable region other than the CDRs 1 to 3 mentioned above are called "framework regions" (FRs), as described above. Specifically, a region between the N-terminus of the variable region and CDR1 is defined as FR1, a region between CDR1 and CDR2 is defined as FR2, a region between CDR2 and CDR3 is defined as FR3, and a region between CDR3 and the C-terminus of the variable region is defined as FR4.

1. T-Cell Receptor

In one embodiment, the present invention relates to a T-cell receptor having any one of features (A) to (J) (also referred to herein as the "TCR of the present invention." This is described below.

Feature (A) is a feature that the T-cell receptor comprises a β chain comprising β chain CDR3 comprising the amino acid sequence represented by SEQ ID NO: 3, and an α chain comprising α chain CDR3 comprising the amino acid sequence represented by SEQ ID NO: 8. In feature (A), preferably, the β chain comprises β chain CDR1 comprising the amino acid sequence represented by SEQ ID NO: 1 and β chain CDR2 comprising the amino acid sequence represented by SEQ ID NO: 2, and the α chain comprises α chain CDR1 comprising the amino acid sequence represented by SEQ ID NO: 6 and α chain CDR2 comprising the amino acid sequence represented by SEQ ID NO: 7.

In feature (A), more preferably, the T-cell receptor comprises a β chain variable region comprising the amino acid sequence represented by SEQ ID NO: 4 or a variant sequence thereof, and comprises an α chain variable region comprising the amino acid sequence represented by SEQ ID NO: 9 or a variant sequence thereof.

In feature (A), the amino acid sequence of the constant region is not particularly limited as long as it has the functions of the constant region (for example, the function of penetrating the cell membrane and exposing the variable region to the cell surface). Preferably, the T-cell receptor comprises a β chain constant region comprising the amino acid sequence represented by SEQ ID NO: 5 or a variant sequence thereof, and comprises an α chain constant region comprising the amino acid sequence represented by SEQ ID NO: 10 or a variant sequence thereof.

Specific examples of the TCR having feature (A) include TCR1-1 described in the Examples.

Feature (B) is a feature that the T-cell receptor comprises a β chain comprising β chain CDR3 comprising the amino acid sequence represented by SEQ ID NO: 13, and an α chain comprising α chain CDR3 comprising the amino acid sequence represented by SEQ ID NO: 18.

In feature (B), preferably, the β chain comprises β chain CDR1 comprising the amino acid sequence represented by SEQ ID NO: 11 and β chain CDR2 comprising the amino acid sequence represented by SEQ ID NO: 12, and the α chain comprises α chain CDR1 comprising the amino acid sequence represented by SEQ ID NO: 16 and α chain CDR2 comprising the amino acid sequence represented by SEQ ID NO: 17.

In feature (B), more preferably, the T-cell receptor comprises a β chain variable region comprising the amino acid sequence represented by SEQ ID NO: 14 or a variant sequence thereof, and an α chain variable region comprising the amino acid sequence represented by SEQ ID NO: 19 or a variant sequence thereof.

In feature (B), the amino acid sequence of the constant region is not particularly limited as long as it has functions of the constant region (for example, the function of penetrating the cell membrane and exposing the variable region to the cell surface). Preferably, the T-cell receptor comprises a β chain constant region comprising the amino acid sequence represented by SEQ ID NO: 15 or a variant sequence thereof, and an α chain constant region comprising the amino acid sequence represented by SEQ ID NO: 20 or a variant sequence thereof.

Specific examples of the TCR having feature (B) include TCR1-2 in the Examples.

Feature (C) is a feature that the T-cell receptor comprises a β chain comprising β chain CDR3 comprising the amino acid sequence represented by SEQ ID NO: 23, and an α chain comprising α chain CDR3 comprising the amino acid sequence represented by SEQ ID NO: 28.

In feature (C), preferably, the β chain comprises β chain CDR1 comprising the amino acid sequence represented by SEQ ID NO: 21 and β chain CDR2 comprising the amino acid sequence represented by SEQ ID NO: 22, and the α chain comprises α chain CDR1 comprising the amino acid sequence represented by SEQ ID NO: 26 and α chain CDR2 comprising the amino acid sequence represented by SEQ ID NO: 27.

In feature (C), more preferably, the T-cell receptor comprises a β chain variable region comprising the amino acid sequence represented by SEQ ID NO: 24 or a variant sequence thereof, and an α chain variable region comprising the amino acid sequence represented by SEQ ID NO: 29 or a variant sequence thereof.

In feature (C), the amino acid sequence of the constant region is not particularly limited as long as the functions of the constant region (for example, the function of penetrating the cell membrane and exposing the variable region to the cell surface) are exhibited. Preferably, the T-cell receptor comprises a β chain constant region comprising the amino acid sequence represented by SEQ ID NO: 25 or a variant sequence thereof, and comprises an α chain constant region comprising the amino acid sequence represented by SEQ ID NO: 30 or a variant sequence thereof.

Specific examples of the TCR having feature (C) include TCR2-1 described in the Examples.

Feature (D) is a feature that the T-cell receptor comprises a β chain comprising a β chain CDR3 comprising the amino acid sequence represented by SEQ ID NO: 33, and an α chain comprising α chain CDR3 comprising the amino acid sequence represented by SEQ ID NO: 38.

In feature (D), preferably, the β chain comprises β chain CDR1 comprising the amino acid sequence represented by SEQ ID NO: 31 and β chain CDR2 comprising the amino acid sequence represented by SEQ ID NO: 32, and the α chain comprises α chain CDR1 comprising the amino acid sequence represented by SEQ ID NO: 36 and α chain CDR2 comprising the amino acid sequence represented by SEQ ID NO: 37.

In feature (D), more preferably, the T-cell receptor comprises a β chain variable region comprising the amino acid sequence represented by SEQ ID NO: 34 or a variant sequence thereof, and an α chain variable region comprising the amino acid sequence represented by SEQ ID NO: 39 or a variant sequence thereof.

In feature (D), the amino acid sequence of the constant region is not particularly limited as long as it has functions of the constant region (for example, the function of penetrating the cell membrane and exposing the variable region to the cell surface). Preferably, the T-cell receptor comprises a β-chain constant region comprising the amino acid sequence represented by SEQ ID NO: 35 or a variant sequence thereof, and an α-chain constant region comprising the amino acid sequence represented by SEQ ID NO: 40 or a variant sequence thereof.

Specific examples of the TCR having feature (D) include TCR2-2 described in the Examples.

Feature (E) is a feature that the T-cell receptor comprises a β chain comprising β chain CDR3 comprising the amino acid sequence represented by SEQ ID NO: 43, and an α chain comprising α chain CDR3 comprising the amino acid sequence represented by SEQ ID NO: 48.

In feature (E), preferably, the β chain comprises β chain CDR1 comprising the amino acid sequence represented by SEQ ID NO: 41 and β chain CDR2 comprising the amino acid sequence represented by SEQ ID NO: 42, and α chain CDR1 comprising the amino acid sequence represented by SEQ ID NO: 46 and α chain CDR2 comprising the amino acid sequence represented by SEQ ID NO: 47.

In feature (E), more preferably, the T-cell receptor comprises a β chain variable region comprising the amino acid sequence represented by SEQ ID NO: 44 or a variant sequence thereof, and an α chain variable region comprising the amino acid sequence represented by SEQ ID NO: 49 or a variant sequence thereof.

In feature (E), the amino acid sequence of the constant region is not particularly limited as long as it has functions of the constant region (for example, the function of penetrating the cell membrane and exposing the variable region to the cell surface). Preferably, the T-cell receptor comprises a β chain constant region comprising the amino acid sequence represented by SEQ ID NO: 45 or a variant sequence thereof, and an α chain constant region comprising the amino acid sequence represented by SEQ ID NO: 50 or a variant sequence thereof.

Specific examples of the TCR having feature (E) include TCR5-1 described in the Examples.

Feature (F) is a feature that the T-cell comprises a β chain comprising β chain CDR3 comprising the amino acid sequence represented by SEQ ID NO: 53, and an α chain comprising α chain CDR3 comprising the amino acid sequence represented by SEQ ID NO: 58.

In feature (F), preferably, the β chain comprises β chain CDR1 comprising the amino acid sequence represented by SEQ ID NO: 51 and β chain CDR2 comprising the amino acid sequence represented by SEQ ID NO: 52, and the α chain comprises α chain CDR1 comprising the amino acid sequence represented by SEQ ID NO: 56 and α chain CDR2 comprising the amino acid sequence represented by SEQ ID NO: 57.

In feature (F), more preferably, the T-cell receptor comprises a β chain variable region comprising the amino acid sequence represented by SEQ ID NO: 54 or a variant sequence thereof, and an α chain variable region comprising the amino acid sequence represented by SEQ ID NO: 59 or a variant sequence thereof.

In feature (F), the amino acid sequence of the constant region is not particularly limited as long as it has functions of the constant region (for example, the function of penetrating the cell membrane and exposing the variable region to the cell surface). Preferably, the T-cell receptor comprises a β chain constant region comprising the amino acid sequence represented by SEQ ID NO: 55 or a variant sequence thereof, and an α chain constant region comprising the amino acid sequence represented by SEQ ID NO: 60 or a variant sequence thereof.

Specific examples of the TCR having feature (F) include TCR5-2 described in the Examples.

Feature (G) is a feature that the T-cell receptor comprises a β chain comprising β chain CDR3 comprising the amino acid sequence represented by SEQ ID NO: 63, and an α chain comprising α chain CDR3 comprising the amino acid sequence represented by SEQ ID NO: 68.

In feature (G), preferably, the β chain comprises β chain CDR1 comprising the amino acid sequence represented by SEQ ID NO: 61 and β chain CDR2 comprising the amino acid sequence represented by SEQ ID NO: 62, and the α chain comprises α chain CDR1 comprising the amino acid sequence represented by SEQ ID NO: 66 and α chain CDR2 comprising the amino acid sequence represented by SEQ ID NO: 67.

In feature (G), more preferably, the T-cell receptor comprises a β chain variable region comprising the amino acid sequence represented by SEQ ID NO: 64 or a variant sequence thereof, and an α chain variable region comprising the amino acid sequence represented by SEQ ID NO: 69 or a variant sequence thereof.

In feature (G), the amino acid sequence of the constant region is not particularly limited as long as it has functions of the constant region (for example, the function of penetrating the cell membrane and exposing the variable region to the cell surface). Preferably, the T-cell receptor comprises a β chain constant region comprising the amino acid sequence represented by SEQ ID NO: 65 or a variant sequence thereof, and an α chain constant region comprising the amino acid sequence represented by SEQ ID NO: 70 or a variant sequence thereof.

Specific examples of the TCR having feature (G) include TCR5-3 described in the Examples.

Feature (H) is a feature that the T-cell receptor comprises a β chain comprising β chain CDR3 comprising the amino acid sequence represented by SEQ ID NO: 73, and an α chain comprising α chain CDR3 comprising the amino acid sequence represented by SEQ ID NO: 78.

In feature (H), preferably, the β chain comprises β chain CDR1 comprising the amino acid sequence represented by SEQ ID NO: 71 and β chain CDR2 comprising the amino acid sequence represented by SEQ ID NO: 72, and the α chain comprises α chain CDR1 comprising the amino acid sequence represented by SEQ ID NO: 76 and α chain CDR2 comprising the amino acid sequence represented by SEQ ID NO: 77.

In feature (H), more preferably, the T-cell receptor comprises a β chain variable region comprising the amino acid sequence represented by SEQ ID NO: 74 or a variant sequence thereof, and an α chain variable region comprising the amino acid sequence represented by SEQ ID NO: 79 or a variant sequence thereof.

In feature (H), the amino acid sequence of the constant region is not particularly limited as long as it has functions of the constant region (for example, the function of penetrating the cell membrane and exposing the variable region to the cell surface). Preferably, the T-cell receptor comprises a β-chain constant region comprising the amino acid sequence represented by SEQ ID NO: 75 or a variant sequence thereof, and an α-chain constant region comprising the amino acid sequence represented by SEQ ID NO: 80 or a variant sequence thereof.

Specific examples of the TCR having feature (H) include TCR7-1 described in the Examples.

Feature (I) is a feature that the T-cell receptor comprises a β chain comprising β chain CDR3 comprising the amino acid sequence represented by SEQ ID NO: 83, and an α chain comprising α chain CDR3 comprising the amino acid sequence represented by SEQ ID NO: 88.

In feature (I), preferably, the β chain comprises β chain CDR1 comprising the amino acid sequence represented by SEQ ID NO: 81 and β chain CDR2 comprising the amino acid sequence represented by SEQ ID NO: 82, and the α chain comprises α chain CDR1 comprising the amino acid sequence represented by SEQ ID NO: 86 and α chain CDR2 comprising the amino acid sequence represented by SEQ ID NO: 87.

In feature (I), more preferably, the T-cell receptor comprises a β chain variable region comprising the amino acid sequence represented by SEQ ID NO: 84 or a variant sequence thereof, and an α chain variable region comprising the amino acid sequence represented by SEQ ID NO: 89 or a variant sequence thereof.

In feature (I), the amino acid sequence of the constant region is not particularly limited as long as it has functions of the constant region (for example, the function of penetrating the cell membrane and exposing the variable region to the cell surface). Preferably, the T-cell receptor comprises a β-chain constant region comprising the amino acid sequence represented by SEQ ID NO: 85 or a variant sequence thereof, and an α-chain constant region comprising the amino acid sequence represented by SEQ ID NO: 90 or a variant sequence thereof.

Specific examples of the TCR having feature (I) include TCR7-2 described in the Examples.

Feature (J) is a feature that the T cell receptor comprises a β chain comprising a β chain CDR3 comprising the amino acid sequence represented by SEQ ID NO: 93, and an α chain comprising α chain CDR3 comprising the amino acid sequence represented by SEQ ID NO: 98.

In feature (J), preferably, the β chain comprises β chain CDR1 comprising the amino acid sequence represented by SEQ ID NO: 91 and β chain CDR2 comprising the amino acid sequence represented by SEQ ID NO: 92, and the α chain comprises α chain CDR1 comprising the amino acid sequence represented by SEQ ID NO: 96 and α chain CDR2 comprising the amino acid sequence represented by SEQ ID NO: 97.

In feature (J), more preferably, the T-cell receptor comprises a β chain variable region comprising the amino acid sequence represented by SEQ ID NO: 94 or a variant sequence thereof, and an α chain variable region comprising the amino acid sequence represented by SEQ ID NO: 99 or a variant sequence thereof.

In feature (J), the amino acid sequence of the constant region is not particularly limited as long as it has functions of the constant region (for example, the function of penetrating the cell membrane and exposing the variable region to the cell surface). Preferably, the T-cell receptor comprises a β-chain constant region comprising the amino acid sequence represented by SEQ ID NO: 95 or a variant sequence thereof, and an α-chain constant region comprising the amino acid sequence represented by SEQ ID NO: 100 or a variant sequence thereof.

Specific examples of the TCR having feature (J) include TCR7-3 in the Examples.

In the variable region, the variant sequence of the amino acid sequence represented by the specific sequence number above preferably has 90% or more identity, more preferably 95% or more identity, even more preferably 98% or more identity, still even more preferably 99% or more identity, to the amino acid sequence represented by the specific sequence number. The mutation site may be any site, but is preferably a site other than CDRs.

In the constant region, the variant sequence of the amino acid sequence represented by the specific sequence number preferably has 70% or more identity, more preferably 80% or more identity, even more preferably 85% or more identity, still more preferably 90% or more identity, still even more preferably 95% or more, yet still even more preferably 98% or more identity, to the amino acid sequence represented by the specific sequence number. The mutation site may be any site, but is preferably a site other than the cell membrane penetrating region.

The TCR of the present invention is capable of recognizing (preferably, specifically recognizing) Tax antigen, which is an HTLV-1-derived antigen. In a more specific embodiment, a TCR having any one of features (A) to (G) can recognize Tax antigen bound to HLA-A*02:01 (more specifically, $Tax_{p11-19}$ $_{(LLFGYPVYV)}$ (sequence number 101)), and a TCR having any one of features (H) to (J) can recognize Tax antigen bound to HLA-A*24:02 (more specifically, $Tax_{p301-309}$ $_{(SFHSLHLF)}$ (sequence number 102)).

The TCR of the present invention has high affinity for Tax antigen. The TCR of the present invention has affinity to such an extent that IFN-γ is produced at a concentration of Tax peptide of, for example, 1 nM or more, preferably 500 pM or more, more preferably 200 pM or more, still more preferably 100 pM or more, still even more preferably 50 pM or more, and particularly preferably 10 pM or more, in the affinity test by the stepwise peptide dilution method in Test Example 3 described below.

Among features (A) to (J), for example, feature (B), feature (C), feature (D), feature (G), feature (I), and feature (J) are preferable; feature (B), feature (D), feature (I), and feature (J) are more preferable; and feature (I) and feature (J) are even more preferable.

The TCR of the present invention may be chemically modified as long as it can recognize Tax antigen. In each TCR chain of the present invention, the C-terminus may be a carboxyl group (—COOH), a carboxylate (—COO⁻), an amide (—CONH$_2$), or an ester (—COOR). The group represented by R in the ester may be, for example, a $C_{1-6}$ alkyl group, such as methyl, ethyl, n-propyl, isopropyl, or n-butyl; a $C_{3-8}$ cycloalkyl group, such as cyclopentyl or cyclohexyl; a $C_{6-12}$ aryl group, such as phenyl or α-naphthyl; a phenyl-$C_{1-2}$ alkyl group, such as benzyl or phenethyl; a $C_{7-14}$ aralkyl group, such as an α-naphthyl-$C_{1-2}$ alkyl group, for example, α-naphthylmethyl; a pivaloyloxymethyl group; or the like.

In each TCR chain, a carboxyl group (or carboxylate) at a position other than the C-terminus may be amidated or esterified. Examples of the ester in this case include the C-terminal esters mentioned above. Further, the TCR chain of the present invention includes those wherein the amino group of the N-terminal amino acid residue is protected by a protecting group (e.g., a $C_{1-6}$ acyl group such as formyl, acetyl, or like $C_{1-6}$ alkanoyl); and those wherein the N-terminal glutamine residue that can be produced by cleavage in vivo is converted to pyroglutamic acid; those wherein a substituent (e.g., —OH, —SH, an amino group, an imidazole group, an indole group, or a guanidino group) on the side chain of an amino acid in the molecule is protected by an appropriate protecting group (e.g., a $C_{1-6}$ acyl group such as formyl, acetyl or like $C_{1-6}$ alkanoyl).

The TCR of the present invention may be one with a known protein tag, signal sequence, or like protein or peptide, or labeling substance added thereto as long as it is capable of recognizing Tax antigen. Examples of protein tags include biotin, His tag, FLAG tag, Halo tag, MBP tag, HA tag, Myc tag, V5 tag, PA tag, and the like. Examples of signal sequences include nuclear translocation signals.

The TCR of the present invention may be in the form of a pharmaceutically acceptable salt with an acid or a base. The salt is not particularly limited as long as it is pharmaceutically acceptable. The salt may be an acid salt or a basic salt. Examples of acid salts include inorganic acid salts, such as hydrochloride, hydrobromide, sulfate, nitrate, and phosphate; organic acid salts, such as acetate, propionate, tartrate, fumarate, maleate, malate, citrate, methanesulfonate, and paratoluenesulfonate; amino acid salts, such as aspartate and glutamate; and the like. Examples of basic salts include alkali metal salts, such as sodium salts and potassium salts; alkaline earth metal salts, such as calcium salts and magnesium salts; and the like.

The TCR of the present invention may be in the form of a solvate. The solvent is not particularly limited as long as it is pharmaceutically acceptable. Examples of solvents include water, ethanol, glycerol, acetic acid, and the like.

The method for producing the TCR of the present invention is not particularly limited. The TCR of the present invention can be produced, for example, by a method comprising the step of culturing a host transformed with a polynucleotide encoding the antibody of the invention (also referred to herein as the "polynucleotides of the invention"), and recovering a fraction containing the TCR of the invention.

The polynucleotide of the present invention is not particularly limited as long as it contains TCR of the present invention in an expressible state. The polynucleotide may contain other sequences in addition to the coding sequence of the TCR of the present invention. Examples of other sequences include a secretory signal peptide coding sequence to be arranged adjacent to the coding sequence of the TCR of the present invention, a promoter sequence, an enhancer sequence, a repressor sequence, an insulator sequence, a duplicate origin, a reporter protein (e.g., a fluorescent protein) coding sequence, a drug resistance gene coding sequence, and the like. Among these, the polynucleotide of the present invention preferably contains a reporter protein coding sequence from the viewpoint that cells having the polynucleotide of the present invention introduced into them can be easily detected (by FACS analysis etc.), sorted, concentrated, etc. The polynucleotide of the present invention may be a linear polynucleotide or a circular polynucleotide (e.g., a vector). The vector to be used is preferably a viral vector, and more preferably a retroviral vector. The polynucleotide of the present invention may be in a state of being included in a virus, such as a retrovirus.

Specific examples of the polynucleotide of the present invention include (I) a polynucleotide comprising a base sequence encoding at least one member selected from the group consisting of the β chain, β chain variable region, and β chain CDRs 1 to 3 of the TCR of the present invention; (II) a polynucleotide comprising a base sequence encoding at least one member selected from the group consisting of the α chain, α chain variable region, and α chain CDRs 1 to 3 of the TCR of the present invention; (III) a nucleic acid comprising a base sequence encoding at least one member selected from the group consisting of the β chain, β chain variable region, and β chain CDRs 1 to 3 of the TCR of the present invention, and a polynucleotide comprising a base sequence encoding at least one member selected from the group consisting of the α chain, α chain variable region, and α chain CDRs 1 to 3 of the TCR of the present invention; (IV) a combination of two or more comprising the above (I) and (II); and the like.

In the case of (III) above, in order to enable more efficient expression of the TCR of the present invention encoded by the polynucleotide of the present invention, it is preferable that the region encoding the β chain or the like and the region encoding the α chain or the like are expressed as a single polypeptide and that a linker, which is cleaved after expression, is connected through the coding region. For the same reason, the polynucleotide of the present invention is preferably provided with a region encoding a short-stranded RNA (e.g., siRNA, miRNA) that inhibits the expression of endogenous TCR. These techniques are publicly known and can be used in accordance with previously reported information.

The hosts are not particularly limited, and examples include insect cells, eukaryotic cells, mammalian cells, and the like.

The methods for transformation, culture, and recovery are not particularly limited, and known methods in TCR production can be used.

After recovery, the TCR of the present invention may be purified, if necessary. Purification can be performed by known methods in protein production, such as chromatography and dialysis.

2. Cell

In one embodiment, the present invention relates to a cell containing the polynucleotide of the present invention (also referred to herein as "the cell of the present invention.") This is explained below.

The cells from which the cell of the present invention is derived are not particularly limited. For the purpose of using the cell of the present invention in the above method for producing the TCR of the present invention, for example, cells that can be used for protein expression (e.g., insect cells, eukaryotic cells, mammalian cells) can be used as the origin cells. Alternatively, for the purpose of using the cell of the present invention as a prophylactic or therapeutic agent for HTLV-1-associated diseases as described below, examples of the origin cells include peripheral blood mononuclear cells, preferably lymphocytes, more preferably T cells, and even more preferably CD8- or CD4- (preferably CD8-) positive T cells. For the latter purpose, the origin cells are preferably cells derived from a living organism carrying HTLV-1, more preferably a patient with an HTLV-1-associated disease, and even more preferably an ALT patient.

The cell of the present invention preferably expresses the TCR of the present invention. In a more specific embodiment of the cell of the present invention, the TCR of the present invention is expressed on the cell membrane, and preferably expressed in such a state that the variable region of the TCR is exposed outside the cell membrane.

The cell of the present invention can be obtained by introducing the polynucleotide of the present invention into cells. If necessary, the cell containing the polynucleotide of the present invention may be concentrated, or may be concentrated using a specific marker (CD antigen, such as CD8) as an indicator.

3. Prophylactic or Therapeutic Agent for Human T-cell Leukemia Virus-associated Disease In one embodiment, the present invention relates to a prophylactic or therapeutic agent for an HTLV-1-associated disease comprising the cell of the present invention (also referred to herein as the "agent of the present invention"). This is described below.

The cell for use in this embodiment is the same as the cell for use in the "2. Cell" section above for the same purpose as this embodiment. Preferably, the cell is derived from a patient to be subjected to treatment or prevention.

Examples of HTLV-1-associated diseases include ATL, HAM (HTLV-1 associated myelopathy), HAB (HTLV-I associated bronchitis), HAU (HTLV-I associated uveitis), and the like. Among these, ATL is preferable.

The agent of the present invention can also be used in combination with other prophylactic or therapeutic agents for HTLV-1-associated diseases. Examples of other prophylactic or therapeutic agents include anti-CCR4 antibody and the like.

The content of the active ingredient (the cell of the present invention) in the agent of the present invention can be appropriately set in consideration of the type of target disease, desired therapeutic effects, administration method, treatment period, patient's age, patient's body weight, etc. For example, the content of the active ingredient in the agent of the present invention can be set to about 0.0001 parts by weight to about 100 parts by weight, based on 100 parts by weight of the entire agent of the present invention.

The administration form of the agent of the present invention is not particularly limited as long as the desired effects are obtained. The agent of the present invention is usually administered by parenteral administration (e.g., intravenous injection, intramuscular injection, or subcutaneous administration), and preferably by intravenous injection. The dosage forms and their production methods are well known to those skilled in the art. The agent of the present invention can be produced according to a standard method by mixing the active ingredient with a pharmaceutically acceptable carrier etc.

Examples of dosage forms for parenteral administration include injectable preparations (e.g., intravenous drip infusion, intravenous injection, intramuscular injection, subcutaneous injection, and endodermic injection), and the like. For example, an injection preparation can be prepared by dissolving the cell of the present invention in distilled water for injection, and optionally adding a solubilizer, a buffer, a pH adjuster, an isotonizing agent, a soothing agent, a preservative, a stabilizer, etc.

The carrier used for formulating the agent of the present invention may contain excipients, binders, disintegrators, lubricants, coloring agents, and flavoring agents that are generally used in this technical field, and may optionally contain stabilizers, emulsifiers, absorption enhancers, surfactants, pH adjusters, antiseptics, antioxidants, extenders, moisturizers, surface activators, dispersants, buffers, preservatives, solubilizers, soothing agents, and the like.

The dose of the agent of the present invention can be determined by clinical doctors based on various factors, such as the administration route, the type of disease, the degree of symptoms, the age, sex, and body weight of the patient, the severity of disease, pharmacological findings, such as drug kinetics and toxicological characteristics, whether a drug delivery system is used, and whether the agent is administered as part of a combination with other drugs. The dose of the agent of the present invention can be set to, for example, about 1 μg/kg (body weight) to about 10 g/kg (body weight) per day. The administration schedule of the agent of the present invention can also be determined in consideration of the same factors as those for the dose. For example, the agent of the present invention can be administered in the above dose per day once a day to once a month.

4. Method for Screening T-Cell Receptor

In one embodiment, the present invention relates to a method for screening a T-cell receptor, which includes steps (i) to (iii), (also referred to herein as the "screening method of the present invention"). This is described below.

4-1. Step (i)

Step (i) is a step of sorting a cell population capable of recognizing HTLV-1-derived antigen from cells derived from a living organism carrying HTLV-1.

The living organism carrying HTLV-1 is not particularly limited, but is preferably an organism that is a current or former patient of an HTLV-1-associated disease, more preferably an ATL patient or a former ATL patient, and more preferably an ATL patient who has remained in remission for a long period of time (e.g., 1 year or more, preferably more 3 years or more, more preferably 6 years or more, and even more preferably 10 years or more), or a former ATL patient.

The cell population capable of recognizing HTLV-1-derived antigen can be paraphrased as a cell population that binds to HTLV-1. This cell population includes cells that have a TCR against HTLV-1-derived antigen.

The HTLV-1-derived antigen is preferably Tax antigen. The antigen is preferably Tax antigen bound to HLA-A (e.g., HLA-A*24:02, HLA-A*02:01, HLA-A*11:01, HLA-A*40:02, HLA-A*26:01, HLA-A*40:06, HLA-A*02:07, HLA-A*39:01, or the like, more preferably HLA-A*24:02, HLA-A*02:01, HLA-A*11:01, HLA-A*40:02, HLA-A*26:01, or the like, even more preferably HLA-A*24:02, HLA-A*02:01, or the like, and still more preferably HLA-A*24:02 or the like).

The cell population can be sorted according to a known method. For example, the following method is preferable. A cell population (e.g., PBMCs) that is derived from the living organism mentioned above and that can include cells having TCR against HTLV-1-derived antigen is used as the starting material. This cell population is labeled with a complex comprising a label and HTLV-1-derived antigen (or a complex comprising HTLV-1-derived antigen and HLA), and the cells are isolated by FACS using the label as an indicator. Preferably, the HTLV-1-derived antigen (or a complex comprising HTLV-1-derived antigen and HLA) is multimerized (e.g., tetramerized) by using a specific binding substance (e.g., streptavidin and biotin) and used.

The obtained cell population is subjected to step (ii).

4-2. Step (ii)

Step (ii) is a step of performing TCR repertoire analysis on the cell population to determine the type of TCR of each cell and the number of cells of each type.

The repertoire analysis can be performed according to a known method. For example, the analysis can be performed by extracting RNA from each cell of the cell population obtained in step (i) and determining the base sequence of the TCR gene.

If the results of the repertoire analysis show that there are multiple cells having the same type of TCR (i.e., amino acid sequence), the number of the cells is counted. If there are no cells that have the same type of TCR (i.e., amino acid sequence) among the cells, the screening is stopped there, and step (i) is performed again using another living organism carrying HTLV-1.

The obtained information is used in step (iii).

4-3. Step (iii)

Step (iii) is a step of ranking the TCR types in descending order of the number of cells of each type and selecting highly ranked TCRs.

The TCR types are ranked in descending order of the number of cells of each type. That is, if there are 8 cells with type A TCR, 5 cells with type B TCR, 4 cells with type C TCR, 4 cells with type D TCR, 3 cells with type E TCR, and 2 cells with type F TCR, and so on, then the ranking of TCR types is, from the first place, type A, type B, type C, type D, type E, and type F.

After ranking, cells of a more highly ranked TCR type are selected. The term "highly ranked" as used herein is not particularly limited, but preferably refers to being ranked first to fifth, and more preferably being ranked first to third.

The TCR type to be selected does not have to be the most highly ranked TCR type, nor does it have to be selected in order of the higher ranking. For example, if TCR types are to be selected from those ranked first to third, TCR types ranked second and third may be selected, or those ranked first and third may be selected, or, of course, all the TCR types ranked first to third may be selected.

By selecting TCR by the screening method of the present invention, TCR with a higher affinity for HTLV-1 antigen can be obtained with a higher probability.

The selected type of TCR can be produced according to the method described above in the "1. T-cell receptor" section. Further, the selected type of TCR can also be used as the cell of the present invention, the agent of the present invention, etc. according to the methods described above in the "2. Cell" section and "3. Prophylactic or Therapeutic Agent for Human T Cell Leukemia Virus-Associated Disease" section.

EXAMPLES

The present invention is described in detail below based on Examples. However, the present invention is not limited to these examples.

Materials and Methods

The materials and methods used in the experiments of the Test Examples described below were prepared and performed in the following manner unless otherwise specified.

Material and Method 1: Preparation of Lymphocyte

Human lymphocytes were obtained by isolating PBMCs (peripheral blood mononuclear cells) from healthy donor blood using Ficoll-Paque (registered trademark) PLUS (17-1440-03, GE Healthcare). Collection and analysis of specimens containing human peripheral blood or the like used in this study and analysis were conducted in accordance with the Declaration of Helsinki, based on the protocol that was approved by the Research Ethics Committee of Mie University School of Medicine, with the written consent of the subjects. The collected samples were stored in an anti-theft refrigerator or liquid nitrogen tank that was encrypted so as not to allow for identificaton of the subjects. The personal information of each subject was anonymized, and strict precautions and measures were taken to ensure that personal privacy and the results of genetic analysis would not be leaked to the outside world.

Material and Method 2: Gene Transfer into Cells

A retroviral vector was used for TCR gene transfer into human lymphocytes. Human TCR gene expression vectors were transfected with genes for HLA-A*02:01 or HLA-A*24:02-bound Tax-specific TCRs obtained ex vivo by single-cell sorting of tetramer-positive CD8-positive T cells from the patient's peripheral blood. The obtained structure comprises α chain gene and β chain gene of the TCR incorporated between the LTRs (long terminal repeat) at both ends, including enhancers and promoters.

Human transgenic cells were prepared by stimulating PBMCs isolated from peripheral blood using Ficoll with 5 μg/mL of Anti-CD3 antibody (OKT-3, eBioscience) and 25 μg/mL of RetroNectin (registered trademark) for 4 days. A virus fluid of the retrovirus vector was added at 1 mL/well to multidishes for floating cells, which had been coated with 20 μL/mL of RetroNectin (registered trademark) in ACD-A solution (TERUMO (registered trademark)) at 500 mL/well (16 hours at 4° C. or 2 hours at 25° C.), and preloading was performed by centrifugation (2000× g, 2 hours, 32° C.). Subsequently, this was washed twice with 1 mL of PBS containing 1.5% HSA, into which human lymphocytes were seeded at $3.8\times10^5$ or less/0.95 mL/well, and the cells were sedimented by centrifugation (1000× g, 10 min, 32° C.). After microscopic examination, the cells were cultured for 1 day in a 5% $CO_2$ incubator at 37° C. in the presence of IL-2 at 600 IU/mL. After 24 hours, the cells were diluted 4/3-fold and a second gene transfer was performed in the same manner as the first time using the total volume. The cells were then cultured. After 4 hours, the cells were diluted with 6.8 mL of medium and cultured again at 37° C. and 5% $CO_2$. For the experiment, cells at least 6 days after the gene transfer were used. GT-T551 (KB503, Takara Bio) adjusted to contain IL-2 at 600 IU/mL, 0.2% albuminer, and 0.6% plasma derived from a healthy donor was prepared and used as medium. Non-transgenic cells were prepared by stimulation with anti-CD3 antibody and RetroNectin (registered trademark) for 4 days, and then incubation in the presence of IL-2 at 600 IU/mL for 6 days or more, in the same manner as for the transgenic cells.

The experiment for introducing a tumor antigen-specific TCR into human peripheral blood mononuclear cells using a retrovirus has been approved by the Recombinant DNA Experiment Safety Committee of Mie University and the Research Ethics Committee of Mie University School of Medicine. These experiments were conducted in a P2-level laboratory approved by Mie University.

Material and Method 3: Flow Cytometry and Cell Sorting

Stained cells were analyzed by BD FACS Canto™ IIFlow Cytometry (Becton Dickinson). BD FACSAria™ Cell Sorter (Becton Dickinson) was used for cell sorting.

Material and Method 4: Tetramer Staining Method

In vitro-stimulated PBMCs were infected with retroviruses, and cells after 8 to 11 days of culture in which the desired TCR gene was expressed were washed twice with 2% FCS-PBS. Tax tetramer diluted 50-fold in 2% FCS-PBS was then added to the cells and a reaction was allowed to proceed in the dark at 37° C. for 15 minutes. The cells were then stained with FITC conjugated Human Anti-CD8 antibody (Becton Dickinson) (4° C., 15 min, shaded), washed twice with 2% FCS-PBS, and analyzed with a BD FACS Canto™ Flow Cytometer.

Material and Method 5: $^{51}$Cr Release Assay

Target cells were suspended in 100% FCS at $1 \times 10^6$ cells/100 μL, and $^{51}$Cr was added thereto. After culturing in a $CO_2$ incubator for 1 hour, the cells were washed with a medium (10% FCS in RPMI1640). The cells were suspended at $1 \times 10^5$/mL in a medium (10% FCS in RPMI1640), and seeded at $1 \times 10^4$/100 μL/well. Effector cells suspended at $2 \times 10^5$/100 μL in medium (10% FCS in RPMI1640) were mixed in an amount of 100 μL with the target cells, and cultured in a $CO_2$ incubator for 4 hours. After the reaction was completed, the supernatant of the cell mixture was dried overnight, and the amount of $^{51}$Cr released from the target cells was measured by a scintillation counter.

Material and Method 6: Patient Samples Used

Patients' PBMCs provided by the Japanese Red Cross Society Nagasaki Atomic Bomb Hospital were used. After the onset of ATL, symptoms of the patients were stabilized by chemotherapy and the patients remained in long-term remission. The table below summarizes information on the patient samples.

TABLE 1

| | Sample No. | | | |
| --- | --- | --- | --- | --- |
| | No. 1 | No. 2 | No. 5 | No. 7 |
| HLA | HLA-A*02:01 | HLA-A*02:01 | HLA-A*02:01 | HLA-A*24:02 |

Material and Method 7: Naming of Acquired Tax-specific TCRs

Ten kinds of TCRs were obtained from the above 4 patients. For the sake of convenience, TCR genes from sample No. 5 were named 5-1, 5-2, and 5-3. Similarly, TCR genes from sample No. 1 were named 1-1 and 1-2; TCR genes from sample No. 2 were named 2-1 and 2-2; and TCR genes from sample No. 7 were named 7-1, 7-2, and 7-3.

Material and Method 8: Real-time PCR Method (1) Cell Sampling

Cells were washed with PBS(−) and then RLT buffer was added to create a cell suspension. The cell suspension was stored in a deep freezer at −80° C. until RNA extraction was performed. RNA was extracted using an Rneasy Mini kit and an Rnse-free DNase Set.

(2) Reverse Transcription Reaction (Reverse Transcription; RT)

Sample RT was prepared by adding reverse transcriptase to each sample and performing an RT reaction. A tube prepared (by mixing the sample with reaction solution Oligo dT primer, Template RNA, and dNTP mixture (10 mM)) was set in a thermal cycler, incubated at 65° C. for 10 minutes, and then cooled on ice. A reverse transcription reaction was performed by adding reagents 5× Primescript buffer RNase Inhibitor, Primescript RTase, and RNase free dH20 to the denatured and annealed solution.

(3) PCR Reaction

PCR was performed by mixing the 10×PCR buffer dNTP mixture, upstream primer, downstream primer, sterilized water, reverse transcription reaction solution of (2), and sterile water.

Material and Method 9: TCR Repertoire Analysis

RNA extracted from individual isolated CD8-positive T cells was converted to cDNA. After amplification of the Vα and Vb regions, sequence analysis was performed. The type of TCR repertoire possessed by the tetramer-positive cell population was determined from the obtained data.

Material and Method 10: Gibson Assembly Method

The Gibson Assembly method refers to a method of performing three different enzymatic reactions in a single buffer, whereby multiple DNA fragments can be connected together, regardless of the size or terminus configuration of the DNA fragments. DNA frayments each comprising a 15-base homologous sequence at an end are mixed with Gibson Assembly master mix and incubated for 160 minutes. Exonuclease created a single-stranded 3' overhang to allow one strand to anneal to the other complementary strand (the overlapping site), polymerase filled the gap between each annealed fragment, and DNA ligase connected nicks together to connect DNA fragements.

Material and Method 11: Retroviral Vector pMXs-IRES-GFP Retroviral Vector (Cosmo Bio Inc.) was used. The vector prepared by restriction enzyme treatment and TCR Vα, Vβ, Cα, Cβ genes amplified by PCR were connected by the Gibson assembly method.

Material and Method 12: ELISA

A kit from eBioscience was used. As coating buffer, 10× coating buffer was prepared by 10-fold dilution with DW. 48 μL of primary antibody was added to 12 mL of the coating buffer, and the resulting mixture was added to a 96-well flat-bottom plate at 100 μL/well and allowed to stand at 4° C. overnight. The plate was washed 5 times with 0.05% PBS-T. As assay diluents, 5× assay diluents were prepared by 5-fold dilution with DW. The assay diluents were added at 200 μL/well. Blocking was performed at room temperature for 1 hour. The plate was washed 5 times with 0.05% PBS-T. To prepare reference samples, the highest concentration of IFN-γ was adjusted to 1000 μg/mL, and diluted in 7 stages by repeating 2-fold dilution. Each sample and reference sample were placed on the plate. The reaction was allowed to proceed at room temperature for 2 hours. The plate was washed with 0.05% PBS-T 5 times. 48 μL of secondary antibody was added to 12 mL of the assay diluents and 100 μL of the resulting mixture was added to each well. The reaction was allowed to proceed at room temperature for 1 hour. The plate was washed with 0.05% PBS-T 5 times. 48 μL of Streptavidin-HRP was added to 12 mL of assay diluents, and the resulting mixture was added at 100 μL/well. The reaction was allowed to proceed at room temperature in the dark for 30 minutes. The wells were washed with 0.05% PBS-T 7 times. TMB substrate solution was added at 100 μL/well. A reaction was allowed to proceed at room temperature in the dark for 15 minutes, and 0.18M $H_2SO_4$ was added at 50 μL/well to stop the reaction. Measurement was performed immediately at a wavelength of 450 nm using a Model 680 microplate reader (Bio-Rad).

Materials and Methods 13: Isolation of Tetramer-Positive T Cells

The peripheral blood of each patient was thawed and then washed with 2% FCS-PBS twice. Using a tube, PE-labeled HLA-A*02:01/$Tax_{p11-19}$ $_{(LLFGYPVYV)}$ (SEQ ID NO: 101) or HLA-A*24:02/$Tax_{p301-309}$ $_{(SFHSLHLLF)}$ (SEQ ID NO: 102) tetramer was added and a reaction was allowed to proceed in the dark at 37° C. for 15 minutes. FITC-labeled anti-human CD8 antibody was then added and a reaction was allowed to proceed at 4° C. in the dark for 15 minutes. After washing with 2% FCS-PBS twice, CD8-positive tetramer-positive T cells were isolated with a BD FACS Aria™ Cell Sorter (Beckton Dickinson). The cells were suspended in a PBS (−) solution at 1 cell/well in a 96-well plate.

Material and Method 14: Acquisition of TCR α Chain and β Chain Gene Sequences from Isolated T Cells The TCR α and β gene sequences of isolated T cells were obtained by using a method previously reported (WO2014017533). The base sequences were determined by sequence analysis of the PCR products. Their TCR repertoire was analyzed using an IMGT/V-Quest tool (http://www.imgt.org/).

Figure 2:
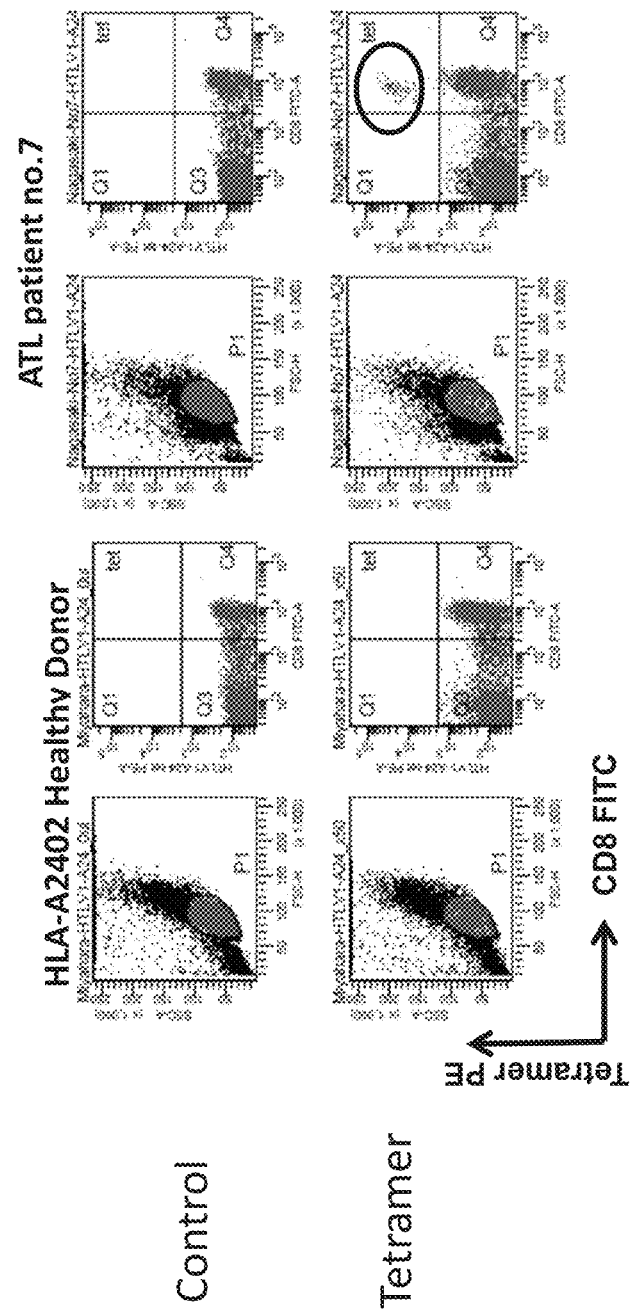
FIG. 2 shows the results of tetramer staining (Sample No. 7) in Test Example 1. The tetramer used for staining is shown at the top of FIG. 2. The Control shows the case without staining and the Tetramer shows the case with staining. In each histogram, the ordinate indicates the degree of tetramer staining, and the abscissa indicates the degree of CD8 staining.
Figure 16A:
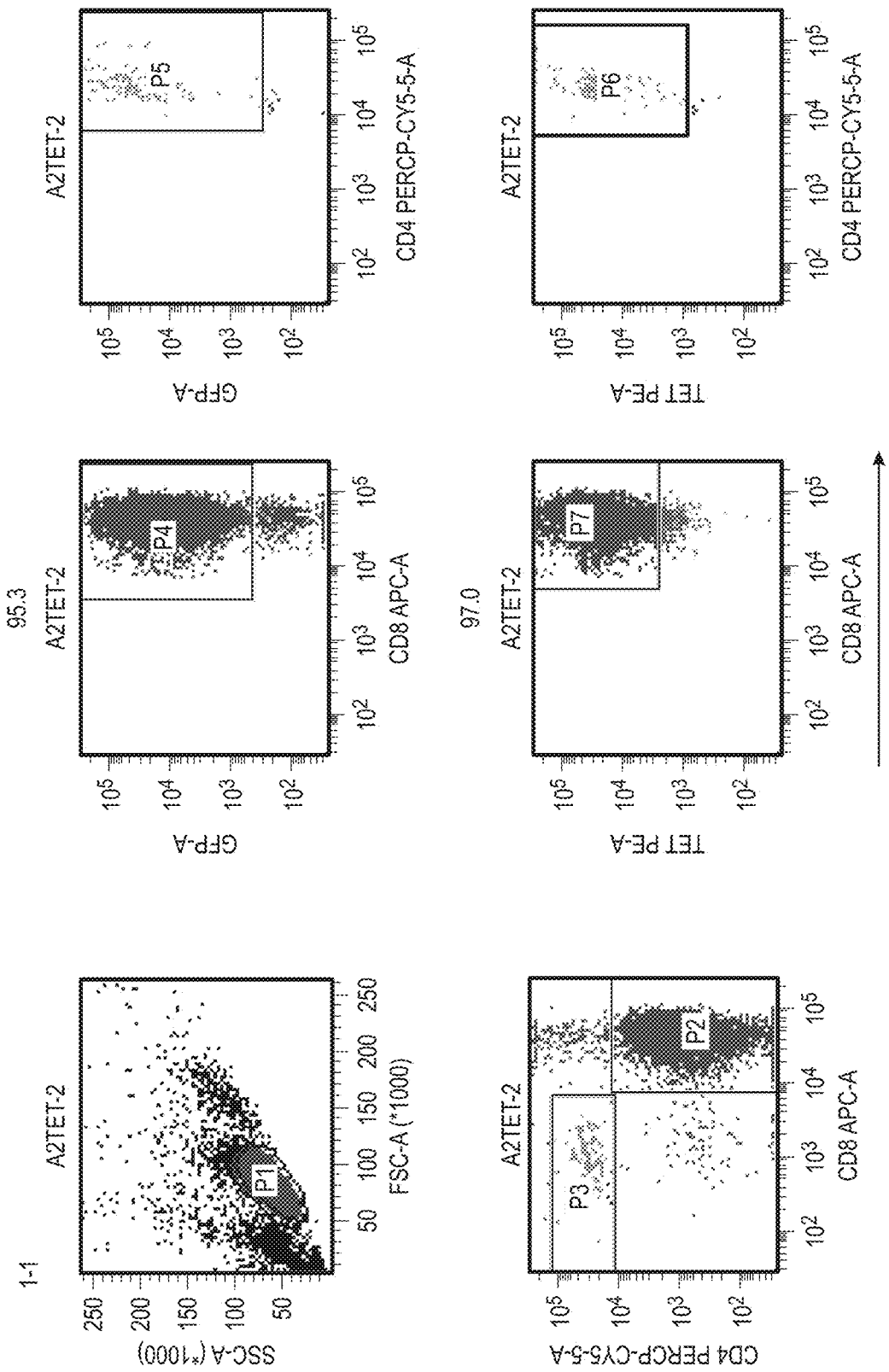
FIGS. 16A-16B shows the results of expansion culture of TCR-expressing cells (1-1 and 1-2) in Test Example 3. The numerical values shown outside the graph indicate the percentage of tetramer-positive cells or GFP-positive cells.
Figure 16B:
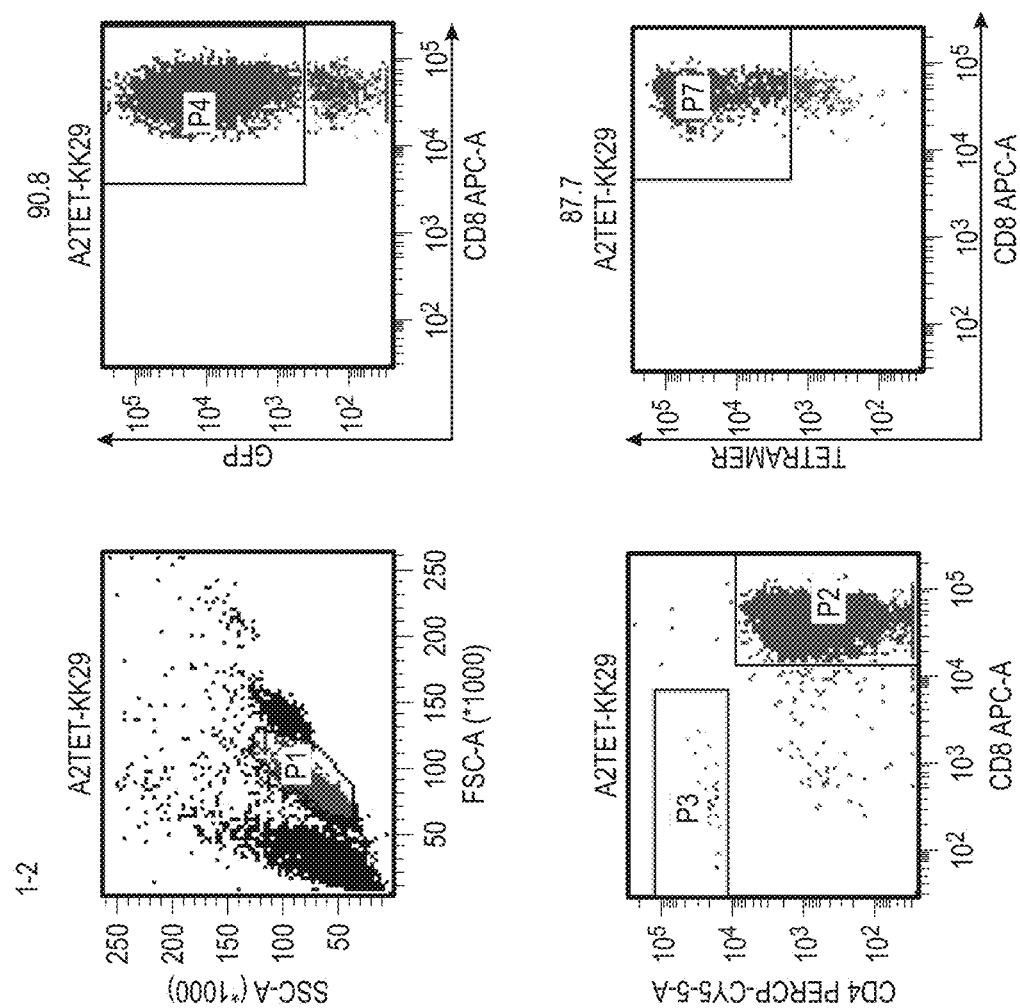
Figure 17A:
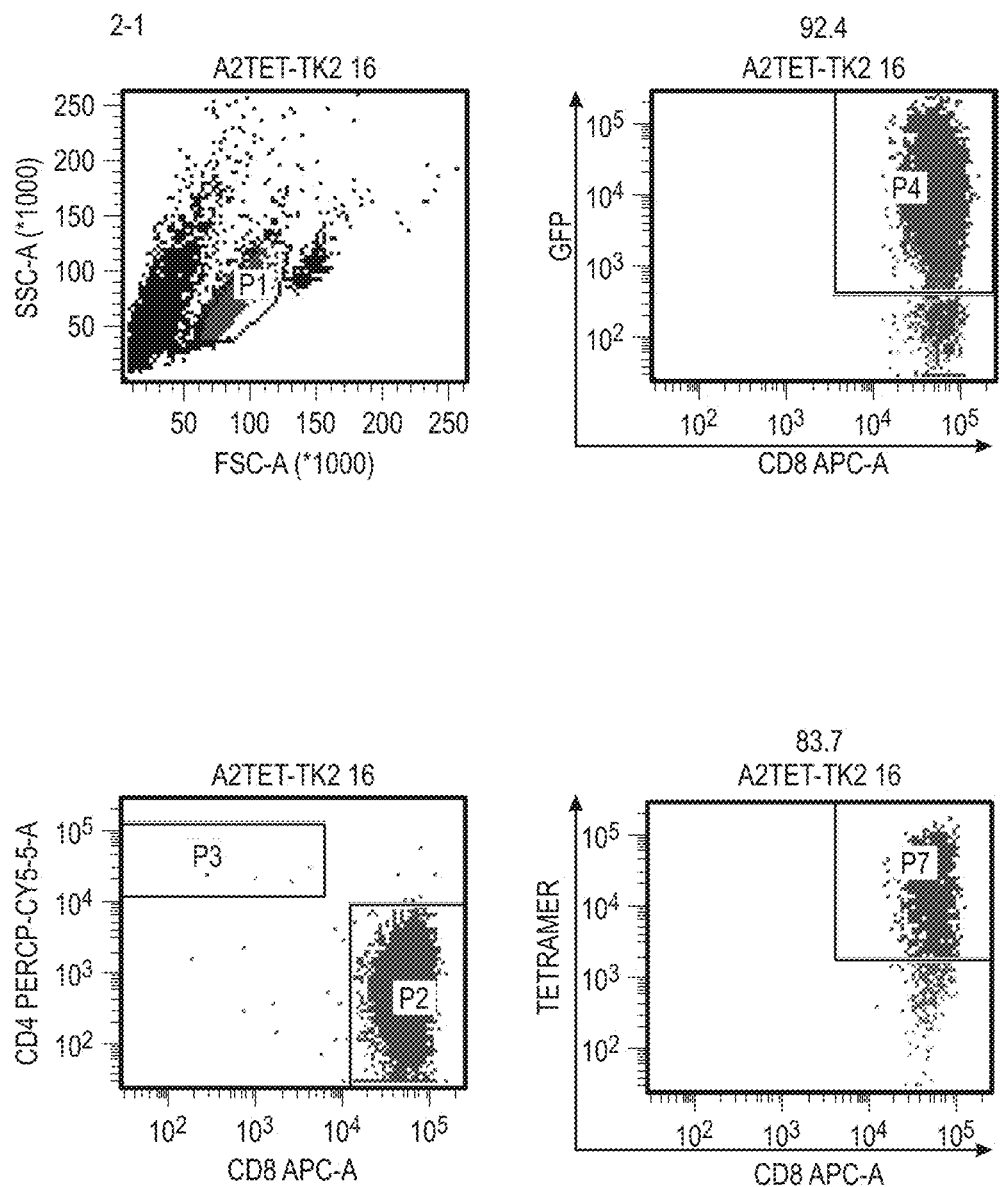
FIGS. 17A-17B shows the results of expansion culture of TCR-expressing cells (2-1 and 2-2) in Test Example 3. The numerical values shown outside the graph indicate the percentage of tetramer-positive cells or GFP-positive cells.
Figure 17B:
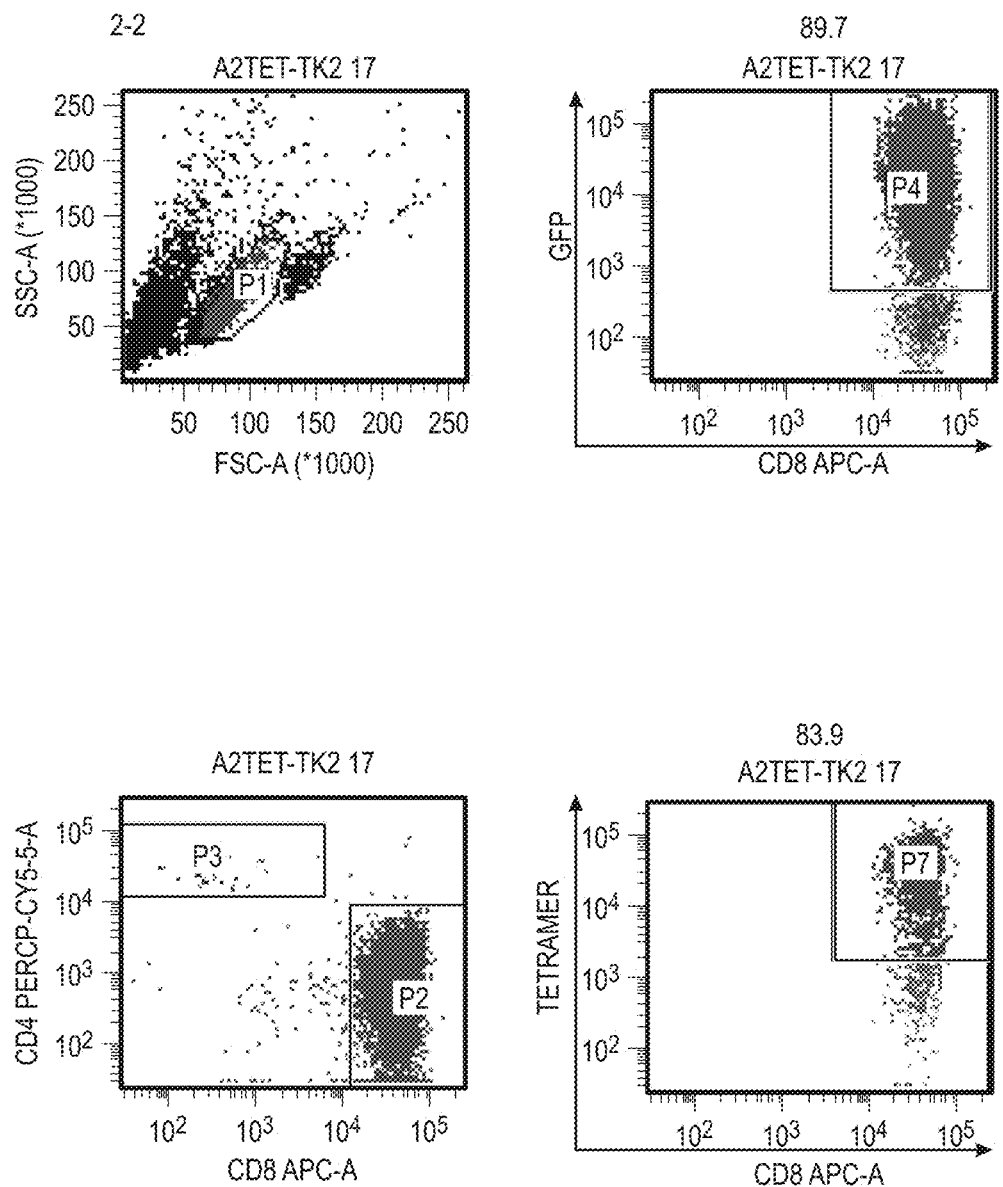
Figure 18:
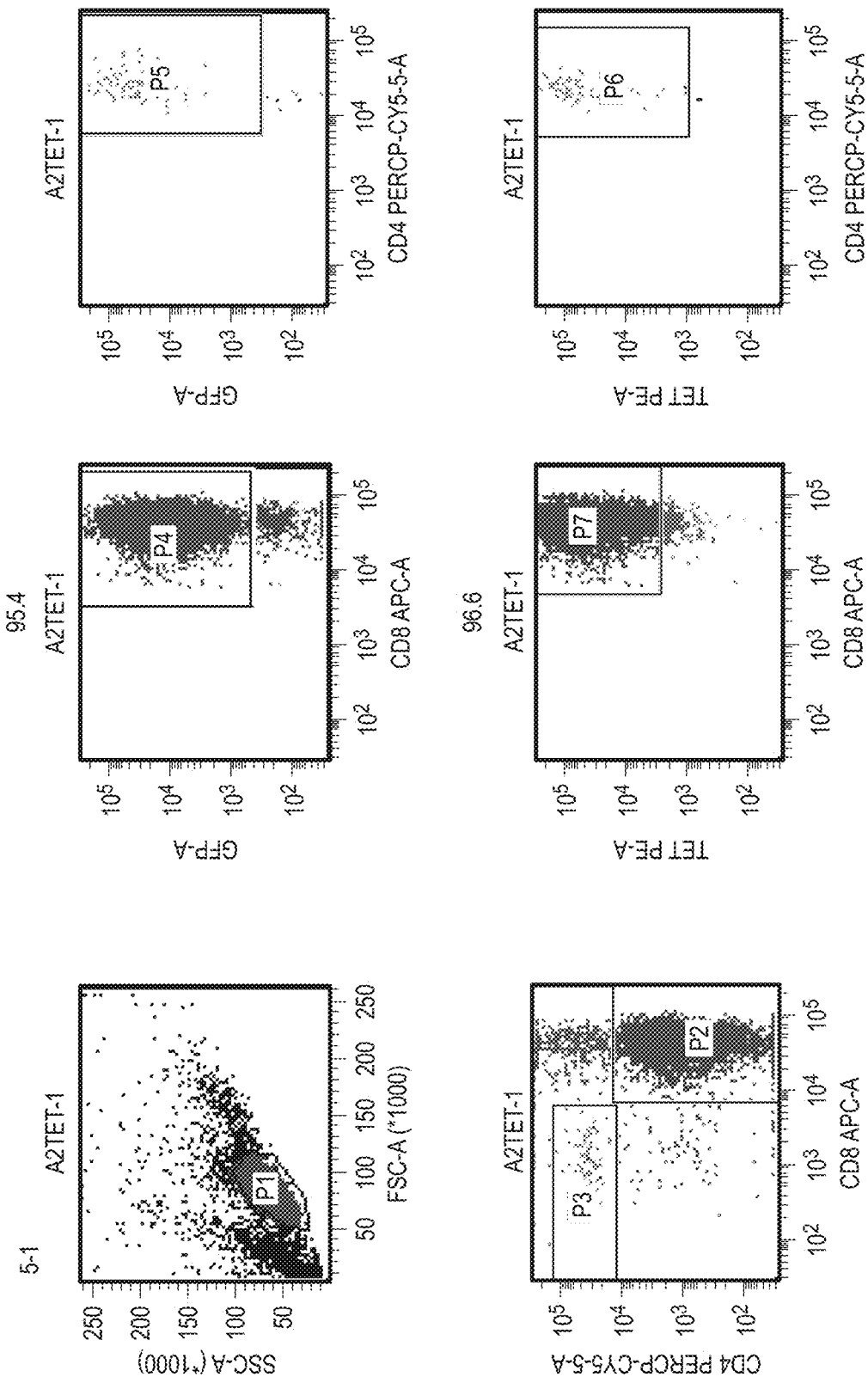
FIG. 18 shows the results of expansion culture of TCR-expressing cells (5-1) in Test Example 3. The numerical values shown outside the graph indicate the percentage of tetramer-positive cells or GFP-positive cells.
Figure 19A:
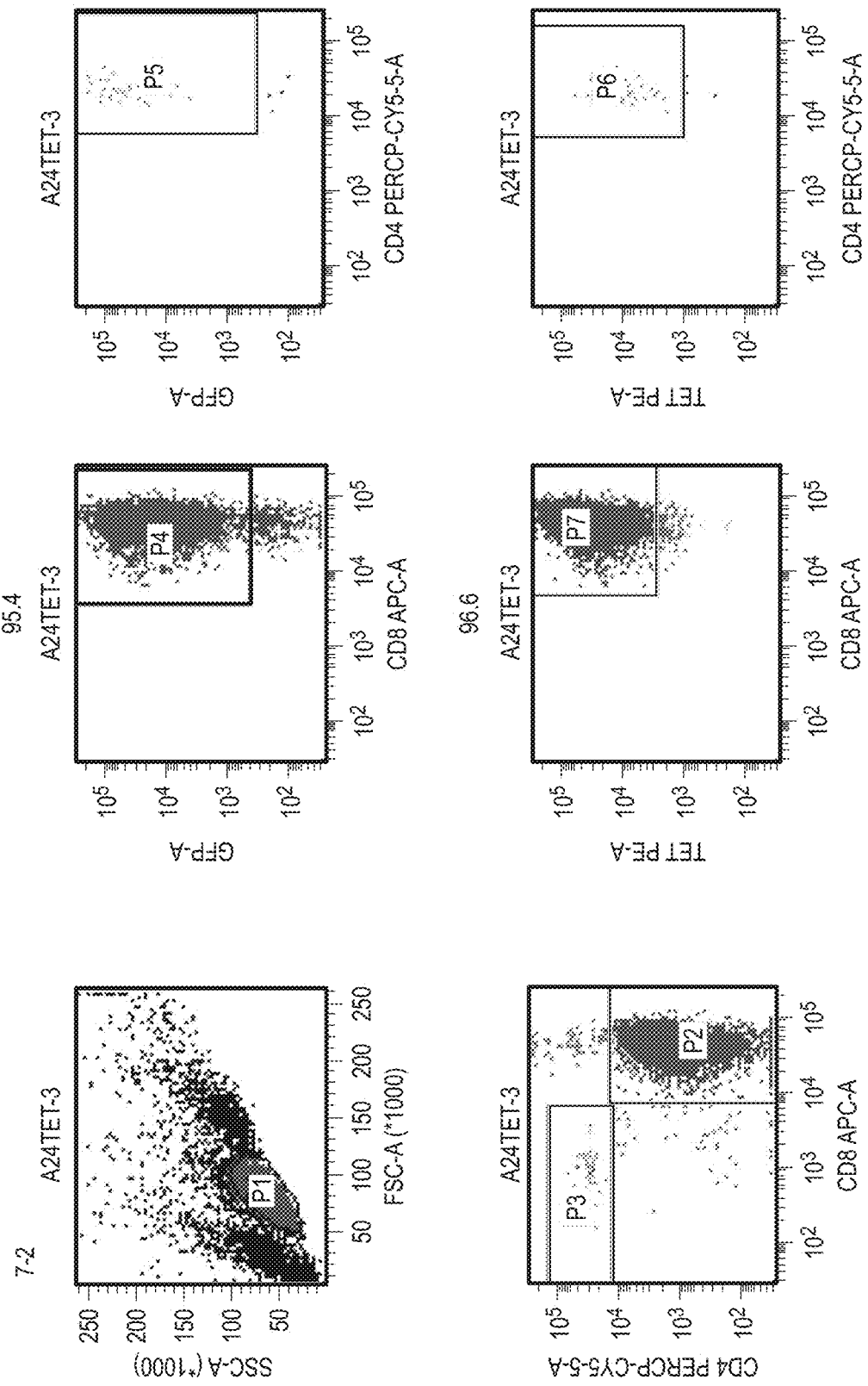
FIGS. 19A-19B shows the results of expansion culture of TCR-expressing cells (7-2 and 7-3) in Test Example 3. The numerical values shown outside the graph indicate the percentage of tetramer-positive cells or GFP-positive cells.
Figure 19B:
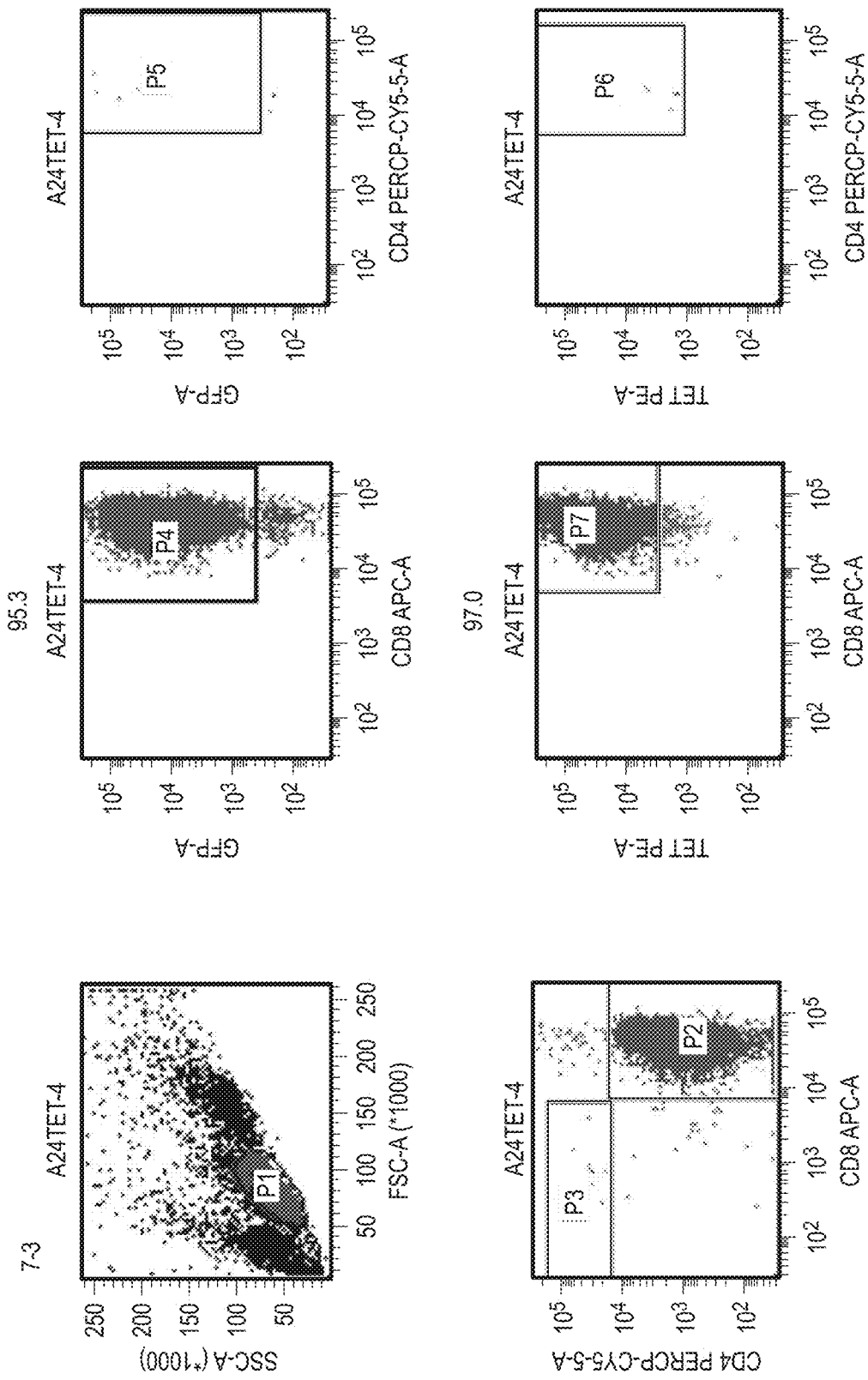

Test Example 1: TCR Repertoire Analysis of Tax-specific CD8-positive Cell Population Peripheral bloods from ATL patients (4 cases) who had developed ATL and were in long-term remission after chemotherapy were stained with tetramers by flow cytometry (FIGS. 1 and 2). As tetramers, HLA-A*02:01/$Tax_{p11-19}$ $_{(LLFGYPVYV)}$ and HLA-A*24:02/$Tax_{p301-309}$ $_{(SFHSLHLLF)}$ were prepared and used. In all four cases, the tetramer-positive rate in CD8-positive T cells was in the range of 0.1% to 1%. Next, TCR gene was obtained from tetramer-positive CD8-positive T cells detected by tetramer staining. T-cell repertoire analysis was performed using isolated tetramer positive cells of each patient. The TCR type of each cell and the number of cells of each TCR type were determined, and the TCR types were ranked in descending order of the number of cells of each TCR type. The results showed that in each patient, the tetramer-positive CD8-positive T cells had a biased TCR type, indicating an oligoclonal cell population (FIG. 3). The TCRs ranked highly in terms of the number of cells of each TCR type were selected. Two TCR clones (1-1 and 1-2; and 2-1 and 2-2) were obtained from Sample No. 1 and Sample No. 2 (HLA-A*02:01), respectively, and three TCR clones (5-1, 5-2, and 5-3; and 7-1, 7-2, and 7-3) were obtained from Sample No. 5 (HLA-A*02:01) and Sample No. 7 (HLA-A*24:02), respectively (FIG. 3).

FIGS. 4 to 13 show the amino acid sequences (N-terminus to C-terminus) of each of the 10 TCR types obtained from the 4 cases. In each figure, the constant region is enclosed by ruled lines, and the other region shows the variable region. The underlining indicates CDR1, CDR2, and CDR3 in order from the N-terminal side. The sequence number of β chain CDR1 in FIG. 4 was named SEQ ID NO: 1. Thereafter, β chain CDR1, β chain CDR2, β chain CDR3, β chain variable region, β chain constant region, α chain CDR1, α chain CDR2, α chain CDR3, α chain variable region, and α chain constant region were sequentially numbered in this order. More specifically, the sequence number of the amino acid sequence in each region is as follows.

TCR1-1 (FIG. 4): the sequence number of β chain CDR1 is SEQ ID NO: 1, the sequence number of β chain CDR2 is SEQ ID NO: 2, the sequence number of β chain CDR3 is SEQ ID NO: 3, the sequence number of the β chain variable region is SEQ ID NO: 4, the sequence number of the β chain constant region is SEQ ID NO: 5, the sequence number of α chain CDR1 is SEQ ID NO: 6, the sequence number of α chain CDR2 is SEQ ID NO: 7, the sequence number of α chain CDR3 is SEQ ID NO: 8, the sequence number of the α chain variable region is SEQ ID NO: 9, and the sequence number of the α chain constant region is SEQ ID NO: 10.

TCR1-2 (FIG. 5): the sequence number of SEQ ID NO: β chain CDR1 is SEQ ID NO: 11, the sequence number of β chain CDR2 is SEQ ID NO: 12, the sequence number of β chain CDR3 is SEQ ID NO: 13, the sequence number of the β chain variable region is SEQ ID NO: 14, the sequence number of the β chain constant region is SEQ ID NO: 15, the sequence number of α chain CDR1 is SEQ ID NO: 16, the sequence number of α chain CDR2 is SEQ ID NO: 17, the sequence number of α chain CDR3 is SEQ ID NO: 18, the sequence number of the α chain variable region is SEQ ID NO: 19, and the sequence number of the α chain constant region is SEQ ID NO: 20.

TCR2-1 (FIG. 6): the sequence number of β chain CDR1 is SEQ ID NO: 21, the sequence number of β chain CDR2 is SEQ ID NO: 22, the sequence number of β chain CDR3 is SEQ ID NO: 23, the sequence number of the β chain variable region is SEQ ID NO: 24, the sequence number of the β chain constant region is SEQ ID NO: 25, the sequence number of α chain CDR1 is SEQ ID NO: 26, the sequence number of α chain CDR2 is SEQ ID NO: 27, the sequence number of α chain CDR3 is SEQ ID NO: 28, the sequence number of the α chain variable region is SEQ ID NO: 29, and the sequence number of the α chain constant region is SEQ ID NO: 30.

TCR2-2 (FIG. 7): the sequence number of β chain CDR1 is SEQ ID NO: 31, the sequence number of B chain CDR2 is SEQ ID NO: 32, the sequence number of β chain CDR3 is SEQ ID NO: 33, the sequence number of the β chain variable region is SEQ ID NO: 34, the sequence number of the β chain constant region is SEQ ID NO: 35, the sequence number of α chain CDR1 is SEQ ID NO: 36, the sequence number of α chain CDR2 is SEQ ID NO: 37, the sequence number of α chain CDR3 is SEQ ID NO: 38, the sequence number of the α chain variable region is SEQ ID NO: 39, and the sequence number of the α chain constant region is SEQ ID NO: 40.

TCR5-1 (FIG. 8): the sequence number of β chain CDR1 is SEQ ID NO: 41, the sequence number of β chain CDR2 is SEQ ID NO: 42, the sequence number of β chain CDR3 is SEQ ID NO: 43, the sequence number of β chain variable region is SEQ ID NO: 44, the sequence number of the β chain constant region is SEQ ID NO: 45, the sequence number of α chain CDR1 is SEQ ID NO: 46, the sequence number of α chain CDR2 is SEQ ID NO: 47, the sequence number of α chain CDR3 is SEQ ID NO: 48, the sequence number of the α chain variable region is SEQ ID NO: 49, and the sequence number of the α chain constant region is SEQ ID NO: 50.

TCR5-2 (FIG. 9): the sequence number of β chain CDR1 is SEQ ID NO: 51, the sequence number of β chain CDR2 is SEQ ID NO: 52, the sequence number of β chain CDR3 is SEQ ID NO: 53, the sequence number of the β chain variable region is SEQ ID NO: 54, the sequence number of the β chain constant region is SEQ ID NO: 55, the sequence number of α chain CDR1 is SEQ ID NO: 56, the sequence number of α chain CDR2 is SEQ ID NO: 57, the sequence number of α chain CDR3 is SEQ ID NO: 58, the sequence number of the α chain variable region is SEQ ID NO: 59, and the sequence number of the α chain constant region is SEQ ID NO: 60.

TCR5-3 (FIG. 10): the sequence number of β chain CDR1 is SEQ ID NO: 61, the sequence number of β chain CDR2 is SEQ ID NO: 62, the sequence number of β chain CDR3 is SEQ ID NO: 63, the sequence number of the β chain variable region is SEQ ID NO: 64, the sequence number of the β chain constant region is SEQ ID NO: 65, the sequence number of α chain CDR1 is SEQ ID NO: 66, the sequence number of α chain CDR2 is SEQ ID NO: 67, the sequence number of α chain CDR3 is SEQ ID NO: 68, the sequence number of the α chain variable region is SEQ ID NO: 69, and the sequence number of the α chain constant region is SEQ ID NO: 70.

TCR7-1 (FIG. 11): the sequence number of β chain CDR1 is SEQ ID NO: 71, the sequence number of β chain CDR2 is SEQ ID NO: 72, the sequence number of β chain CDR3 is SEQ ID NO: 73, the sequence number of the β chain variable region is SEQ ID NO: 74, the sequence number of the β chain constant region is SEQ ID NO: 75, the sequence number of α chain CDR1 is SEQ ID NO: 76, the sequence number of α chain CDR2 is SEQ ID NO: 77, the sequence number of α chain CDR3 is SEQ ID NO: 78, the sequence number of the α chain variable region is SEQ ID NO: 79, and the sequence number of the α chain constant region is SEQ ID NO: 80.

TCR7-2 (FIG. 12): the sequence number of β chain CDR1 is SEQ ID NO: 81, the sequence number of β chain CDR2 is SEQ ID NO: 82, the sequence number of β chain CDR3 is SEQ ID NO: 83, the sequence number of the β chain variable region is SEQ ID NO: 84, the sequence number of the β chain constant region is SEQ ID NO: 85, the sequence number of α chain CDR1 is SEQ ID NO: 86, the sequence number of α chain CDR2 is SEQ ID NO: 87, the sequence number of α chain CDR3 is SEQ ID NO: 88, the sequence number of the α chain variable region is SEQ ID NO: 89, and the sequence number of the α chain constant region is SEQ ID NO: 90.

TCR7-3 (FIG. 13): the sequence number of β chain CDR1 is SEQ ID NO: 91, the sequence number of β chain CDR2 is SEQ ID NO: 92, the sequence number of β chain CDR3 is SEQ ID NO: 93, the sequence number of the β chain variable region is SEQ ID NO: 94, the sequence number of the β chain constant region is SEQ ID NO: 95, the sequence number of α chain CDR1 is SEQ ID NO: 96, and the sequence number of α chain CDR2 is SEQ ID NO: 97, the sequence number of α chain CDR3 is SEQ ID NO: 98, the sequence number of the α chain variable region is SEQ ID NO: 99, and sequence number of the α chain constant region is SEQ ID NO: 100.

Test Example 2: Preparation of TCR Transgenic Cells and Confirmation of Antigen-specific Response To prepare human transgenic cells, PBMCs isolated from blood using Ficoll were used. The cells were stimulated with anti-CD3 antibody and retronectin, then transfected with Tax-specific TCR gene 4 days after the stimulation, and analyzed by flow cytometry 8 to 11 days after the stimulation.

Since the retroviral vector used in this test coexpresses GFP, the expression of GFP was used as an indicator to examine the transfection efficiency. FIGS. 14A-14C and 15A-15C show the results. When the cells were transfected with HLA-A2-bound Tax-specific TCR gene, CD8-positive GFP-positive cells were detected in 20% or more of the transfected cells, and CD4-positive GFP-positive cells were detected in 15% or more of the transfected cells. When the cells were transfected with HLA-A24-bound Tax-specific TCR gene, CD8-positive GFP-positive cells were detected in 25% or more of the transfected cells, and CD4-positive GFP-positive cells were detected in 15% or more of the transfected cells.

Next, whether the TCR gene introduced into the cells was expressed or not was examined using tetramer staining. FIGS. 14A-14C and 15A-15C show the results. HLA-A2-bound TCR-positive CD8-positive cells were detected in about 10% or more of the transfected cells, and TCR-positive CD4-positive cells were detected in about 5% or more of the transfected cells. Similarly, HLA-A24-restricted TCR-positive CD8-positive cells were detected in about 15% of the transfected cells, and TCR-positive CD4-positive cells were detected in about 1% of the transfected cells.

These results indicate that the target TCR gene can be introduced and expressed using a retroviral vector.

Test Example 3: Functional Analysis of T Cells Transfected with Tax-specific TCR Gene To prepare a cell population with a higher tetramer-positive rate and perform functional analysis of Tax-specific TCR transgenic cells, tetramer-positive cells were sorted using a BD FACSAria™ Cell Sorter (Becton Dickinson), and expansion culture was performed. After 8 days of culture, tetramer staining was performed. After the cell isolation and expansion culture, a cell population of Tax-specific CD8-positive T cells with a high tetramer positive rate and a high GFP expression rate was obtained. FIGS. 16A-B to 19A-B show some of the results.

After 9 to 11 days of culture, functional analysis was performed to determine the affinity of TCR for Tax peptide. LCLs were used as target cells, and serially diluted peptides were added. The LCLs were co-cultured with the above-described transgenic cells for 18 hours and then examined using IFN-γ ELISA (Enzyme Linked Immunosorbent Assay). Table 2 shows the measurement results of the IFN-γ concentration. In Table 2, the top row indicates the TCR clone number and the leftmost column indicates the peptide concentration.

TABLE 2

|  | 1-1 | 1-2 | 2-1 | 2-2 | 5-1 | 5-2 | 5-3 | 7-2 | 7-3 |
|---|---|---|---|---|---|---|---|---|---|
| 10 uM | 3134.3 | 2507.2 | 2478.3 | 2480.4 | 3138.4 | 2022.4 | 2311.2 | 3254.4 | 3263.8 |
| 1 uM | 3072.5 | 2479.4 | 2452.1 | 2462.3 | 3073.3 | 2007.6 | 2304.2 | 3204.3 | 3248.9 |
| 100 nM | 3066.7 | 2449.4 | 2380.3 | 2454.2 | 3087.2 | 1601.1 | 2251.9 | 3216 | 3245.2 |
| 10 nM | 2306.2 | 1852 | 1070.1 | 1899.3 | 2792.3 | 728 | 1375.4 | 3239.5 | 3238.1 |
| 1 nM | 620.8 | 852.1 | 686 | 856.8 | 824.8 | 288.6 | 575.5 | 3143.4 | 3148.6 |
| 100 pM | 252 | 519.4 | 375.7 | 531.8 | 344 | 155.9 | 394.4 | 1479.8 | 1552.7 |
| 0 M | 297.6 | 314.3 | 248.6 | 352.4 | 378 | 164.4 | 240 | 233.6 | 147.6 |

Table 2 shows that each TCR is a high-affinity TCR capable of recognizing a very low concentration of peptides.

Figure 20:
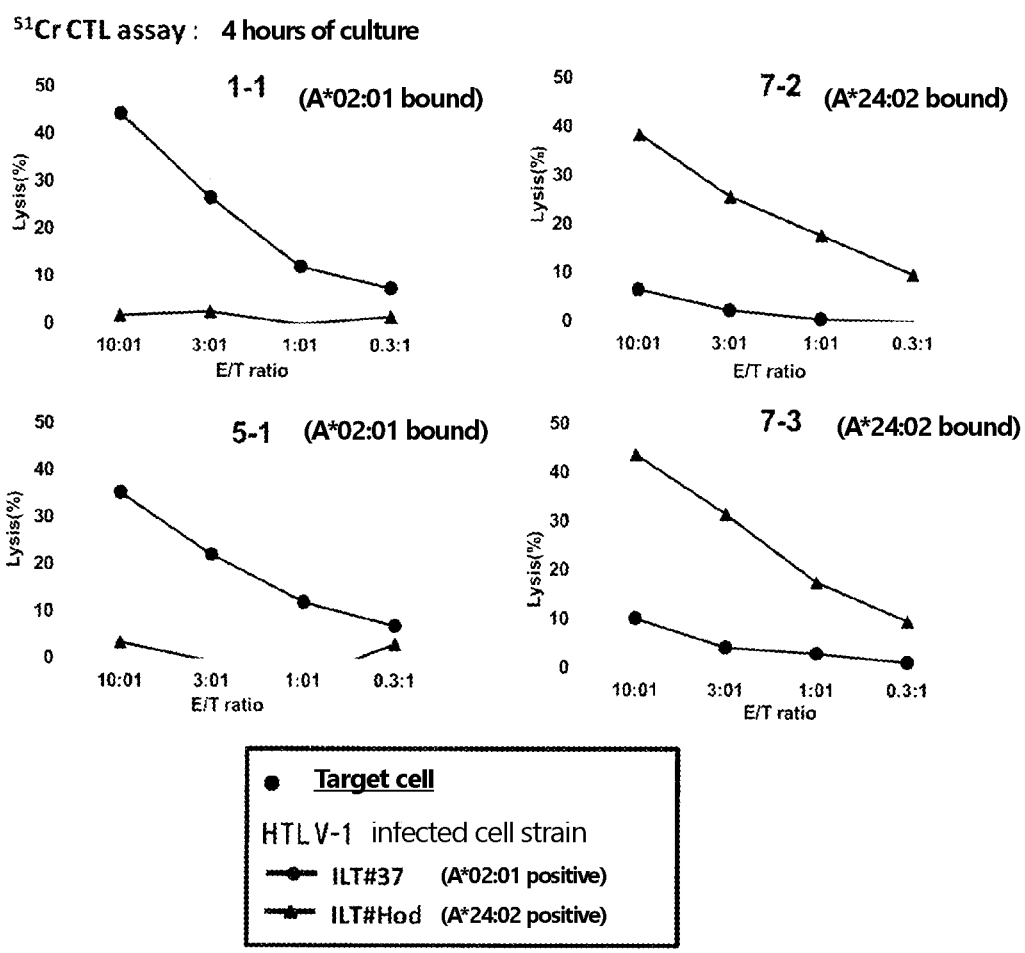
FIG. 20 shows the results of cytotoxicity assay in Test Example 3.

Next, after 9 to 11 days of culture, a cytotoxicity assay using $^{51}$Cr was performed to determine whether specific cytotoxicity was exhibited. $^{51}$Cr was added to the target cells and effector cells were further added. After the resulting mixture was cultured for 4 hours, the amount of $^{51}$Cr in the supernatant was measured using a scintillation counter. ILT #37 (HTLV-1 positive cell line, HLA-A0201-positive) and ILT #Hod (HTLV-1 positive cell line, HLA-A2402-positive) were used as target cells, and the transgenic cells described above were used as effector cells. FIG. 20 shows the results.

As shown in FIG. 20, both HLA-A2-bound TCR and HLA-A24-bound TCR were found to be capable of recognizing and injuring HTLV-1-positive cells.

---

The invention claimed is:

1. A method of treating adult T-cell leukemia, comprising administrating an injectable preparation to a patient in need thereof, wherein the injectable preparation comprises a cell comprising one or more polynucleotides encoding a T cell receptor, the T-cell receptor comprising any one of the following features (A) to (J):

(A) a β chain comprising β chain CDR1 comprising the amino acid sequence represented by SEQ ID NO: 1, β chain CDR2 comprising the amino acid sequence represented by SEQ ID NO: 2, and β chain CDR3 comprising the amino acid sequence represented by SEQ ID NO: 3, and an α chain comprising α chain CDR1 comprising the amino acid sequence represented by SEQ ID NO: 6, α chain CDR2 comprising the amino acid sequence represented by SEQ ID NO: 7, and α chain CDR3 comprising the amino acid sequence represented by SEQ ID NO: 8;

(B) a β chain comprising β chain CDR1 comprising the amino acid sequence represented by SEQ ID NO: 11, β chain CDR2 comprising the amino acid sequence represented by SEQ ID NO: 12, and β chain CDR3 comprising the amino acid sequence represented by SEQ ID NO: 13, and an α chain comprising α chain CDR1 comprising the amino acid sequence represented by SEQ ID NO: 16, α chain CDR2 comprising the amino acid sequence represented by SEQ ID NO: 17, and α chain CDR3 comprising the amino acid sequence represented by SEQ ID NO: 18;

(C) a β chain comprising β chain CDR1 comprising the amino acid sequence represented by SEQ ID NO: 21, β chain CDR2 comprising the amino acid sequence represented by SEQ ID NO: 22, and β chain CDR3 comprising the amino acid sequence represented by SEQ ID NO: 23, and an α chain comprising α chain CDR1 comprising the amino acid sequence represented by SEQ ID NO:26, α chain CDR2 comprising the amino acid sequence represented by SEQ ID NO: 27, and α chain CDR3 comprising the amino acid sequence represented by SEQ ID NO: 28;

(D) a β chain comprising β chain CDR1 comprising the amino acid sequence represented by SEQ ID NO: 31, β chain CDR2 comprising the amino acid sequence represented by SEQ ID NO: 32, and β chain CDR3 comprising the amino acid sequence represented by SEQ ID NO: 33, and an α chain comprising α chain CDR1 comprising the amino acid sequence represented by SEQ ID NO: 36, α chain CDR2 comprising the amino acid sequence represented by SEQ ID NO: 37, and α chain CDR3 comprising the amino acid sequence represented by SEQ ID NO: 38;

(E) a β chain comprising β chain CDR1 comprising the amino acid sequence represented by SEQ ID NO: 41, β chain CDR2 comprising the amino acid sequence represented by SEQ ID NO: 42, and β chain CDR3 comprising the amino acid sequence represented by SEQ ID NO: 43, and an α chain comprising α chain CDR1 comprising the amino acid sequence represented by SEQ ID NO: 46, α chain CDR2 comprising the amino acid sequence represented by SEQ ID NO: 47, and α chain CDR3 comprising the amino acid sequence represented by SEQ ID NO: 48;

(F) a β chain comprising β chain CDR1 comprising the amino acid sequence represented by SEQ ID NO: 51, β chain CDR2 comprising the amino acid sequence represented by SEQ ID NO: 52, and β chain CDR3 comprising the amino acid sequence represented by SEQ ID NO: 53, and an α chain comprising α chain CDR1 comprising the amino acid sequence represented by SEQ ID NO: 56, α chain CDR2 comprising the amino acid sequence represented by SEQ ID NO: 57, and α chain CDR3 comprising the amino acid sequence represented by SEQ ID NO: 58;

(G) a β chain comprising β chain CDR1 comprising the amino acid sequence represented by SEQ ID NO: 61, β chain CDR2 comprising the amino acid sequence represented by SEQ ID NO: 62, and β chain CDR3 comprising the amino acid sequence represented by SEQ ID NO: 63, and an α chain comprising α chain CDR1 comprising the amino acid sequence represented by SEQ ID NO: 66, α chain CDR2 comprising the amino acid sequence represented by SEQ ID NO: 67, and α chain CDR3 comprising the amino acid sequence represented by SEQ ID NO: 68, (H) a β chain comprising β chain CDR1 comprising the amino acid sequence represented by SEQ ID NO: 71, β chain CDR2 comprising the amino acid sequence represented by SEQ ID NO: 72, and β chain CDR3 comprising the amino acid sequence represented by SEQ ID NO: 73, and an α chain comprising α chain CDR1 comprising the amino acid sequence represented by SEQ ID NO: 76, α chain CDR2 comprising the amino acid sequence represented by SEQ ID NO: 77, and α chain CDR3 comprising the amino acid sequence represented by SEQ ID NO: 78, (I) a β chain comprising β chain CDR1 comprising the amino acid sequence represented by SEQ ID NO: 81, β chain CDR2 comprising the amino acid sequence represented by SEQ ID NO: 82, and β chain CDR3 comprising the amino acid sequence represented by SEQ ID NO: 83, and an α chain comprising α chain CDR1 comprising the amino acid sequence represented by SEQ ID NO: 86, α chain CDR2 comprising the amino acid sequence represented by SEQ ID NO: 87, and α chain CDR3 comprising the amino acid sequence represented by SEQ ID NO: 88, and (J) a β chain comprising β chain CDR1 comprising the amino acid sequence represented by SEQ ID NO: 91, β chain CDR2 comprising the amino acid sequence represented by SEQ ID NO: 92, and β chain CDR3 comprising the amino acid sequence represented by SEQ ID NO: 93, and an α chain comprising α chain CDR1 comprising the amino acid sequence represented by SEQ ID NO: 96, α chain CDR2 comprising the amino acid sequence represented by SEQ ID NO: 97, and α chain CDR3 comprising the amino acid sequence represented by SEQ ID NO: 98, wherein the cell is a CD8-positive T cell, and wherein the patient is HLA-A*24:02 or HLA-A*02:01 positive.

2. The method according to claim 1, wherein the T-cell receptor is expressed on a cell membrane.

3. The method according to claim 1, wherein the cell is a cell derived from a living organism carrying a human T-cell leukemia virus.

\* \* \* \* \*

SEQUENCE LISTING

<160> NUMBER OF SEQ ID NOS: 102

<210> SEQ ID NO 1
<211> LENGTH: 5
<212> TYPE: PRT
<213> ORGANISM: Artificial Sequence
<220> FEATURE:
<223> OTHER INFORMATION: 1-1 beta CDR1

<400> SEQUENCE: 1

Ser Gly His Asn Thr
1               5

<210> SEQ ID NO 2
<211> LENGTH: 6
<212> TYPE: PRT
<213> ORGANISM: Artificial Sequence
<220> FEATURE:
<223> OTHER INFORMATION: 1-1 beta CDR2

<400> SEQUENCE: 2

Tyr Glu Asn Glu Glu Ala
1               5

<210> SEQ ID NO 3
<211> LENGTH: 15
<212> TYPE: PRT
<213> ORGANISM: Artificial Sequence
<220> FEATURE:
<223> OTHER INFORMATION: 1-1 beta CDR3

<400> SEQUENCE: 3

Ala Ser Ser Leu Asp Arg Leu Ala Gly Gly Arg Asp Thr Gln Tyr
1               5                   10                  15

<210> SEQ ID NO 4
<211> LENGTH: 136
<212> TYPE: PRT
<213> ORGANISM: Artificial Sequence
<220> FEATURE:
<223> OTHER INFORMATION: 1-1 beta variable region

<400> SEQUENCE: 4

Met Gly Thr Arg Leu Leu Cys Trp Val Ala Phe Cys Leu Leu Val Glu
1               5                   10                  15

Glu Leu Ile Glu Ala Gly Val Val Gln Ser Pro Arg Tyr Lys Ile Ile
            20                  25                  30

Glu Lys Lys Gln Pro Val Ala Phe Trp Cys Asn Pro Ile Ser Gly His
        35                  40                  45

Asn Thr Leu Tyr Trp Tyr Arg Gln Asn Leu Gly Gln Gly Pro Glu Leu
    50                  55                  60

Leu Ile Arg Tyr Glu Asn Glu Ala Val Asp Ser Gln Leu Pro
65                  70                  75                  80

Lys Asp Arg Phe Ser Ala Glu Arg Leu Lys Gly Val Asp Ser Thr Leu
                85                  90                  95

Lys Ile Gln Pro Ala Glu Leu Gly Asp Ser Ala Val Tyr Leu Cys Ala
            100                 105                 110

Ser Ser Leu Asp Arg Leu Ala Gly Gly Arg Asp Thr Gln Tyr Phe Gly
            115                 120                 125

Pro Gly Thr Arg Leu Thr Val Leu
            130                 135

<210> SEQ ID NO 5
<211> LENGTH: 177
<212> TYPE: PRT
<213> ORGANISM: Artificial Sequence
<220> FEATURE:
<223> OTHER INFORMATION: 1-1 beta constant region

<400> SEQUENCE: 5

Glu Asp Leu Lys Asn Val Phe Pro Pro Glu Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Phe Pro Asp His Val Glu Leu Ser Trp Trp Val Asn
        35                  40                  45

Gly Lys Glu Val His Ser Gly Val Cys Thr Asp Pro Gln Pro Leu Lys
    50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
            115                 120                 125

Ala Asp Cys Gly Phe Thr Ser Val Ser Tyr Gln Gln Gly Val Leu Ser
            130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 6
<211> LENGTH: 6
<212> TYPE: PRT
<213> ORGANISM: Artificial Sequence
<220> FEATURE:
<223> OTHER INFORMATION: 1-1 alpha CDR1

<400> SEQUENCE: 6

Asp Arg Gly Ser Gln Ser
1               5

<210> SEQ ID NO 7
<211> LENGTH: 6
<212> TYPE: PRT
<213> ORGANISM: Artificial Sequence
<220> FEATURE:
<223> OTHER INFORMATION: 1-1 alpha CDR2

<400> SEQUENCE: 7

Ile Tyr Ser Asn Gly Asp
1               5

<210> SEQ ID NO 8
<211> LENGTH: 11
<212> TYPE: PRT
<213> ORGANISM: Artificial Sequence
<220> FEATURE:
<223> OTHER INFORMATION: 1-1 alpha CDR3

<400> SEQUENCE: 8

Ala Gly Glu Thr Asp Ser Trp Gly Lys Leu Gln
1               5                   10

<210> SEQ ID NO 9
<211> LENGTH: 134
<212> TYPE: PRT
<213> ORGANISM: Artificial Sequence
<220> FEATURE:
<223> OTHER INFORMATION: 1-1 alpha variable region

<400> SEQUENCE: 9

Met Met Lys Ser Leu Arg Val Leu Leu Val Ile Leu Trp Leu Gln Leu
1               5                   10                  15

Ser Trp Val Trp Ser Gln Gln Lys Glu Val Glu Gln Asn Ser Gly Pro
            20                  25                  30

Leu Ser Val Pro Glu Gly Ala Ile Ala Ser Leu Asn Cys Thr Tyr Ser
        35                  40                  45

Asp Arg Gly Ser Gln Ser Phe Phe Trp Tyr Arg Gln Tyr Ser Gly Lys
    50                  55                  60

Ser Pro Glu Leu Ile Met Phe Ile Tyr Ser Asn Gly Asp Lys Glu Asp
65                  70                  75                  80

Gly Arg Phe Thr Ala Gln Leu Asn Lys Ala Ser Gln Tyr Val Ser Leu
                85                  90                  95

Leu Ile Arg Asp Ser Gln Pro Ser Asp Ser Ala Thr Tyr Leu Cys Ala
            100                 105                 110

Gly Glu Thr Asp Ser Trp Gly Lys Leu Gln Phe Gly Ser Gly Thr Gln
        115                 120                 125

Val Val Val Thr Pro Asp
    130

<210> SEQ ID NO 10
<211> LENGTH: 140
<212> TYPE: PRT
<213> ORGANISM: Artificial Sequence
<220> FEATURE:
<223> OTHER INFORMATION: 1-1 alpha constant region

<400> SEQUENCE: 10

Ile Gln Asn Pro Asp Pro Ala Val Tyr Gln Leu Arg Asp Ser Lys Ser
1               5                   10                  15

```
Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
65              70                  75                  80

Ile Pro Glu Asp Thr Phe Phe Pro Ser Pro Glu Ser Ser Cys Asp Val
                85                  90                  95

Lys Leu Val Glu Lys Ser Phe Glu Thr Asp Thr Asn Leu Asn Phe Gln
            100                 105                 110

Asn Leu Leu Val Ile Val Leu Arg Ile Leu Leu Lys Val Ala Gly
        115                 120                 125

Phe Asn Leu Leu Met Thr Leu Arg Leu Trp Ser Ser
    130                 135                 140

<210> SEQ ID NO 11
<211> LENGTH: 6
<212> TYPE: PRT
<213> ORGANISM: Artificial Sequence
<220> FEATURE:
<223> OTHER INFORMATION: 1-2 beta CDR1

<400> SEQUENCE: 11

Asp Phe Gln Ala Thr Thr
1               5

<210> SEQ ID NO 12
<211> LENGTH: 7
<212> TYPE: PRT
<213> ORGANISM: Artificial Sequence
<220> FEATURE:
<223> OTHER INFORMATION: 1-2 beta CDR2

<400> SEQUENCE: 12

Ser Asn Glu Gly Ser Lys Ala
1               5

<210> SEQ ID NO 13
<211> LENGTH: 9
<212> TYPE: PRT
<213> ORGANISM: Artificial Sequence
<220> FEATURE:
<223> OTHER INFORMATION: 1-2 beta CDR3

<400> SEQUENCE: 13

Ser Ala Arg Tyr Gly Glu Val Ala Phe
1               5

<210> SEQ ID NO 14
<211> LENGTH: 127
<212> TYPE: PRT
<213> ORGANISM: Artificial Sequence
<220> FEATURE:
<223> OTHER INFORMATION: 1-2 beta variable region

<400> SEQUENCE: 14

Met Leu Leu Leu Leu Leu Leu Leu Gly Pro Gly Ser Gly Leu Gly Ala
1               5                   10                  15

Val Val Ser Gln His Pro Ser Arg Val Ile Cys Lys Ser Gly Thr Ser
            20                  25                  30
```

Val Lys Ile Glu Cys Arg Ser Leu Asp Phe Gln Ala Thr Thr Met Phe
            35                  40                  45

Trp Tyr Arg Gln Phe Pro Lys Lys Ser Leu Met Leu Met Ala Thr Ser
    50                  55                  60

Asn Glu Gly Ser Lys Ala Thr Tyr Glu Gln Gly Val Glu Lys Asp Lys
65                  70                  75                  80

Phe Leu Ile Asn His Ala Ser Leu Thr Leu Ser Thr Leu Thr Val Thr
                85                  90                  95

Ser Ala His Pro Glu Asp Ser Ser Phe Tyr Ile Cys Ser Ala Arg Tyr
            100                 105                 110

Gly Glu Val Ala Phe Phe Gly Gln Gly Thr Arg Leu Thr Val Val
        115                 120                 125

<210> SEQ ID NO 15
<211> LENGTH: 177
<212> TYPE: PRT
<213> ORGANISM: Artificial Sequence
<220> FEATURE:
<223> OTHER INFORMATION: 1-2 beta constant region

<400> SEQUENCE: 15

Glu Asp Leu Asn Lys Val Phe Pro Pro Glu Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Phe Pro Asp His Val Glu Leu Ser Trp Trp Val Asn
        35                  40                  45

Gly Lys Glu Val His Ser Gly Val Cys Thr Asp Pro Gln Pro Leu Lys
    50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
        115                 120                 125

Ala Asp Cys Gly Phe Thr Ser Val Ser Tyr Gln Gln Gly Val Leu Ser
    130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 16
<211> LENGTH: 6
<212> TYPE: PRT
<213> ORGANISM: Artificial Sequence
<220> FEATURE:
<223> OTHER INFORMATION: 1-2 alpha CDR1

<400> SEQUENCE: 16

Asp Ser Ala Ser Asn Tyr
1               5

<210> SEQ ID NO 17
<211> LENGTH: 7

```
<212> TYPE: PRT
<213> ORGANISM: Artificial Sequence
<220> FEATURE:
<223> OTHER INFORMATION: 1-2 alpha CDR2

<400> SEQUENCE: 17

Ile Arg Ser Asn Val Gly Glu
1               5

<210> SEQ ID NO 18
<211> LENGTH: 10
<212> TYPE: PRT
<213> ORGANISM: Artificial Sequence
<220> FEATURE:
<223> OTHER INFORMATION: 1-2 alpha CDR3

<400> SEQUENCE: 18

Ala Ala Ser Arg Asp Asn Asn Asp Met Arg
1               5                   10

<210> SEQ ID NO 19
<211> LENGTH: 131
<212> TYPE: PRT
<213> ORGANISM: Artificial Sequence
<220> FEATURE:
<223> OTHER INFORMATION: 1-2 alpha variable region

<400> SEQUENCE: 19

Met Thr Ser Ile Arg Ala Val Phe Ile Phe Leu Trp Leu Gln Leu Asp
1               5                   10                  15

Leu Val Asn Gly Glu Asn Val Glu Gln His Pro Ser Thr Leu Ser Val
            20                  25                  30

Gln Glu Gly Asp Ser Ala Val Ile Lys Cys Thr Tyr Ser Asp Ser Ala
        35                  40                  45

Ser Asn Tyr Phe Pro Trp Tyr Lys Gln Glu Leu Gly Lys Gly Pro Gln
    50                  55                  60

Leu Ile Ile Asp Ile Arg Ser Asn Val Gly Glu Lys Lys Asp Gln Arg
65                  70                  75                  80

Ile Ala Val Thr Leu Asn Lys Thr Ala Lys His Phe Ser Leu His Ile
                85                  90                  95

Thr Glu Thr Gln Pro Glu Asp Ser Ala Val Tyr Phe Cys Ala Ala Ser
            100                 105                 110

Arg Asp Asn Asn Asp Met Arg Phe Gly Ala Gly Thr Arg Leu Thr Val
        115                 120                 125

Lys Pro Asn
        130

<210> SEQ ID NO 20
<211> LENGTH: 140
<212> TYPE: PRT
<213> ORGANISM: Artificial Sequence
<220> FEATURE:
<223> OTHER INFORMATION: 1-2 alpha constant region

<400> SEQUENCE: 20

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45
```

-continued

```
Leu Asp Met Arg Ser Met Asp Phe Lys Ser Asn Ser Ala Val Ala Trp
        50                  55                  60

Ser Asn Lys Ser Asp Phe Ala Cys Ala Asn Ala Phe Asn Asn Ser Ile
 65                  70                  75                  80

Ile Pro Glu Asp Thr Phe Phe Pro Ser Pro Glu Ser Ser Cys Asp Val
                85                  90                  95

Lys Leu Val Glu Lys Ser Phe Glu Thr Asp Thr Asn Leu Asn Phe Gln
                100                 105                 110

Asn Leu Val Ile Val Leu Arg Ile Leu Leu Lys Val Ala Gly
            115                 120                 125

Phe Asn Leu Leu Met Thr Leu Arg Leu Trp Ser Ser
        130                 135                 140

<210> SEQ ID NO 21
<211> LENGTH: 5
<212> TYPE: PRT
<213> ORGANISM: Artificial Sequence
<220> FEATURE:
<223> OTHER INFORMATION: 2-1 beta CDR1

<400> SEQUENCE: 21

Met Asn His Glu Tyr
 1               5

<210> SEQ ID NO 22
<211> LENGTH: 6
<212> TYPE: PRT
<213> ORGANISM: Artificial Sequence
<220> FEATURE:
<223> OTHER INFORMATION: 2-1 beta CDR2

<400> SEQUENCE: 22

Ser Met Asn Val Glu Val
 1               5

<210> SEQ ID NO 23
<211> LENGTH: 13
<212> TYPE: PRT
<213> ORGANISM: Artificial Sequence
<220> FEATURE:
<223> OTHER INFORMATION: 2-1 beta CDR3

<400> SEQUENCE: 23

Ala Ser Ser Pro Gly Leu Ala Gly Gly Val Glu Gln Phe
 1               5                   10

<210> SEQ ID NO 24
<211> LENGTH: 133
<212> TYPE: PRT
<213> ORGANISM: Artificial Sequence
<220> FEATURE:
<223> OTHER INFORMATION: 2-1 beta variable region

<400> SEQUENCE: 24

Met Gly Pro Gln Leu Leu Gly Tyr Val Val Leu Cys Leu Leu Gly Ala
 1               5                   10                  15

Gly Pro Leu Glu Ala Gln Val Thr Gln Asn Pro Arg Tyr Leu Ile Thr
                20                  25                  30

Val Thr Gly Lys Lys Leu Thr Val Thr Cys Ser Gln Asn Met Asn His
            35                  40                  45

Glu Tyr Met Ser Trp Tyr Arg Gln Asp Pro Gly Leu Gly Leu Arg Gln
        50                  55                  60
```

```
Ile Tyr Tyr Ser Met Asn Val Glu Val Thr Asp Lys Gly Asp Val Pro
 65                  70                  75                  80

Glu Gly Tyr Lys Val Ser Arg Lys Glu Lys Arg Asn Phe Pro Leu Ile
                 85                  90                  95

Leu Glu Ser Pro Ser Pro Asn Gln Thr Ser Leu Tyr Phe Cys Ala Ser
            100                 105                 110

Ser Pro Gly Leu Ala Gly Val Glu Gln Phe Phe Gly Pro Gly Thr
        115                 120                 125

Arg Leu Thr Val Leu
        130
```

<210> SEQ ID NO 25
<211> LENGTH: 177
<212> TYPE: PRT
<213> ORGANISM: Artificial Sequence
<220> FEATURE:
<223> OTHER INFORMATION: 2-1 beta constant region

<400> SEQUENCE: 25

```
Glu Asp Leu Lys Asn Val Phe Pro Pro Glu Val Ala Val Phe Glu Pro
 1               5                  10                  15

Ser Glu Ala Glu Ile Ser His Thr Gln Lys Ala Thr Leu Val Cys Leu
             20                  25                  30

Ala Thr Gly Phe Phe Pro Asp His Val Glu Leu Ser Trp Trp Val Asn
         35                  40                  45

Gly Lys Glu Val His Ser Gly Val Cys Thr Asp Pro Gln Pro Leu Lys
 50                  55                  60

Glu Gln Pro Ala Leu Asn Asp Ser Arg Tyr Cys Leu Ser Ser Arg Leu
 65                  70                  75                  80

Arg Val Ser Ala Thr Phe Trp Gln Asn Pro Arg Asn His Phe Arg Cys
                 85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
        115                 120                 125

Ala Asp Cys Gly Phe Thr Ser Val Ser Tyr Gln Gln Gly Val Leu Ser
    130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe
```

<210> SEQ ID NO 26
<211> LENGTH: 6
<212> TYPE: PRT
<213> ORGANISM: Artificial Sequence
<220> FEATURE:
<223> OTHER INFORMATION: 2-1 alpha CDR1

<400> SEQUENCE: 26

```
Asn Ser Ala Ser Gln Ser
 1               5
```

<210> SEQ ID NO 27
<211> LENGTH: 6
<212> TYPE: PRT
<213> ORGANISM: Artificial Sequence
<220> FEATURE:

<223> OTHER INFORMATION: 2-1 alpha CDR2

<400> SEQUENCE: 27

Val Tyr Ser Ser Gly Asn
1               5

<210> SEQ ID NO 28
<211> LENGTH: 11
<212> TYPE: PRT
<213> ORGANISM: Artificial Sequence
<220> FEATURE:
<223> OTHER INFORMATION: 2-1 alpha CDR3

<400> SEQUENCE: 28

Val Val Asn Ile Gly Phe Gly Asn Val Leu His
1               5                   10

<210> SEQ ID NO 29
<211> LENGTH: 132
<212> TYPE: PRT
<213> ORGANISM: Artificial Sequence
<220> FEATURE:
<223> OTHER INFORMATION: 2-1 alpha variable region

<400> SEQUENCE: 29

Met Ile Ser Leu Arg Val Leu Val Ile Leu Trp Leu Gln Leu Ser
1               5                   10                  15

Trp Val Trp Ser Gln Arg Lys Glu Val Glu Gln Asp Pro Gly Pro
                20                  25                  30

Asn Val Pro Glu Gly Ala Thr Val Ala Phe Asn Cys Thr Tyr Ser Asn
            35                  40                  45

Ser Ala Ser Gln Ser Phe Phe Trp Tyr Arg Gln Asp Cys Arg Lys Glu
    50                  55                  60

Pro Lys Leu Leu Met Ser Val Tyr Ser Gly Asn Glu Asp Gly Arg
65                  70                  75                  80

Phe Thr Ala Gln Leu Asn Arg Ala Ser Gln Tyr Ile Ser Leu Leu Ile
                85                  90                  95

Arg Asp Ser Lys Leu Ser Asp Ser Ala Thr Tyr Leu Cys Val Val Asn
            100                 105                 110

Ile Gly Phe Gly Asn Val Leu His Cys Gly Ser Gly Thr Gln Val Ile
        115                 120                 125

Val Leu Pro His
        130

<210> SEQ ID NO 30
<211> LENGTH: 140
<212> TYPE: PRT
<213> ORGANISM: Artificial Sequence
<220> FEATURE:
<223> OTHER INFORMATION: 2-1 alpha constant region

<400> SEQUENCE: 30

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
                20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

```
Ser Asn Lys Ser Asp Phe Ala Cys Ala Asn Ala Phe Asn Asn Ser Ile
 65                  70                  75                  80

Ile Pro Glu Asp Thr Phe Phe Pro Ser Pro Glu Ser Ser Cys Asp Val
                 85                  90                  95

Lys Leu Val Glu Lys Ser Phe Glu Thr Asp Thr Asn Leu Asn Phe Gln
            100                 105                 110

Asn Leu Leu Val Ile Val Leu Arg Ile Leu Leu Lys Val Ala Gly
        115                 120                 125

Phe Asn Leu Leu Met Thr Leu Arg Leu Trp Ser Ser
    130                 135                 140

<210> SEQ ID NO 31
<211> LENGTH: 6
<212> TYPE: PRT
<213> ORGANISM: Artificial Sequence
<220> FEATURE:
<223> OTHER INFORMATION: 2-2 beta CDR1

<400> SEQUENCE: 31

Asp Phe Gln Ala Thr Thr
1               5

<210> SEQ ID NO 32
<211> LENGTH: 7
<212> TYPE: PRT
<213> ORGANISM: Artificial Sequence
<220> FEATURE:
<223> OTHER INFORMATION: 2-2 beta CDR2

<400> SEQUENCE: 32

Ser Asn Glu Gly Ser Lys Ala
1               5

<210> SEQ ID NO 33
<211> LENGTH: 8
<212> TYPE: PRT
<213> ORGANISM: Artificial Sequence
<220> FEATURE:
<223> OTHER INFORMATION: 2-2 beta CDR3

<400> SEQUENCE: 33

Ser Ala Arg Ala Gly Gly Asp Thr
1               5

<210> SEQ ID NO 34
<211> LENGTH: 126
<212> TYPE: PRT
<213> ORGANISM: Artificial Sequence
<220> FEATURE:
<223> OTHER INFORMATION: 2-2 beta variable region

<400> SEQUENCE: 34

Met Leu Leu Leu Leu Leu Leu Gly Pro Gly Ser Gly Leu Gly Ala
1               5                   10                  15

Val Val Ser Gln His Pro Ser Arg Val Ile Cys Lys Ser Gly Thr Ser
                20                  25                  30

Val Lys Ile Glu Cys Arg Ser Leu Asp Phe Gln Ala Thr Thr Met Phe
            35                  40                  45

Trp Tyr Arg Gln Phe Pro Lys Lys Ser Leu Met Leu Met Ala Thr Ser
        50                  55                  60

Asn Glu Gly Ser Lys Ala Thr Tyr Glu Gln Gly Val Glu Lys Asp Lys
 65                  70                  75                  80
```

```
Phe Leu Ile Asn His Ala Ser Leu Thr Leu Ser Thr Leu Thr Val Thr
                 85                  90                  95

Ser Ala His Pro Glu Asp Ser Ser Phe Tyr Ile Cys Ser Ala Arg Ala
            100                 105                 110

Gly Gly Asp Thr Phe Gly Ser Gly Thr Arg Leu Thr Val Val
        115                 120                 125

<210> SEQ ID NO 35
<211> LENGTH: 177
<212> TYPE: PRT
<213> ORGANISM: Artificial Sequence
<220> FEATURE:
<223> OTHER INFORMATION: 2-2 beta constant region

<400> SEQUENCE: 35

Glu Asp Leu Asn Lys Val Phe Pro Pro Glu Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Phe Pro Asp His Val Glu Leu Ser Trp Trp Val Asn
            35                  40                  45

Gly Lys Glu Val His Ser Gly Val Cys Thr Asp Pro Gln Pro Leu Lys
    50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
            115                 120                 125

Ala Asp Cys Gly Phe Thr Ser Val Ser Tyr Gln Gln Gly Val Leu Ser
    130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 36
<211> LENGTH: 6
<212> TYPE: PRT
<213> ORGANISM: Artificial Sequence
<220> FEATURE:
<223> OTHER INFORMATION: 2-2 alpha CDR1

<400> SEQUENCE: 36

Ser Ser Tyr Ser Pro Ser
1               5

<210> SEQ ID NO 37
<211> LENGTH: 8
<212> TYPE: PRT
<213> ORGANISM: Artificial Sequence
<220> FEATURE:
<223> OTHER INFORMATION: 2-2 alpha CDR2

<400> SEQUENCE: 37

Tyr Thr Ser Ala Ala Thr Leu Val
1               5
```

<210> SEQ ID NO 38
<211> LENGTH: 10
<212> TYPE: PRT
<213> ORGANISM: Artificial Sequence
<220> FEATURE:
<223> OTHER INFORMATION: 2-2 alpha CDR3

<400> SEQUENCE: 38

Val Val Ser Val Asn Asp Tyr Lys Leu Ser
1               5                   10

<210> SEQ ID NO 39
<211> LENGTH: 132
<212> TYPE: PRT
<213> ORGANISM: Artificial Sequence
<220> FEATURE:
<223> OTHER INFORMATION: 2-2 alpha variable region

<400> SEQUENCE: 39

Met Leu Leu Leu Leu Val Pro Val Leu Glu Val Ile Phe Thr Leu Gly
1               5                   10                  15

Gly Thr Arg Ala Gln Ser Val Thr Gln Leu Asp Ser His Val Ser Val
            20                  25                  30

Ser Glu Gly Thr Pro Val Leu Leu Arg Cys Asn Tyr Ser Ser Ser Tyr
        35                  40                  45

Ser Pro Ser Leu Phe Trp Tyr Val Gln His Pro Asn Lys Gly Leu Gln
    50                  55                  60

Leu Leu Leu Lys Tyr Thr Ser Ala Ala Thr Leu Val Lys Gly Ile Asn
65                  70                  75                  80

Gly Phe Glu Ala Glu Phe Lys Lys Ser Glu Thr Ser Phe His Leu Thr
                85                  90                  95

Lys Pro Ser Ala His Met Ser Asp Ala Ala Glu Tyr Phe Cys Val Val
            100                 105                 110

Ser Val Asn Asp Tyr Lys Leu Ser Phe Gly Ala Gly Thr Thr Val Thr
        115                 120                 125

Val Arg Ala Asn
    130

<210> SEQ ID NO 40
<211> LENGTH: 140
<212> TYPE: PRT
<213> ORGANISM: Artificial Sequence
<220> FEATURE:
<223> OTHER INFORMATION: 2-2 alpha constant region

<400> SEQUENCE: 40

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
65                  70                  75                  80

Ile Pro Glu Asp Thr Phe Phe Pro Ser Pro Glu Ser Ser Cys Asp Val
                85                  90                  95

```
Lys Leu Val Glu Lys Ser Phe Glu Thr Asp Thr Asn Leu Asn Phe Gln
            100                 105                 110

Asn Leu Leu Val Ile Val Leu Arg Ile Leu Leu Lys Val Ala Gly
        115                 120                 125

Phe Asn Leu Leu Met Thr Leu Arg Leu Trp Ser Ser
    130                 135                 140

<210> SEQ ID NO 41
<211> LENGTH: 5
<212> TYPE: PRT
<213> ORGANISM: Artificial Sequence
<220> FEATURE:
<223> OTHER INFORMATION: 5-1 beta CDR1

<400> SEQUENCE: 41

Met Asn His Glu Tyr
1               5

<210> SEQ ID NO 42
<211> LENGTH: 6
<212> TYPE: PRT
<213> ORGANISM: Artificial Sequence
<220> FEATURE:
<223> OTHER INFORMATION: 5-1 beta CDR2

<400> SEQUENCE: 42

Ser Val Gly Ala Gly Ile
1               5

<210> SEQ ID NO 43
<211> LENGTH: 14
<212> TYPE: PRT
<213> ORGANISM: Artificial Sequence
<220> FEATURE:
<223> OTHER INFORMATION: 5-1 beta CDR3

<400> SEQUENCE: 43

Ala Ser Ser Ser Gly Leu Ala Gly Ala Ser Gly Glu Gln Tyr
1               5                   10

<210> SEQ ID NO 44
<211> LENGTH: 134
<212> TYPE: PRT
<213> ORGANISM: Artificial Sequence
<220> FEATURE:
<223> OTHER INFORMATION: 5-1 beta variable region

<400> SEQUENCE: 44

Met Ser Ile Gly Leu Leu Cys Cys Ala Ala Leu Ser Leu Leu Trp Ala
1               5                   10                  15

Gly Pro Val Asn Thr Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110
```

```
Ser Ser Gly Leu Ala Gly Ala Ser Gly Glu Gln Tyr Phe Gly Pro Gly
            115                 120                 125

Thr Arg Leu Thr Val Thr
    130

<210> SEQ ID NO 45
<211> LENGTH: 177
<212> TYPE: PRT
<213> ORGANISM: Artificial Sequence
<220> FEATURE:
<223> OTHER INFORMATION: 5-1 beta constant region

<400> SEQUENCE: 45

Glu Asp Leu Lys Asn Val Phe Pro Pro Glu Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Phe Pro Asp His Val Glu Leu Ser Trp Trp Val Asn
        35                  40                  45

Gly Lys Glu Val His Ser Gly Val Cys Thr Asp Pro Gln Pro Leu Lys
    50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
        115                 120                 125

Ala Asp Cys Gly Phe Thr Ser Val Ser Tyr Gln Gln Gly Val Leu Ser
    130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 46
<211> LENGTH: 6
<212> TYPE: PRT
<213> ORGANISM: Artificial Sequence
<220> FEATURE:
<223> OTHER INFORMATION: 5-1 alpha CDR1

<400> SEQUENCE: 46

Asp Arg Gly Ser Gln Ser
1               5

<210> SEQ ID NO 47
<211> LENGTH: 6
<212> TYPE: PRT
<213> ORGANISM: Artificial Sequence
<220> FEATURE:
<223> OTHER INFORMATION: 5-1 alpha CDR2

<400> SEQUENCE: 47

Ile Tyr Ser Asn Gly Asp
1               5

<210> SEQ ID NO 48
```

```
<211> LENGTH: 11
<212> TYPE: PRT
<213> ORGANISM: Artificial Sequence
<220> FEATURE:
<223> OTHER INFORMATION: 5-1 alpha CDR3

<400> SEQUENCE: 48

Ala Val Arg Thr Asp Ser Trp Gly Lys Leu Gln
1               5                   10

<210> SEQ ID NO 49
<211> LENGTH: 134
<212> TYPE: PRT
<213> ORGANISM: Artificial Sequence
<220> FEATURE:
<223> OTHER INFORMATION: 5-1 alpha variable region

<400> SEQUENCE: 49

Met Met Lys Ser Leu Arg Val Leu Leu Val Ile Leu Trp Leu Gln Leu
1               5                   10                  15

Ser Trp Val Trp Ser Gln Gln Lys Glu Val Glu Gln Asn Ser Gly Pro
            20                  25                  30

Leu Ser Val Pro Glu Gly Ala Ile Ala Ser Leu Asn Cys Thr Tyr Ser
        35                  40                  45

Asp Arg Gly Ser Gln Ser Phe Phe Trp Tyr Arg Gln Tyr Ser Gly Lys
    50                  55                  60

Ser Pro Glu Leu Ile Met Phe Ile Tyr Ser Asn Gly Asp Lys Glu Asp
65                  70                  75                  80

Gly Arg Phe Thr Ala Gln Leu Asn Lys Ala Ser Gln Tyr Val Ser Leu
                85                  90                  95

Leu Ile Arg Asp Ser Gln Pro Ser Asp Ser Ala Thr Tyr Leu Cys Ala
            100                 105                 110

Val Arg Thr Asp Ser Trp Gly Lys Leu Gln Phe Gly Ala Gly Thr Gln
        115                 120                 125

Val Val Val Thr Pro Asp
        130

<210> SEQ ID NO 50
<211> LENGTH: 140
<212> TYPE: PRT
<213> ORGANISM: Artificial Sequence
<220> FEATURE:
<223> OTHER INFORMATION: 5-1 alpha constant region

<400> SEQUENCE: 50

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
65                  70                  75                  80

Ile Pro Glu Asp Thr Phe Phe Pro Ser Pro Glu Ser Ser Cys Asp Val
                85                  90                  95

Lys Leu Val Glu Lys Ser Phe Glu Thr Asp Thr Asn Leu Asn Phe Gln
            100                 105                 110
```

```
Asn Leu Leu Val Ile Val Leu Arg Ile Leu Leu Lys Val Ala Gly
        115                 120                 125

Phe Asn Leu Leu Met Thr Leu Arg Leu Trp Ser Ser
    130                 135                 140
```

<210> SEQ ID NO 51
<211> LENGTH: 6
<212> TYPE: PRT
<213> ORGANISM: Artificial Sequence
<220> FEATURE:
<223> OTHER INFORMATION: 5-2 beta CDR1

<400> SEQUENCE: 51

```
Asp Phe Gln Ala Thr Thr
1               5
```

<210> SEQ ID NO 52
<211> LENGTH: 7
<212> TYPE: PRT
<213> ORGANISM: Artificial Sequence
<220> FEATURE:
<223> OTHER INFORMATION: 5-2 beta CDR2

<400> SEQUENCE: 52

```
Ser Asn Glu Gly Ser Lys Ala
1               5
```

<210> SEQ ID NO 53
<211> LENGTH: 8
<212> TYPE: PRT
<213> ORGANISM: Artificial Sequence
<220> FEATURE:
<223> OTHER INFORMATION: 5-2 beta CDR3

<400> SEQUENCE: 53

```
Ser Ala Lys Ala Ser Glu Gln Tyr
1               5
```

<210> SEQ ID NO 54
<211> LENGTH: 126
<212> TYPE: PRT
<213> ORGANISM: Artificial Sequence
<220> FEATURE:
<223> OTHER INFORMATION: 5-2 beta variable region

<400> SEQUENCE: 54

```
Met Leu Leu Leu Leu Leu Leu Gly Pro Gly Ser Gly Leu Gly Ala
1               5                   10                  15

Val Val Ser Gln His Pro Ser Arg Val Ile Cys Lys Ser Gly Thr Ser
            20                  25                  30

Val Lys Ile Glu Cys Arg Ser Leu Asp Phe Gln Ala Thr Thr Met Phe
        35                  40                  45

Trp Tyr Arg Gln Phe Pro Lys Lys Ser Leu Met Leu Met Ala Thr Ser
    50                  55                  60

Asn Glu Gly Ser Lys Ala Thr Tyr Glu Gln Gly Val Glu Lys Asp Lys
65                  70                  75                  80

Phe Leu Ile Asn His Ala Ser Leu Thr Leu Ser Thr Leu Thr Val Thr
                85                  90                  95

Ser Ala His Pro Glu Asp Ser Ser Phe Tyr Ile Cys Ser Ala Lys Ala
            100                 105                 110

Ser Glu Gln Tyr Phe Gly Pro Gly Thr Arg Leu Thr Val Thr
        115                 120                 125
```

<210> SEQ ID NO 55
<211> LENGTH: 177
<212> TYPE: PRT
<213> ORGANISM: Artificial Sequence
<220> FEATURE:
<223> OTHER INFORMATION: 5-2 beta constant region

<400> SEQUENCE: 55

Glu Asp Leu Lys Asn Val Phe Pro Pro Glu Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Phe Pro Asp His Val Glu Leu Ser Trp Trp Val Asn
        35                  40                  45

Gly Lys Glu Val His Ser Gly Val Cys Thr Asp Pro Gln Pro Leu Lys
    50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
        115                 120                 125

Ala Asp Cys Gly Phe Thr Ser Val Ser Tyr Gln Gln Gly Val Leu Ser
    130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 56
<211> LENGTH: 5
<212> TYPE: PRT
<213> ORGANISM: Artificial Sequence
<220> FEATURE:
<223> OTHER INFORMATION: 5-2 alpha CDR1

<400> SEQUENCE: 56

Thr Ser Ile Asn Asn
1               5

<210> SEQ ID NO 57
<211> LENGTH: 7
<212> TYPE: PRT
<213> ORGANISM: Artificial Sequence
<220> FEATURE:
<223> OTHER INFORMATION: 5-2 alpha CDR2

<400> SEQUENCE: 57

Ile Arg Ser Asn Glu Arg Glu
1               5

<210> SEQ ID NO 58
<211> LENGTH: 10
<212> TYPE: PRT
<213> ORGANISM: Artificial Sequence
<220> FEATURE:
<223> OTHER INFORMATION: 5-2 alpha CDR3

```
<400> SEQUENCE: 58

Ala Ala Asp Asn Tyr Gly Gln Asn Phe Val
1               5                   10

<210> SEQ ID NO 59
<211> LENGTH: 131
<212> TYPE: PRT
<213> ORGANISM: Artificial Sequence
<220> FEATURE:
<223> OTHER INFORMATION: 5-2 alpha variable region

<400> SEQUENCE: 59

Met Glu Thr Leu Leu Gly Val Ser Leu Val Ile Leu Trp Leu Gln Leu
1               5                   10                  15

Ala Arg Val Asn Ser Gln Gln Gly Glu Glu Asp Pro Gln Ala Leu Ser
            20                  25                  30

Ile Gln Glu Gly Glu Asn Ala Thr Met Asn Cys Ser Tyr Lys Thr Ser
        35                  40                  45

Ile Asn Asn Leu Gln Trp Tyr Arg Gln Asn Ser Gly Arg Gly Leu Val
    50                  55                  60

His Leu Ile Leu Ile Arg Ser Asn Glu Arg Glu Lys His Ser Gly Arg
65                  70                  75                  80

Leu Arg Val Thr Leu Asp Thr Ser Lys Lys Ser Ser Ser Leu Leu Ile
                85                  90                  95

Thr Ala Ser Arg Ala Ala Asp Thr Ala Ser Tyr Phe Cys Ala Ala Asp
            100                 105                 110

Asn Tyr Gly Gln Asn Phe Val Phe Gly Pro Gly Thr Arg Leu Ser Val
        115                 120                 125

Leu Pro Tyr
    130

<210> SEQ ID NO 60
<211> LENGTH: 140
<212> TYPE: PRT
<213> ORGANISM: Artificial Sequence
<220> FEATURE:
<223> OTHER INFORMATION: 5-2 alpha constant region

<400> SEQUENCE: 60

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
65                  70                  75                  80

Ile Pro Glu Asp Thr Phe Phe Pro Ser Pro Glu Ser Ser Cys Asp Val
                85                  90                  95

Lys Leu Val Glu Lys Ser Phe Glu Thr Asp Thr Asn Leu Asn Phe Gln
            100                 105                 110

Asn Leu Leu Val Ile Val Leu Arg Ile Leu Leu Leu Lys Val Ala Gly
        115                 120                 125

Phe Asn Leu Leu Met Thr Leu Arg Leu Trp Ser Ser
    130                 135                 140
```

<210> SEQ ID NO 61
<211> LENGTH: 5
<212> TYPE: PRT
<213> ORGANISM: Artificial Sequence
<220> FEATURE:
<223> OTHER INFORMATION: 5-3 beta CDR1

<400> SEQUENCE: 61

Met Asn His Glu Tyr
1               5

<210> SEQ ID NO 62
<211> LENGTH: 6
<212> TYPE: PRT
<213> ORGANISM: Artificial Sequence
<220> FEATURE:
<223> OTHER INFORMATION: 5-3 beta CDR2

<400> SEQUENCE: 62

Ser Val Gly Glu Gly Thr
1               5

<210> SEQ ID NO 63
<211> LENGTH: 14
<212> TYPE: PRT
<213> ORGANISM: Artificial Sequence
<220> FEATURE:
<223> OTHER INFORMATION: 5-3 beta CDR3

<400> SEQUENCE: 63

Ala Ser Ser Tyr Ser Arg Asp Arg Gly Trp Ser Glu Ala Phe
1               5                   10

<210> SEQ ID NO 64
<211> LENGTH: 134
<212> TYPE: PRT
<213> ORGANISM: Artificial Sequence
<220> FEATURE:
<223> OTHER INFORMATION: 5-3 beta variable region

<400> SEQUENCE: 64

Met Ser Leu Gly Leu Leu Cys Cys Ala Ala Phe Ser Leu Leu Trp Ala
1               5                   10                  15

Gly Pro Val Asn Ala Gly Val Thr Gln Thr Pro Lys Phe Arg Val Leu
            20                  25                  30

Lys Thr Gly Gln Ser Met Thr Leu Leu Cys Ala Gln Asp Met Asn His
        35                  40                  45

Glu Tyr Met Tyr Trp Tyr Arg Gln Asp Pro Gly Met Gly Leu Arg Leu
    50                  55                  60

Ile His Tyr Ser Val Gly Glu Gly Thr Thr Ala Lys Gly Glu Val Pro
65                  70                  75                  80

Asp Gly Tyr Asn Val Ser Arg Leu Lys Lys Gln Asn Phe Leu Leu Gly
                85                  90                  95

Leu Glu Ser Ala Ala Pro Ser Gln Thr Ser Val Tyr Phe Cys Ala Ser
            100                 105                 110

Ser Tyr Ser Arg Asp Arg Gly Trp Ser Glu Ala Phe Phe Gly Gln Gly
        115                 120                 125

Thr Arg Leu Thr Val Val
    130

<210> SEQ ID NO 65
<211> LENGTH: 177

```
<212> TYPE: PRT
<213> ORGANISM: Artificial Sequence
<220> FEATURE:
<223> OTHER INFORMATION: 5-3 beta constant region

<400> SEQUENCE: 65

Glu Asp Leu Asn Lys Val Phe Pro Pro Glu Val Ala Val Phe Glu Pro
1               5                   10                  15

Ser Glu Ala Glu Ile Ser His Thr Gln Lys Ala Thr Leu Val Cys Leu
                20                  25                  30

Ala Thr Gly Phe Phe Pro Asp His Val Glu Leu Ser Trp Trp Val Asn
            35                  40                  45

Gly Lys Glu Val His Ser Gly Val Cys Thr Asp Pro Gln Pro Leu Lys
    50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
        115                 120                 125

Ala Asp Cys Gly Phe Thr Ser Val Ser Tyr Gln Gln Gly Val Leu Ser
130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 66
<211> LENGTH: 7
<212> TYPE: PRT
<213> ORGANISM: Artificial Sequence
<220> FEATURE:
<223> OTHER INFORMATION: 5-3 alpha CDR1

<400> SEQUENCE: 66

Thr Arg Asp Thr Thr Tyr Tyr
1               5

<210> SEQ ID NO 67
<211> LENGTH: 8
<212> TYPE: PRT
<213> ORGANISM: Artificial Sequence
<220> FEATURE:
<223> OTHER INFORMATION: 5-3 alpha CDR2

<400> SEQUENCE: 67

Arg Asn Ser Phe Asp Glu Gln Asn
1               5

<210> SEQ ID NO 68
<211> LENGTH: 12
<212> TYPE: PRT
<213> ORGANISM: Artificial Sequence
<220> FEATURE:
<223> OTHER INFORMATION: 5-3 alpha CDR3

<400> SEQUENCE: 68

Ala Leu Asn Val Met Asn Arg Asp Asp Lys Ile Ile
```

-continued

<210> SEQ ID NO 69
<211> LENGTH: 136
<212> TYPE: PRT
<213> ORGANISM: Artificial Sequence
<220> FEATURE:
<223> OTHER INFORMATION: 5-3 alpha variable region

<400> SEQUENCE: 69

```
Met Leu Thr Ala Ser Leu Leu Arg Ala Val Ile Ala Ser Ile Cys Val
1               5                   10                  15

Val Ser Ser Met Ala Gln Lys Val Thr Gln Ala Gln Thr Glu Ile Ser
            20                  25                  30

Val Val Glu Lys Glu Asp Val Thr Leu Asp Cys Val Tyr Glu Thr Arg
        35                  40                  45

Asp Thr Thr Tyr Tyr Leu Phe Trp Tyr Lys Gln Pro Pro Ser Gly Glu
    50                  55                  60

Leu Val Phe Leu Ile Arg Arg Asn Ser Phe Asp Glu Gln Asn Glu Ile
65                  70                  75                  80

Ser Gly Arg Tyr Ser Trp Asn Phe Gln Lys Ser Thr Ser Ser Phe Asn
                85                  90                  95

Phe Thr Ile Thr Ala Ser Gln Val Val Asp Ser Ala Val Tyr Phe Cys
            100                 105                 110

Ala Leu Asn Val Met Asn Arg Asp Asp Lys Ile Ile Phe Gly Lys Gly
        115                 120                 125

Thr Arg Leu His Ile Leu Pro Asn
    130                 135
```

<210> SEQ ID NO 70
<211> LENGTH: 140
<212> TYPE: PRT
<213> ORGANISM: Artificial Sequence
<220> FEATURE:
<223> OTHER INFORMATION: 5-3 alpha constant region

<400> SEQUENCE: 70

```
Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
65                  70                  75                  80

Ile Pro Glu Asp Thr Phe Phe Pro Ser Pro Glu Ser Ser Cys Asp Val
                85                  90                  95

Lys Leu Val Glu Lys Ser Phe Glu Thr Asp Thr Asn Leu Asn Phe Gln
            100                 105                 110

Asn Leu Leu Val Ile Val Leu Arg Ile Leu Leu Leu Lys Val Ala Gly
        115                 120                 125

Phe Asn Leu Leu Met Thr Leu Arg Leu Trp Ser Ser
    130                 135                 140
```

<210> SEQ ID NO 71
<211> LENGTH: 5

```
<212> TYPE: PRT
<213> ORGANISM: Artificial Sequence
<220> FEATURE:
<223> OTHER INFORMATION: 7-1 beta CDR1

<400> SEQUENCE: 71

Ser Glu His Asn Arg
1               5

<210> SEQ ID NO 72
<211> LENGTH: 6
<212> TYPE: PRT
<213> ORGANISM: Artificial Sequence
<220> FEATURE:
<223> OTHER INFORMATION: 7-1 beta CDR2

<400> SEQUENCE: 72

Phe Gln Asn Glu Ala Gln
1               5

<210> SEQ ID NO 73
<211> LENGTH: 11
<212> TYPE: PRT
<213> ORGANISM: Artificial Sequence
<220> FEATURE:
<223> OTHER INFORMATION: 7-1 beta CDR3

<400> SEQUENCE: 73

Ala Ser Ser Pro Asn Arg Gly Thr Glu Val Phe
1               5                   10

<210> SEQ ID NO 74
<211> LENGTH: 132
<212> TYPE: PRT
<213> ORGANISM: Artificial Sequence
<220> FEATURE:
<223> OTHER INFORMATION: 7-1 beta variable region

<400> SEQUENCE: 74

Met Gly Thr Ser Leu Leu Cys Trp Met Ala Leu Cys Leu Leu Gly Ala
1               5                   10                  15

Asp His Ala Asp Thr Gly Val Ser Gln Asp Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Pro Asn Arg Gly Thr Glu Val Phe Phe Gly Gln Gly Thr Arg
        115                 120                 125

Leu Thr Val Val
    130

<210> SEQ ID NO 75
<211> LENGTH: 177
<212> TYPE: PRT
<213> ORGANISM: Artificial Sequence
<220> FEATURE:
```

<223> OTHER INFORMATION: 7-1 beta constant region

<400> SEQUENCE: 75

Glu Asp Leu Asn Lys Val Phe Pro Pro Glu Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Phe Pro Asp His Val Glu Leu Ser Trp Trp Val Asn
        35                  40                  45

Gly Lys Glu Val His Ser Gly Val Cys Thr Asp Pro Gln Pro Leu Lys
    50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
        115                 120                 125

Ala Asp Cys Gly Phe Thr Ser Val Ser Tyr Gln Gln Gly Val Leu Ser
    130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 76
<211> LENGTH: 6
<212> TYPE: PRT
<213> ORGANISM: Artificial Sequence
<220> FEATURE:
<223> OTHER INFORMATION: 7-1 alpha CDR1

<400> SEQUENCE: 76

Val Ser Gly Leu Arg Gly
1               5

<210> SEQ ID NO 77
<211> LENGTH: 7
<212> TYPE: PRT
<213> ORGANISM: Artificial Sequence
<220> FEATURE:
<223> OTHER INFORMATION: 7-1 alpha CDR2

<400> SEQUENCE: 77

Leu Tyr Ser Ala Gly Glu Glu
1               5

<210> SEQ ID NO 78
<211> LENGTH: 11
<212> TYPE: PRT
<213> ORGANISM: Artificial Sequence
<220> FEATURE:
<223> OTHER INFORMATION: 7-1 alpha CDR3

<400> SEQUENCE: 78

Ala Ala Ala Asp Thr Gly Gly Phe Lys Thr Ile
1               5                   10

```
<210> SEQ ID NO 79
<211> LENGTH: 132
<212> TYPE: PRT
<213> ORGANISM: Artificial Sequence
<220> FEATURE:
<223> OTHER INFORMATION: 7-1 alpha variable region

<400> SEQUENCE: 79

Met Glu Lys Met Leu Glu Cys Ala Phe Ile Val Leu Trp Leu Gln Leu
1               5                   10                  15

Gly Trp Leu Ser Gly Glu Asp Gln Val Thr Gln Ser Pro Glu Ala Leu
            20                  25                  30

Arg Leu Gln Glu Gly Glu Ser Ser Leu Asn Cys Ser Tyr Thr Val
        35                  40                  45

Ser Gly Leu Arg Gly Leu Phe Trp Tyr Arg Gln Asp Pro Gly Lys Gly
    50                  55                  60

Pro Glu Phe Leu Phe Thr Leu Tyr Ser Ala Gly Glu Glu Lys Glu Lys
65                  70                  75                  80

Glu Arg Leu Lys Ala Thr Leu Thr Lys Lys Glu Ser Phe Leu His Ile
                85                  90                  95

Thr Ala Pro Lys Pro Glu Asp Ser Ala Thr Tyr Leu Cys Ala Ala Ala
            100                 105                 110

Asp Thr Gly Gly Phe Lys Thr Ile Phe Gly Ala Gly Thr Arg Leu Phe
        115                 120                 125

Val Lys Ala Asn
    130

<210> SEQ ID NO 80
<211> LENGTH: 140
<212> TYPE: PRT
<213> ORGANISM: Artificial Sequence
<220> FEATURE:
<223> OTHER INFORMATION: 7-1 alpha constant region

<400> SEQUENCE: 80

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
65                  70                  75                  80

Ile Pro Glu Asp Thr Phe Phe Pro Ser Pro Glu Ser Ser Cys Asp Val
                85                  90                  95

Lys Leu Val Glu Lys Ser Phe Glu Thr Asp Thr Asn Leu Asn Phe Gln
            100                 105                 110

Asn Leu Leu Val Ile Val Leu Arg Ile Leu Leu Leu Lys Val Ala Gly
        115                 120                 125

Phe Asn Leu Leu Met Thr Leu Arg Leu Trp Ser Ser
    130                 135                 140

<210> SEQ ID NO 81
<211> LENGTH: 5
<212> TYPE: PRT
<213> ORGANISM: Artificial Sequence
<220> FEATURE:
```

<223> OTHER INFORMATION: 7-2 beta CDR1

<400> SEQUENCE: 81

Ser Glu His Asn Arg
1               5

<210> SEQ ID NO 82
<211> LENGTH: 6
<212> TYPE: PRT
<213> ORGANISM: Artificial Sequence
<220> FEATURE:
<223> OTHER INFORMATION: 7-2 beta CDR2

<400> SEQUENCE: 82

Phe Gln Asn Glu Ala Gln
1               5

<210> SEQ ID NO 83
<211> LENGTH: 11
<212> TYPE: PRT
<213> ORGANISM: Artificial Sequence
<220> FEATURE:
<223> OTHER INFORMATION: 7-2 beta CDR3

<400> SEQUENCE: 83

Ala Ser Ala Glu Asp Arg Gly Glu Lys Leu Phe
1               5                   10

<210> SEQ ID NO 84
<211> LENGTH: 132
<212> TYPE: PRT
<213> ORGANISM: Artificial Sequence
<220> FEATURE:
<223> OTHER INFORMATION: 7-2 beta variable region

<400> SEQUENCE: 84

Met Gly Thr Arg Leu Leu Cys Trp Met Ala Leu Cys Leu Leu Gly Ala
1               5                   10                  15

Asp His Ala Asp Thr Gly Val Ser Gln Asp Pro Arg His Lys Ile Thr
                20                  25                  30

Lys Arg Gly Gln Asn Val Thr Phe Arg Cys Asp Pro Ile Ser Glu His
            35                  40                  45

Asn Arg Leu Tyr Trp Tyr Arg Gln Thr Leu Gly Gln Gly Pro Glu Phe
        50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ala Glu Asp Arg Gly Glu Lys Leu Phe Phe Gly Ser Gly Thr Gln
        115                 120                 125

Leu Ser Val Leu
    130

<210> SEQ ID NO 85
<211> LENGTH: 177
<212> TYPE: PRT
<213> ORGANISM: Artificial Sequence
<220> FEATURE:
<223> OTHER INFORMATION: 7-2 beta constant region

<400> SEQUENCE: 85

```
Glu Asp Leu Asn Lys Val Phe Pro Pro Glu Ala Val Phe Glu Pro
1               5                   10                  15

Ser Glu Ala Glu Ile Ser His Thr Gln Lys Ala Thr Leu Val Cys Leu
                20                  25                  30

Ala Thr Gly Phe Phe Pro Asp His Val Glu Leu Ser Trp Trp Val Asn
                35                  40                  45

Gly Lys Glu Val His Ser Gly Val Cys Thr Asp Pro Gln Pro Leu Lys
50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
                100                 105                 110

Arg Ala Lys Pro Val Thr Gln Ile Val Ser Ala Glu Ala Trp Gly Arg
                115                 120                 125

Ala Asp Cys Gly Phe Thr Ser Val Ser Tyr Gln Gln Gly Val Leu Ser
                130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 86
<211> LENGTH: 6
<212> TYPE: PRT
<213> ORGANISM: Artificial Sequence
<220> FEATURE:
<223> OTHER INFORMATION: 7-2 alpha CDR1

<400> SEQUENCE: 86

Asp Ser Ala Ile Tyr Asn
1               5

<210> SEQ ID NO 87
<211> LENGTH: 7
<212> TYPE: PRT
<213> ORGANISM: Artificial Sequence
<220> FEATURE:
<223> OTHER INFORMATION: 7-2 alpha CDR2

<400> SEQUENCE: 87

Ile Gln Ser Ser Gln Arg Glu
1               5

<210> SEQ ID NO 88
<211> LENGTH: 10
<212> TYPE: PRT
<213> ORGANISM: Artificial Sequence
<220> FEATURE:
<223> OTHER INFORMATION: 7-2 alpha CDR3

<400> SEQUENCE: 88

Ala Val Ser Arg Gly Asn Ala Arg Leu Met
1               5                   10

<210> SEQ ID NO 89
<211> LENGTH: 131
<212> TYPE: PRT
```

<213> ORGANISM: Artificial Sequence
<220> FEATURE:
<223> OTHER INFORMATION: 7-2 alpha variable region

<400> SEQUENCE: 89

Met Glu Thr Leu Leu Gly Leu Leu Ile Leu Trp Leu Gln Leu Gln Trp
1               5                   10                  15

Val Ser Ser Lys Gln Glu Val Thr Gln Ile Pro Ala Ala Leu Ser Val
            20                  25                  30

Pro Glu Gly Glu Asn Leu Val Leu Asn Cys Ser Phe Thr Asp Ser Ala
        35                  40                  45

Ile Tyr Asn Leu Gln Trp Phe Arg Gln Asp Pro Gly Lys Gly Leu Thr
    50                  55                  60

Ser Leu Leu Leu Ile Gln Ser Ser Gln Arg Glu Gln Thr Ser Gly Arg
65                  70                  75                  80

Leu Asn Ala Ser Leu Asp Lys Ser Ser Gly Arg Ser Thr Leu Tyr Ile
                85                  90                  95

Ala Ala Ser Gln Pro Gly Asp Ser Ala Thr Tyr Leu Cys Ala Val Ser
            100                 105                 110

Arg Gly Asn Ala Arg Leu Met Phe Gly Asp Gly Thr Gln Leu Val Val
        115                 120                 125

Lys Pro Asn
    130

<210> SEQ ID NO 90
<211> LENGTH: 140
<212> TYPE: PRT
<213> ORGANISM: Artificial Sequence
<220> FEATURE:
<223> OTHER INFORMATION: 7-2 alpha constant region

<400> SEQUENCE: 90

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
65                  70                  75                  80

Ile Pro Glu Asp Thr Phe Phe Pro Ser Pro Glu Ser Ser Cys Asp Val
                85                  90                  95

Lys Leu Val Glu Lys Ser Phe Glu Thr Asp Thr Asn Leu Asn Phe Gln
            100                 105                 110

Asn Leu Leu Val Ile Val Leu Arg Ile Leu Leu Leu Lys Val Ala Gly
        115                 120                 125

Phe Asn Leu Leu Met Thr Leu Arg Leu Trp Ser Ser
    130                 135                 140

<210> SEQ ID NO 91
<211> LENGTH: 5
<212> TYPE: PRT
<213> ORGANISM: Artificial Sequence
<220> FEATURE:
<223> OTHER INFORMATION: 7-3 beta CDR1

<400> SEQUENCE: 91

Ser Glu His Asn Arg
1               5

<210> SEQ ID NO 92
<211> LENGTH: 6
<212> TYPE: PRT
<213> ORGANISM: Artificial Sequence
<220> FEATURE:
<223> OTHER INFORMATION: 7-3 beta CDR2

<400> SEQUENCE: 92

Phe Gln Asn Glu Ala Gln
1               5

<210> SEQ ID NO 93
<211> LENGTH: 11
<212> TYPE: PRT
<213> ORGANISM: Artificial Sequence
<220> FEATURE:
<223> OTHER INFORMATION: 7-3 beta CDR3

<400> SEQUENCE: 93

Ala Ser Ser Pro Asp Arg Ala Asp Thr Gln Tyr
1               5                   10

<210> SEQ ID NO 94
<211> LENGTH: 132
<212> TYPE: PRT
<213> ORGANISM: Artificial Sequence
<220> FEATURE:
<223> OTHER INFORMATION: 7-3 beta variable region

<400> SEQUENCE: 94

Met Gly Ser Arg Leu Leu Cys Trp Met Ala Leu Cys Leu Leu Gly Ala
1               5                   10                  15

Asp His Ala Asp Thr Gly Val Ser Gln Asp Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Pro Asp Arg Ala Asp Thr Gln Tyr Phe Gly Pro Gly Thr Arg
        115                 120                 125

Leu Thr Val Leu
    130

<210> SEQ ID NO 95
<211> LENGTH: 177
<212> TYPE: PRT
<213> ORGANISM: Artificial Sequence
<220> FEATURE:
<223> OTHER INFORMATION: 7-3 beta constant region

<400> SEQUENCE: 95

Glu Asp Leu Lys Asn Val Phe Pro Pro Glu Val Ala Val Phe Glu Pro
1               5                   10                  15

Ser Glu Ala Glu Ile Ser His Thr Gln Lys Ala Thr Leu Val Cys Leu
                 20                  25                  30

Ala Thr Gly Phe Phe Pro Asp His Val Glu Leu Ser Trp Trp Val Asn
             35                  40                  45

Gly Lys Glu Val His Ser Gly Val Cys Thr Asp Pro Gln Pro Leu Lys
 50                  55                  60

Glu Gln Pro Ala Leu Asn Asp Ser Arg Tyr Cys Leu Ser Ser Arg Leu
 65                  70                  75                  80

Arg Val Ser Ala Thr Phe Trp Gln Asn Pro Arg Asn His Phe Arg Cys
                 85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
            115                 120                 125

Ala Asp Cys Gly Phe Thr Ser Val Ser Tyr Gln Gln Gly Val Leu Ser
130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Phe

<210> SEQ ID NO 96
<211> LENGTH: 6
<212> TYPE: PRT
<213> ORGANISM: Artificial Sequence
<220> FEATURE:
<223> OTHER INFORMATION: 7-3 alpha CDR1

<400> SEQUENCE: 96

Asp Ser Ala Ile Tyr Asn
1               5

<210> SEQ ID NO 97
<211> LENGTH: 7
<212> TYPE: PRT
<213> ORGANISM: Artificial Sequence
<220> FEATURE:
<223> OTHER INFORMATION: 7-3 alpha CDR2

<400> SEQUENCE: 97

Ile Gln Ser Ser Gln Arg Glu
1               5

<210> SEQ ID NO 98
<211> LENGTH: 10
<212> TYPE: PRT
<213> ORGANISM: Artificial Sequence
<220> FEATURE:
<223> OTHER INFORMATION: 7-3 alpha CDR3

<400> SEQUENCE: 98

Ala Val Ser Arg Gly Asn Asn Arg Leu Ala
1               5                   10

<210> SEQ ID NO 99
<211> LENGTH: 131
<212> TYPE: PRT
<213> ORGANISM: Artificial Sequence
<220> FEATURE:
<223> OTHER INFORMATION: 7-3 alpha variable region

<400> SEQUENCE: 99

Met Glu Thr Leu Leu Gly Leu Leu Ile Leu Trp Leu Gln Leu Gln Trp
1               5                   10                  15

Val Ser Ser Lys Gln Glu Val Thr Gln Ile Pro Ala Ala Leu Ser Val
            20                  25                  30

Pro Glu Gly Glu Asn Leu Val Leu Asn Cys Ser Phe Thr Asp Ser Ala
        35                  40                  45

Ile Tyr Asn Leu Gln Trp Phe Arg Gln Asp Pro Gly Lys Gly Leu Thr
    50                  55                  60

Ser Leu Leu Leu Ile Gln Ser Ser Gln Arg Glu Gln Thr Ser Gly Arg
65                  70                  75                  80

Leu Asn Ala Ser Leu Asp Lys Ser Ser Gly Arg Ser Thr Leu Tyr Ile
                85                  90                  95

Ala Ala Ser Gln Pro Gly Asp Ser Ala Thr Tyr Leu Cys Ala Val Ser
            100                 105                 110

Arg Gly Asn Asn Arg Leu Ala Phe Gly Lys Gly Asn Gln Val Val Val
        115                 120                 125

Ile Pro Asn
    130

<210> SEQ ID NO 100
<211> LENGTH: 140
<212> TYPE: PRT
<213> ORGANISM: Artificial Sequence
<220> FEATURE:
<223> OTHER INFORMATION: 7-3 alpha constant region

<400> SEQUENCE: 100

Ile Gln Asn Pro Asp Pro Ala Val Tyr Gln Leu Arg Asp Ser Lys Ser
1               5                   10                  15

Ser Asp Lys Ser Val Cys Leu Phe Thr Asp Phe Asp Ser Gln Thr Asn
            20                  25                  30

Val Ser Gln Ser Lys Asp Ser Asp Val Tyr Ile Thr Asp Lys Cys Val
        35                  40                  45

Leu Asp Met Arg Ser Met Asp Phe Lys Ser Asn Ser Ala Val Ala Trp
    50                  55                  60

Ser Asn Lys Ser Asp Phe Ala Cys Ala Asn Ala Phe Asn Asn Ser Ile
65                  70                  75                  80

Ile Pro Glu Asp Thr Phe Phe Pro Ser Pro Glu Ser Ser Cys Asp Val
                85                  90                  95

Lys Leu Val Glu Lys Ser Phe Glu Thr Asp Thr Asn Leu Asn Phe Gln
            100                 105                 110

Asn Leu Leu Val Ile Val Leu Arg Ile Leu Leu Leu Lys Val Ala Gly
        115                 120                 125

Phe Asn Leu Leu Met Thr Leu Arg Leu Trp Ser Ser
    130                 135                 140

<210> SEQ ID NO 101
<211> LENGTH: 9
<212> TYPE: PRT
<213> ORGANISM: Artificial Sequence
<220> FEATURE:
<223> OTHER INFORMATION: Taxp11-19

<400> SEQUENCE: 101

Leu Leu Phe Gly Tyr Pro Val Tyr Val
1               5

```
<210> SEQ ID NO 102
<211> LENGTH: 9
<212> TYPE: PRT
<213> ORGANISM: Artificial Sequence
<220> FEATURE:
<223> OTHER INFORMATION: Taxp301-309

<400> SEQUENCE: 102

Ser Phe His Ser Leu His Leu Leu Phe
1               5
```